(12) United States Patent
Okada et al.

(10) Patent No.: US 8,204,124 B2
(45) Date of Patent: Jun. 19, 2012

(54) IMAGE PROCESSING APPARATUS, METHOD THEREOF, AND PROGRAM

(75) Inventors: Shintaro Okada, Tokyo (JP); Kazuhiko Nishibori, Kanagawa (JP); Tomohiro Nishi, Tokyo (JP); Toshinori Ihara, Tokyo (JP); Masuyoshi Kurokawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 967 days.

(21) Appl. No.: 12/198,544

(22) Filed: Aug. 26, 2008

(65) Prior Publication Data
US 2009/0059084 A1      Mar. 5, 2009

(30) Foreign Application Priority Data

Aug. 27, 2007  (JP) ................ P2007-219421
Jul. 17, 2008  (JP) ................ P2008-186098
Jul. 17, 2008  (JP) ................ P2008-186099

(51) Int. Cl.
*H04N 11/02* (2006.01)
*G06K 9/00* (2006.01)
(52) U.S. Cl. ............... 375/240.16; 382/107; 382/236
(58) Field of Classification Search .......... None
See application file for complete search history.

(56) References Cited

U.S. PATENT DOCUMENTS

2001/0021272 A1* 9/2001 Yamori et al. .............. 382/236
2006/0193535 A1  8/2006 Mishima et al.

FOREIGN PATENT DOCUMENTS

JP  2006-260527  9/2006
JP  2007-060192  3/2007

* cited by examiner

*Primary Examiner* — Clemence Han
(74) *Attorney, Agent, or Firm* — Finnegan, Henderson, Farabow, Garrett & Dunner, L.L.P.

(57) ABSTRACT

An image processing apparatus includes a unit configured to calculate a sum of absolute differences between pixel values of pixels in a block of interest and pixel values of pixels in a reference block, a unit configured to compare sums of absolute differences calculated and to determine a minimum sum of absolute differences thereamong, a unit configured to estimate a motion vector for the pixel of interest using the reference pixel having the minimum sum of absolute differences and the pixel of interest, a unit configured to generate a motion-compensated image by using pixel values of the pixels as pixel values of corresponding pixels in the motion-compensated image, a unit configured to cumulatively add sums of absolute differences, and a unit configured to generate an interpolation image by mixing the pixels and corresponding pixels in the motion-compensated image according to an obtained cumulative-sum result.

17 Claims, 41 Drawing Sheets

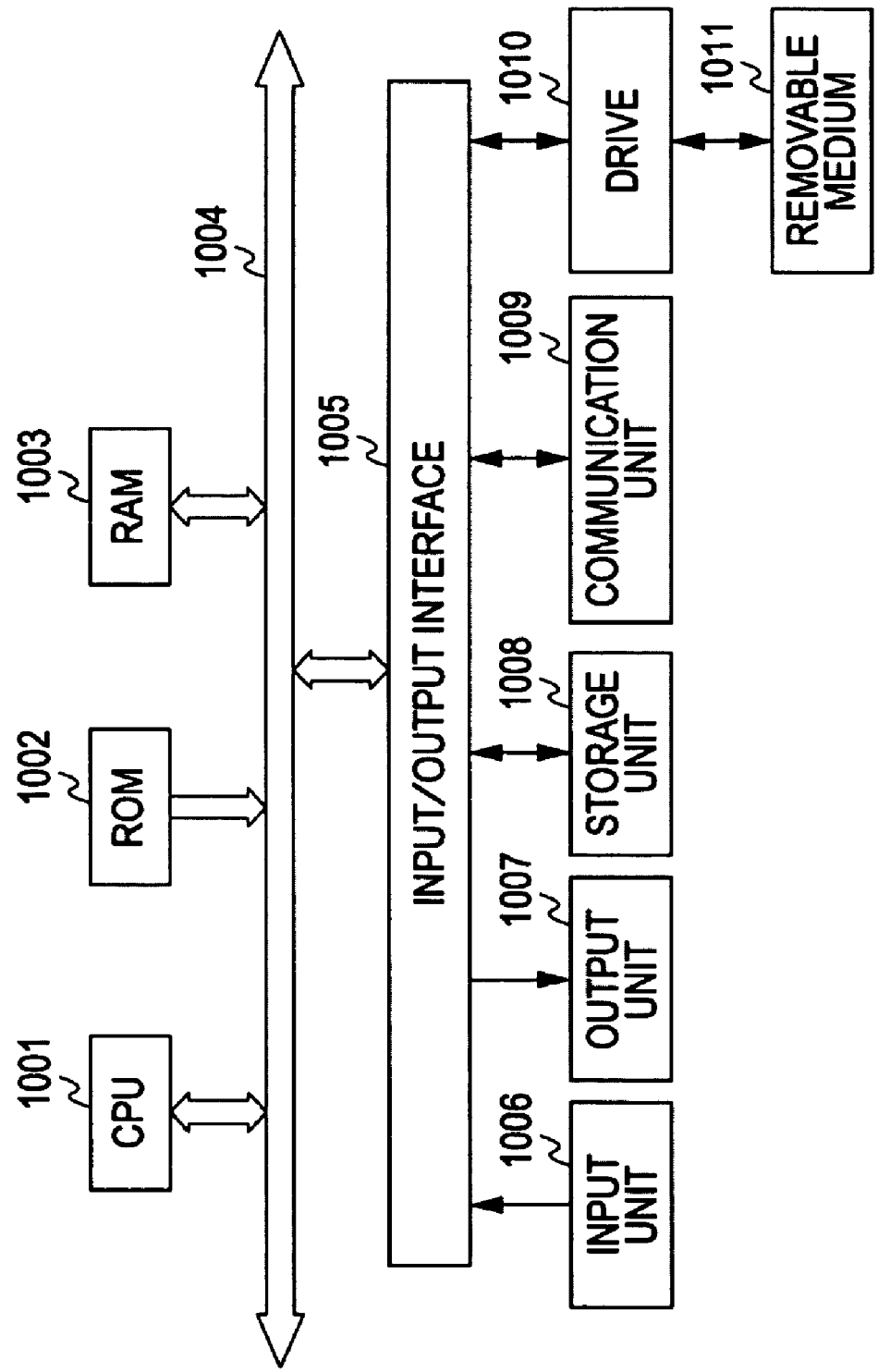

IMAGE PROCESSING APPARATUS, METHOD THEREOF, AND PROGRAM

CROSS REFERENCES TO RELATED APPLICATIONS

The present invention contains subject matter related to Japanese Patent Application JP 2007-219421 filed in the Japanese Patent Office on Aug. 27, 2007, Japanese Patent Application JP 2008-186099 filed in the Japanese Patent Office on Jul. 17, 2008, and Japanese Patent Application JP 2008-186098 filed in the Japanese Patent Office on Jul. 17, 2008, the entire contents of which are incorporated herein by reference.

BACKGROUND OF THE INVENTION

1. Field of the Invention

The present invention relates to an image processing apparatus, a method thereof, and a program. The present invention relates more particularly to an image processing apparatus, a method thereof, and a program that can reduce distortion of an image to be generated by performing interpolation even in motion compensation processing using a motion vector in an image whose brightness significantly changes and in which distortion tends to occur.

2. Description of the Related Art

In general, there is processing in which a motion vector is detected by performing a block matching technique and, by performing motion compensation processing using the motion vector, a new interpolation image (an interpolated frame) is generated from images (frames) temporally before and after the interpolation image.

However, in a case in which a scene change occurs, an object moves to an area outside a searched area, or the brightness of an image significantly changes such as during a fade-in/fade-out transition, it is difficult to detect an accurate motion vector, or the reliability of the motion vector becomes low. As a result, when such motion compensation processing is performed, distortion may appear in an image generated by performing interpolation.

Thus, a technology has been proposed which includes a function for detecting a scene change to be included and in which distortion is reduced by executing motion compensation processing according to a scene change detected (see Japanese Unexamined Patent Application Publication No. 2007-60192).

Moreover, a technology has been proposed in which distortion is reduced by checking spatial correlation of an interpolation image and executing motion compensation processing (see Japanese Unexamined Patent Application Publication No. 2006-260527).

SUMMARY OF THE INVENTION

However, in the technology disclosed in Japanese Unexamined Patent Application Publication No. 2007-60192, a mechanism for detecting a scene change is additionally necessary, and thus the cost of such an apparatus is increased. Moreover, even in a case in which the reliability of a motion vector is low, frame interpolation processing is simply performed, and thus, on every occasion, it is not possible to reduce distortion in an image which has been generated by performing interpolation.

Moreover, in the technology disclosed in Japanese Unexamined Patent Application Publication No. 2006-260527, as error processing, although the spatial correlation of the interpolation image is checked, the reliability of a motion vector is not checked. Thus, on every occasion, it is not possible to reduce distortion in an image which has been generated by performing interpolation.

The present invention has been made in light of such cases, and in particular, when an interpolation image is generated, the present invention is made so as to reduce distortion in an image generated by performing interpolation even in an image whose brightness significantly changes and in which distortion tends to occur in motion compensation processing using a motion vector.

An image processing apparatus includes sum-of-absolute-difference calculation means for calculating a sum of absolute differences between pixel values of pixels in a block of interest which includes a plurality of pixels and corresponds to a pixel of interest in a first image and pixel values of pixels, the pixels having an arrangement the same as that of the pixels in the block of interest, in a reference block which corresponds to a reference pixel in a second image, the second image being displayed at a time different from when the first image is displayed, first comparison means for comparing sums of absolute differences calculated by the sum-of-absolute-difference calculation means and determining a minimum sum of absolute differences among the sums of absolute differences, motion vector estimation means for estimating a motion vector for the pixel of interest using the pixel of interest and the reference pixel having the minimum sum of absolute differences, which is obtained by the first comparison means, and, motion-compensated image generation means for generating a motion-compensated image by using pixel values of the pixels in the first image as pixel values of corresponding pixels in the motion-compensated image according to motion vectors for the pixels in the first image, first cumulatively adding means for cumulatively adding sums of absolute differences calculated when motion vectors for pixels in the first image are obtained, the motion vectors corresponding to the pixels in the motion-compensated image, and interpolation-image generation means for generating an interpolation image by mixing the pixels in the first image and corresponding pixels in the motion-compensated image according to a cumulative-sum result obtained by the first cumulatively adding means, one of the pixels in the first image corresponding to one of the pixels in the motion-compensated image.

The image processing apparatus may further include quantization means for quantizing the cumulative-sum result using a ratio of the cumulative-sum result to a predetermined maximum value set for the cumulative-sum result, and the interpolation-image generation means may generate an interpolation image by mixing the pixels in the first image and the corresponding pixels in the motion-compensated image according to the cumulative-sum result quantized by the quantization means.

The interpolation-image generation means may generate an interpolation image by, for pixels which are included in the interpolation image and whose cumulative-sum results quantized by the quantization means are smaller than a first threshold having a predetermined value, using pixels at corresponding positions in the first image and by, for pixels which are included in the interpolation image and whose cumulative-sum results quantized by the quantization means are larger than a second threshold having a predetermined value, using pixels at corresponding positions in the motion-compensated image.

The reference pixel may be set in an area which is in the second image and covers at and near a position corresponding to the pixel of interest in the first image.

The image processing apparatus may further include subtraction means for subtracting a predetermined value from a cumulative-sum result for the second image, and second comparison means for comparing a value obtained by the subtraction means by subtracting the predetermined value from the cumulative-sum result for the second image with the cumulative-sum result for the first image, and for replacing the cumulative-sum result for the first image with the value obtained by subtracting the predetermined value from the cumulative-sum result for the second image if the value obtained by subtracting the predetermined value from the cumulative-sum result for the second image is larger than the cumulative-sum result for the first image, and for simply outputting the cumulative-sum for the first image if the value obtained by subtracting the predetermined value from the cumulative-sum result for the second image is not larger than the cumulative-sum result for the first image.

The image processing apparatus may further include stationary-block sum of absolute differences calculation means for calculating a stationary-block sum of absolute differences between the pixel values of pixels in the block of interest which includes a plurality of pixels and corresponds to the pixel of interest in the first image and pixel values of pixels, the pixels having an arrangement the same as that of the pixels in the block of interest, in a same-arrangement block which corresponds to a same-arrangement pixel which is located in a second image at a position almost the same as that of the pixel of interest, calculation means for calculating, for each of pixels of interest, a parameter according to the minimum sum of absolute differences obtained by the first comparison means and the stationary-block sum of absolute differences calculated by the stationary-block sum of absolute differences calculation means, and second cumulatively adding means for cumulatively adding parameters for the pixels of interest, the parameters being calculated by the calculation means, and the interpolation-image generation means may generate the interpolation image by mixing the pixels in the first image and corresponding pixels in the motion-compensated image according to a cumulative-sum result obtained by the second cumulatively adding means, one of the pixels in the first image corresponding to one of the pixels in the motion-compensated image.

The image processing apparatus may further include stationary-block sum of absolute differences calculation means for calculating a stationary-block sum of absolute differences between the pixel values of pixels in the block of interest which includes a plurality of pixels and corresponds to the pixel of interest in the first image and pixel values of pixels, the pixels having an arrangement the same as that of the pixels in the block of interest, in a same-arrangement block which corresponds to a same-arrangement pixel which is located in a second image at a position almost the same as that of the pixel of interest, and second cumulatively adding means for cumulatively adding sums of absolute differences for a region which includes the pixel of interest and which corresponds to a stationary-block sum of absolute differences which is larger than a predetermined threshold from among stationary-block sums of absolute differences calculated by the stationary-block sum of absolute differences calculation means, and the interpolation-image generation means may generate the interpolation image by mixing the pixels in the first image and corresponding pixels in the motion-compensated image according to a cumulative-sum result obtained by the second cumulatively adding means, one of the pixels in the first image corresponding to one of the pixels in the motion-compensated image.

The image processing apparatus may further include average calculation means for calculating the average of stationary-block sums of absolute differences for the region according to the cumulative-sum result obtained by the second cumulatively adding means.

The image processing apparatus may further include amount-of-variation calculation means for calculating an amount of variation, with respect to time, in cumulative-sum result obtained by the first cumulatively adding means, and the interpolation-image generation means may generate the interpolation image by mixing the pixels in the first image and corresponding pixels in the motion-compensated image according to the amount of variation calculated by the amount-of-variation calculation means, one of the pixels in the first image corresponding to one of the pixels in the motion-compensated image.

The image processing apparatus may further include division means for dividing the first image into n regions, and multiplication means for multiplying a maximum value from among sums of absolute differences for the n regions by n, each of the sums of absolute differences being for one of the n regions and the sums of absolute differences being obtained by the first cumulatively adding means by cumulatively adding sums of absolute differences for one of the n regions divided by the division means, and the interpolation-image generation means may generate the interpolation image by mixing the pixels in the first image and corresponding pixels in the motion-compensated image according to the sum of absolute differences calculated by the multiplication means, one of the pixels in the first image corresponding to one of the pixels in the motion-compensated image.

The first cumulatively adding means may cumulatively add sums of absolute differences for a region other than a region located at an end portion of the first image.

An image processing method includes sum-of-absolute-difference calculation step of calculating a sum of absolute differences between pixel values of pixels in a block of interest which includes a plurality of pixels and corresponds to a pixel of interest in a first image and pixel values of pixels, the pixels having an arrangement the same as that of the pixels in the block of interest, in a reference block which corresponds to a reference pixel in a second image, the second image being displayed at a time different from when the first image is displayed, comparison step of comparing sums of absolute differences calculated by performing processing of the sum-of-absolute-difference calculation step and determining a minimum sum of absolute differences among the sums of absolute differences, motion vector estimation step of estimating a motion vector for the pixel of interest using the pixel of interest and the reference pixel having the minimum sum of absolute differences, which is obtained by performing processing of the comparison step, motion-compensated image generation step of generating a motion-compensated image by using pixel values of the pixels in the first image as pixel values of corresponding pixels in the motion-compensated image according to motion vectors for the pixels in the first image, cumulatively adding step of cumulatively adding sums of absolute differences calculated when motion vectors for pixels in the first image are obtained, the motion vectors corresponding to the pixels in the motion-compensated image, and interpolation-image generation step of generating an interpolation image by mixing the pixels in the first image and corresponding pixels in the motion-compensated image according to a cumulative-sum result obtained by performing processing of the cumulatively adding step, one of the pixels in the first image corresponding to one of the pixels in the motion-compensated image.

A computer-readable program performed by a computer, the program causing the computer to perform processing includes sum-of-absolute-difference calculation step of calculating a sum of absolute differences between pixel values of pixels in a block of interest which includes a plurality of pixels and corresponds to a pixel of interest in a first image and pixel values of pixels, the pixels having an arrangement the same as that of the pixels in the block of interest, in a reference block which corresponds to a reference pixel in a second image, the second image being displayed at a time different from when the first image is displayed, comparison step of comparing sums of absolute differences calculated by performing processing of the sum-of-absolute-difference calculation step and determining a minimum sum of absolute differences among the sums of absolute differences, motion vector estimation step of estimating a motion vector for the pixel of interest using the pixel of interest and the reference pixel having the minimum sum of absolute differences, which is obtained by performing processing of the comparison step, motion-compensated image generation step of generating a motion-compensated image by using pixel values of the pixels in the first image as pixel values of corresponding pixels in the motion-compensated image according to motion vectors for the pixels in the first image, cumulatively adding step of cumulatively adding sums of absolute differences calculated when motion vectors for pixels in the first image are obtained, the motion vectors corresponding to the pixels in the motion-compensated image, and interpolation-image generation step of generating an interpolation image by mixing the pixels in the first image and corresponding pixels in the motion-compensated image according to a cumulative-sum result obtained by performing processing of the cumulatively adding step, one of the pixels in the first image corresponding to one of the pixels in the motion-compensated image.

A program recording medium may have the computer-readable program recorded therein.

With respect to an image processing apparatus, a method thereof, and a program thereof, a sum of absolute differences between pixel values of pixels in a block of interest which includes a plurality of pixels and corresponds to a pixel of interest in a first image and pixel values of pixels, the pixels having an arrangement the same as that of the pixels in the block of interest, in a reference block which corresponds to a reference pixel in a second image, the second image being displayed at a time different from when the first image is displayed is calculated, sums of absolute differences calculated are compared and a minimum sum of absolute differences among the sums of absolute differences is determined, a motion vector for the pixel of interest using the pixel of interest and the reference pixel having the minimum sum of absolute differences is estimated, a motion-compensated image by using pixel values of the pixels in the first image as pixel values of corresponding pixels in the motion-compensated image according to motion vectors for the pixels in the first image is generated, sums of absolute differences calculated when motion vectors for pixels in the first image are obtained, the motion vectors corresponding to the pixels in the motion-compensated image, are cumulatively added, and an interpolation image by mixing the pixels in the first image and corresponding pixels in the motion-compensated image according to a cumulative-sum result obtained is generated, one of the pixels in the first image corresponding to one of the pixels in the motion-compensated image.

An image processing apparatus according to an embodiment of the present invention may be a separate apparatus, or may be a block of performing image processing.

According to an embodiment of the present invention, even in motion compensation processing using a motion vector obtained in an image whose changes in brightness are large and which tends to be distorted, the distortion of the image which is generated by performing interpolation can be reduced.

BRIEF DESCRIPTION OF THE DRAWINGS

FIG. 41 is a diagram illustrating an exemplary structure of a personal computer.

DESCRIPTION OF THE PREFERRED EMBODIMENTS

Figure 1:
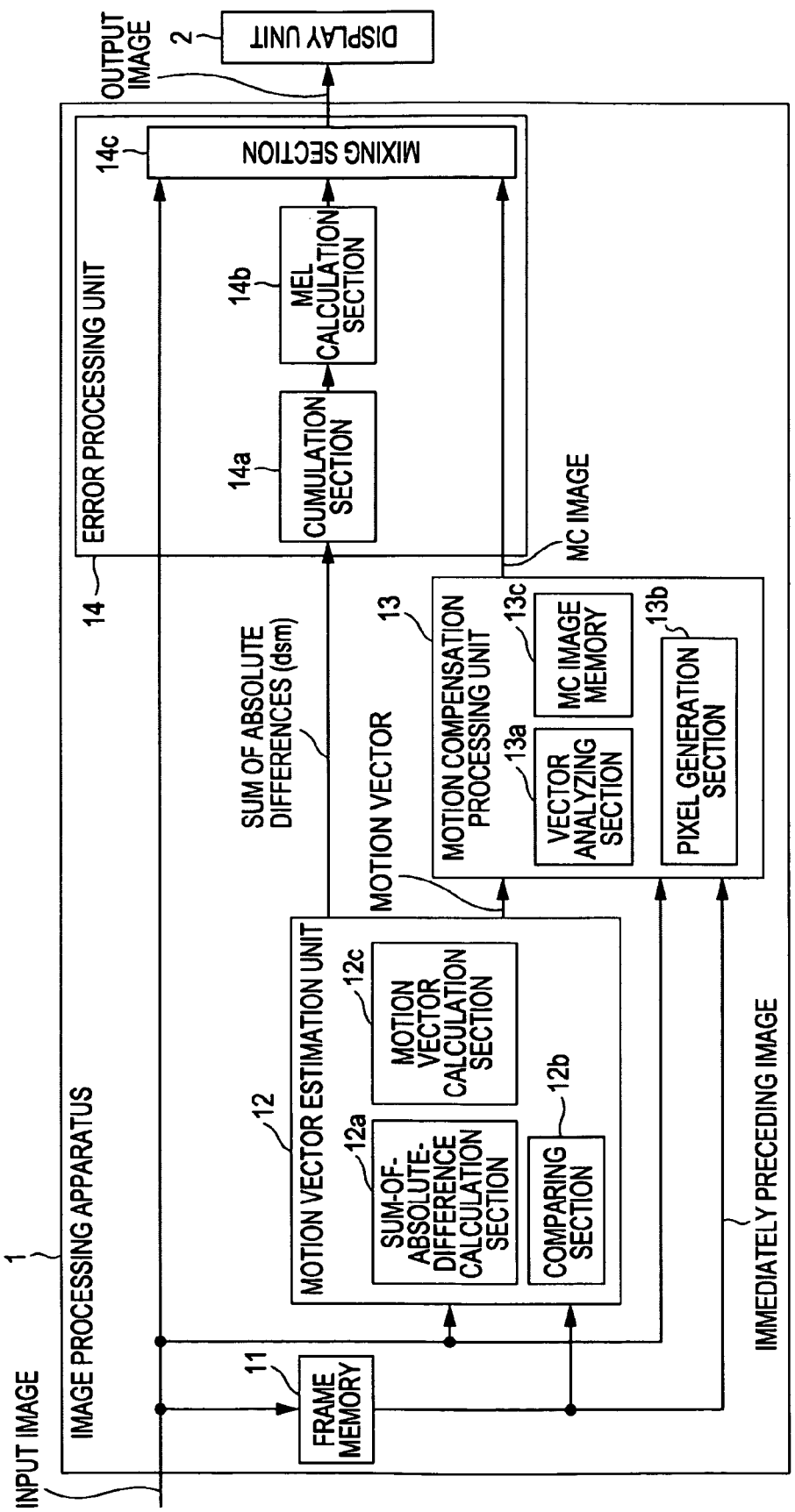
FIG. 1 is a block diagram showing an exemplary structure of an image processing apparatus according to the present invention.

FIG. 1 is an image processing apparatus showing a structure of one embodiment according to the present invention.

An image processing apparatus 1 shown in FIG. 1 generates an interpolation image using an input image which is one of moving images having a predetermined frame rate, and displays moving images having a different frame rate on a display unit 2 constituted by a liquid crystal display (LCD) and the like.

The input image is temporarily stored in a frame memory 11. The frame memory 11 supplies an image preceding the input image by one frame (hereinafter referred to as an immediately preceding image) to a motion vector estimation unit 12 and a motion compensation processing unit 13.

The motion vector estimation unit 12 includes a sum-of-absolute-difference calculation section 12a, a comparing section 12b, and a motion vector calculation section 12c. For each of pixels in the input image, a motion vector for the pixel is calculated by the motion vector estimation unit 12 using the input image and the immediately preceding image. More particularly, the sum-of-absolute-difference calculation section 12a reads pixels in a block of interest corresponding to a pixel of interest (a processing-target pixel) in the input image and pixels in reference blocks corresponding to pixels (reference pixels) in the immediately preceding image. For each of the reference blocks corresponding to one of the reference pixels, the sum-of-absolute-difference calculation section 12a calculates a sum of absolute differences between pixel values at pixel positions in the block of interest and pixel values at corresponding pixel positions in the reference block. The comparing section 12b compares sums of absolute differences, each of which is obtained for one of the reference pixels, determines a reference pixel whose sum of absolute differences is minimum, and supplies information regarding the reference pixel whose sum of absolute differences is minimum to the motion vector calculation section 12c. The motion vector calculation section 12c calculates a motion vector using the pixel of interest in the input image and the reference pixel whose sum of absolute differences is minimum, and supplies the motion vector to the motion compensation processing unit 13.

The motion compensation processing unit 13 includes a vector analyzing section 13a, a pixel generation section 13b, and a motion compensation (MC) image memory 13c. The motion compensation processing unit 13 executes motion compensation processing using the input image, the immediately preceding image, and motion vectors, generates an MC image (motion-compensated image), and supplies the MC image to an error processing unit 14. More specifically, by analyzing the motion vectors, which are supplied from the motion vector estimation unit 12, for the pixels in the input image, the vector analyzing section 13a searches for a pixel in the input image and a pixel in the immediately preceding image for each of pixels in the MC image, the pixel in the input image and the pixel in the immediately preceding image being necessary to generate the pixel in the MC image. The pixel generation section 13b generates pixels in the motion-compensated image using pixels in the input memory and pixels in the immediately preceding image that have been searched for by the vector analyzing section 13a, and stores the generated pixels in the MC image memory 13c. Here, in this embodiment, the vector analyzing section 13a merely searches for pixels in the input image, and the pixel generation section 13b generates pixels in the motion-compensated image merely using pixels in the input image; however, as a matter of course, the vector analyzing section 13a may also search for pixels in the immediately preceding image and the pixel generation section 13b may use both of the pixels in the input image and the pixels in the immediately preceding image.

The error processing unit 14 includes a cumulation section 14a, a mean error level (MEL) calculation section 14b, and a mixing section 14c. The error processing unit 14 mixes the MC image and the input image using sums of absolute differences, each of the sums of absolute differences corresponding to the motion vector for one of the pixels in the input image. The error processing unit 14 outputs the mixed image to the display unit 2 and the mixed image is displayed thereon. More specifically, the cumulation section 14a cumulatively adds minimum sums of absolute differences, each of the minimum sums of absolute differences being calculated when the motion vector for one of the pixels in the input image is obtained, and supplies a cumulative-sum result to the MEL calculation section 14b. The MEL calculation section 14b quantizes the cumulative-sum result, obtains a mean error level MEL in the MC image, and supplies the mean error level MEL to the mixing section 14c. The mixing section 14c mixes the input image and the MC image according to the mean error level MEL and outputs the mixed image to the display unit 2, and the mixed image is displayed thereon.

Next, image processing will be described with reference to a flowchart shown in FIG. 2.

In step S11, it is determined, using the frame memory 11, whether an input image has been input, and this process is repeated until it is determined that the input image has been input. In step S11, for example, if the input image exists, in step S12, the input image is temporarily stored in the frame memory 11, and an input image stored as the immediately preceding image at the time immediately before the input image is supplied from the frame memory 11 to the motion vector estimation unit 12 and the motion compensation processing unit 13. By performing this process, the input image and the immediately preceding image are supplied to the motion vector estimation unit 12 and the motion compensation processing unit 13, and just the input image is supplied to the error processing unit 14. Here, if there is no immediately preceding image, after the input image is stored in step S12, it is not possible to realize processes in step S13 and thereafter until the input image and the immediately preceding image can be supplied to the motion vector estimation unit 12 and the motion compensation processing unit 13, whereby the procedure returns to step S11.

In step S13, the motion vector estimation unit 12 executes motion vector estimation processing, and, for each of the pixels in the input image, the motion vector estimation unit 12 estimates a motion vector for the pixel in the input image, supplies the motion vector to the motion compensation processing unit 13, and supplies the sum of absolute differences to the error processing unit 14, the sum of absolute differences being calculated when the motion vector is estimated.

Figure 3:
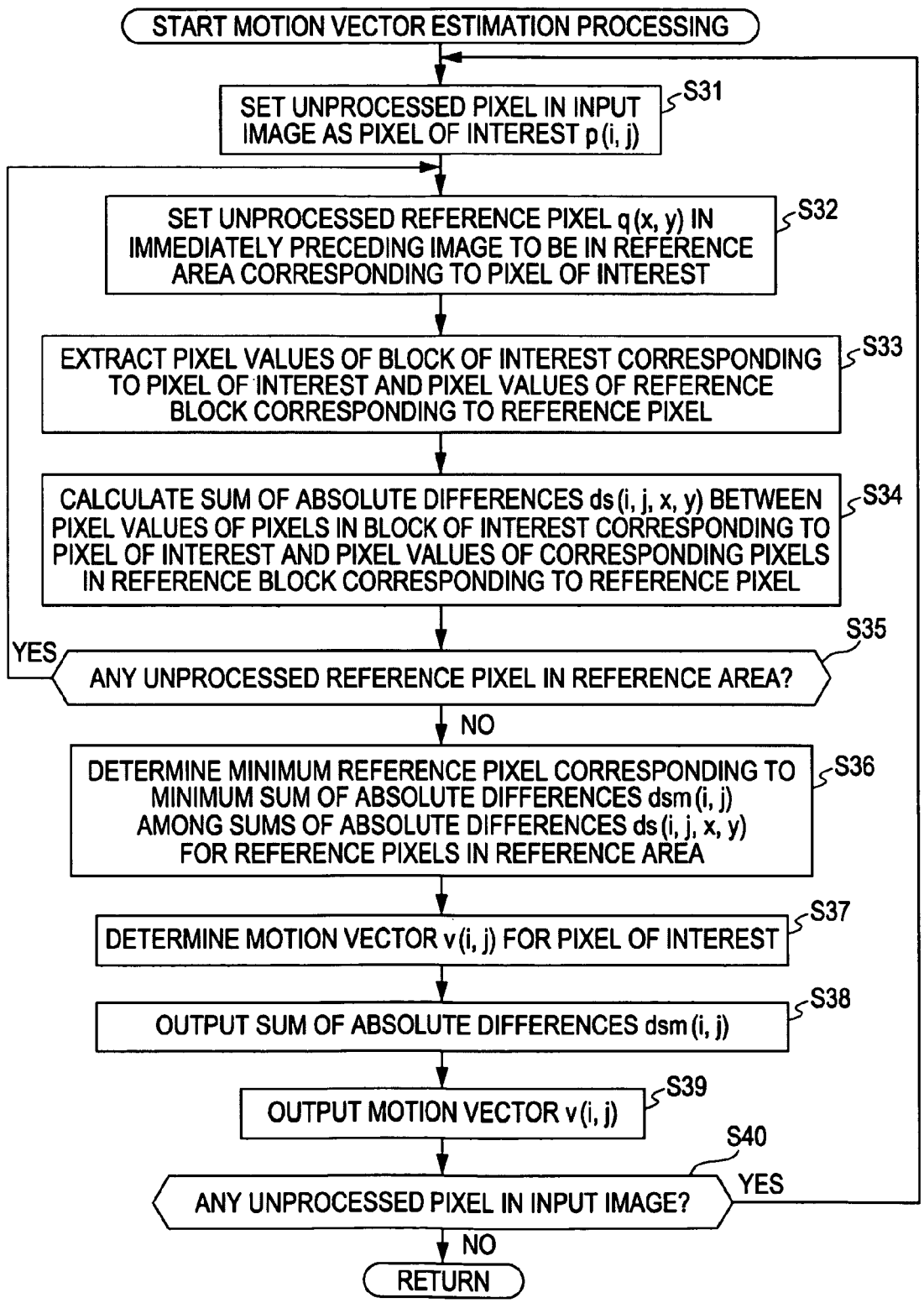
FIG. 3 is a flowchart illustrating motion vector estimation processing performed by the image processing apparatus shown in FIG. 1.

Here, motion vector estimation processing will be described with reference to a flowchart shown in FIG. 3.

In step S31, the sum-of-absolute-difference calculation section 12a sets an unprocessed pixel in the input image as a pixel of interest p(i, j) which is a processing target. Here, (i, j) represents position coordinates of a pixel in the input image.

Figure 4:
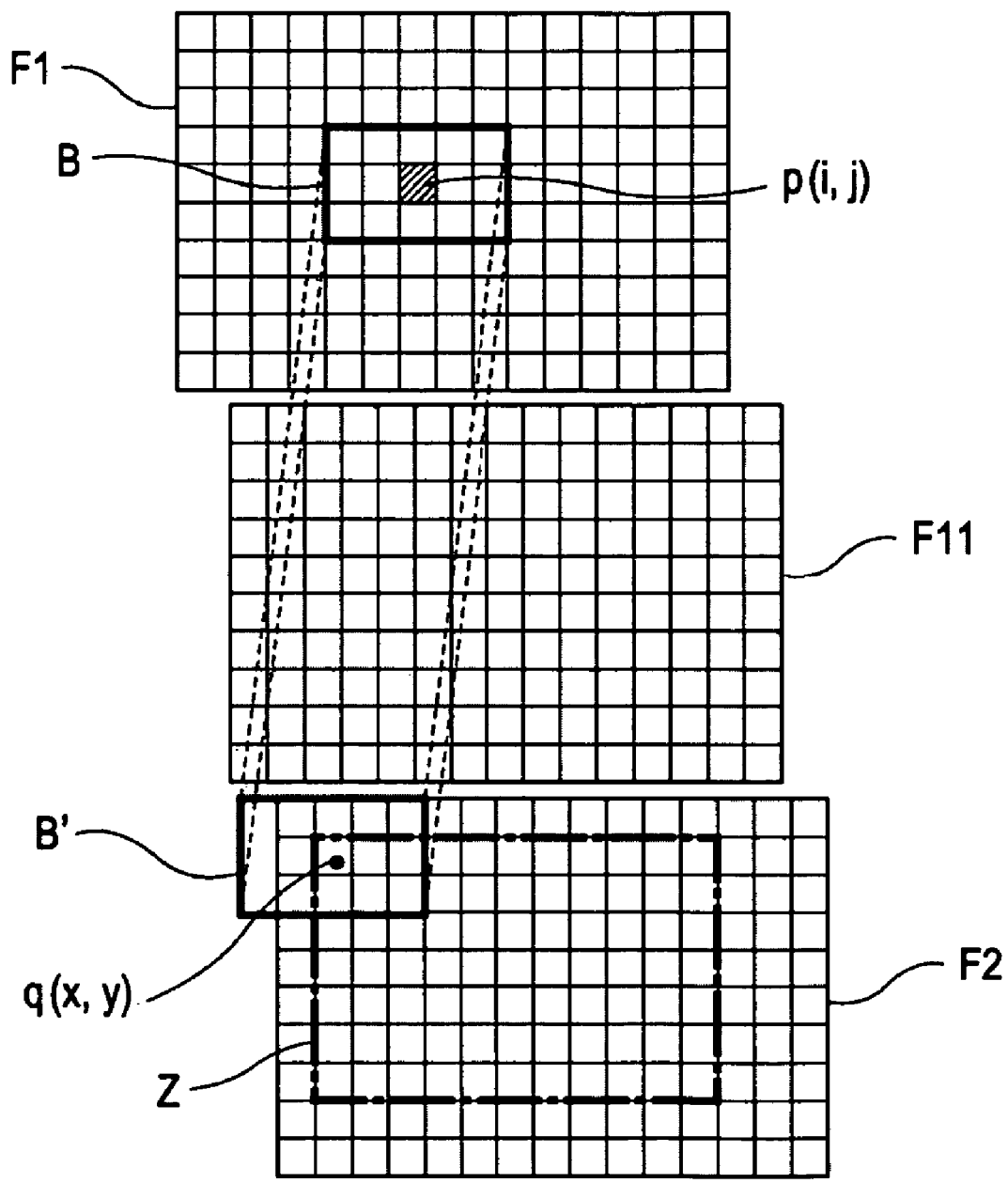
FIG. 4 is a diagram illustrating the motion vector estimation processing performed by the image processing apparatus shown in FIG. 1.

In step S32, the sum-of-absolute-difference calculation section 12a sets an unprocessed reference pixel q(x, y) in the immediately preceding image to be in a reference area corresponding to the pixel of interest. That is, for example, as shown in a shaded area in FIG. 4, a reference pixel q(x, y) in an immediately preceding image F2 is set to be in a reference area Z defined by an alternate-long-and-short-dash line in FIG. 4, the reference pixel q(x, y) in the immediately preceding image F2 corresponding to the pixel of interest p(i, j) in an input image F1 and the reference area Z being set corresponding to the pixel of interest p(i, j). As the reference area Z, an area is set to which the pixel of interest p(i, j) is allowed to move, that is, an area is set which includes reference pixels q(x, y), each of which may be the endpoint of a motion vector when the pixel of interest p(i, j) is the starting point of the motion vector. Here, the image F1 shown at the upper part of FIG. 4 represents the input image, and the image F2 represents the immediately preceding image. In addition, an image F11 represents an MC image to be generated. In addition, each of cells represents a pixel, and (x, y) represents position coordinates of a pixel in the immediately preceding image.

In step S33, the sum-of-absolute-difference calculation section 12a extracts pixel values of pixels constituting a block of interest B corresponding to the pixel of interest p(i, j) and pixel values of pixels constituting a reference block B' corresponding to a reference pixel. That is, in a case shown in FIG. 4, the block of interest B corresponding to the pixel of interest p(i, j) is a block of a plurality of pixels indicated by a thick line in the input image F1, and the reference block B' is a block of a plurality of pixels indicated by a thick line in the immediately preceding image F2. In FIG. 4, the block of interest B and the reference block B' are each a block of fifteen pixels.

In step S34, the sum-of-absolute-difference calculation section 12a calculates a sum of absolute differences, each of the absolute differences being obtained between one of the pixels at a position in the block of interest B and one of the pixels at a corresponding position in the reference block B'. That is, in the case shown in FIG. 4, the sum-of-absolute-difference calculation section 12a obtains a sum of absolute differences ds(i, j) for the pixel of interest p(i, j) by performing a calculation expressed by Eq. (1) given below.

$$ds(i, j, x, y) = \Sigma |p(i-a, j-b) - q(x-a, y-b)| \qquad (1)$$

where a=-2, -1, 0, 1, 2, and b=-1, 0, 1.,

In Eq. (1), $\Sigma|A|$ denotes a sum of absolute values A, each of the absolute values A being obtained using one of combinations of variables a and b. Here, the variable a may be -2, -1, 0, 1, or 2, and the variable b may be -1, 0, or 1. That is, Eq. (1) denotes that a sum of absolute differences is obtained, each of the absolute differences is obtained with respect to one of the fifteen pixels.

In step S35, the sum-of-absolute-difference calculation section 12a determines whether there is any unprocessed pixel in the reference area Z. If there are one or more unprocessed pixels therein, the procedure returns to step S32. That is, processes in steps S32 through S35 are repeatedly performed until all the pixels in the reference area Z are each set as a reference pixel q(x, y) and sums of absolute differences ds(i, j, x, y) are obtained for all the pixels in the reference area Z, the reference area Z being set corresponding to the pixel of interest p(i, j).

In step S35, if the sum-of-absolute-difference calculation section 12a determines that there is no unprocessed pixel in the reference area Z, that is, if sums of absolute differences are obtained for all the pixels in the reference area Z, each of the sums of absolute differences being obtained for one of the pixels in the reference area Z, the procedure proceeds to step S36.

Figure 5:
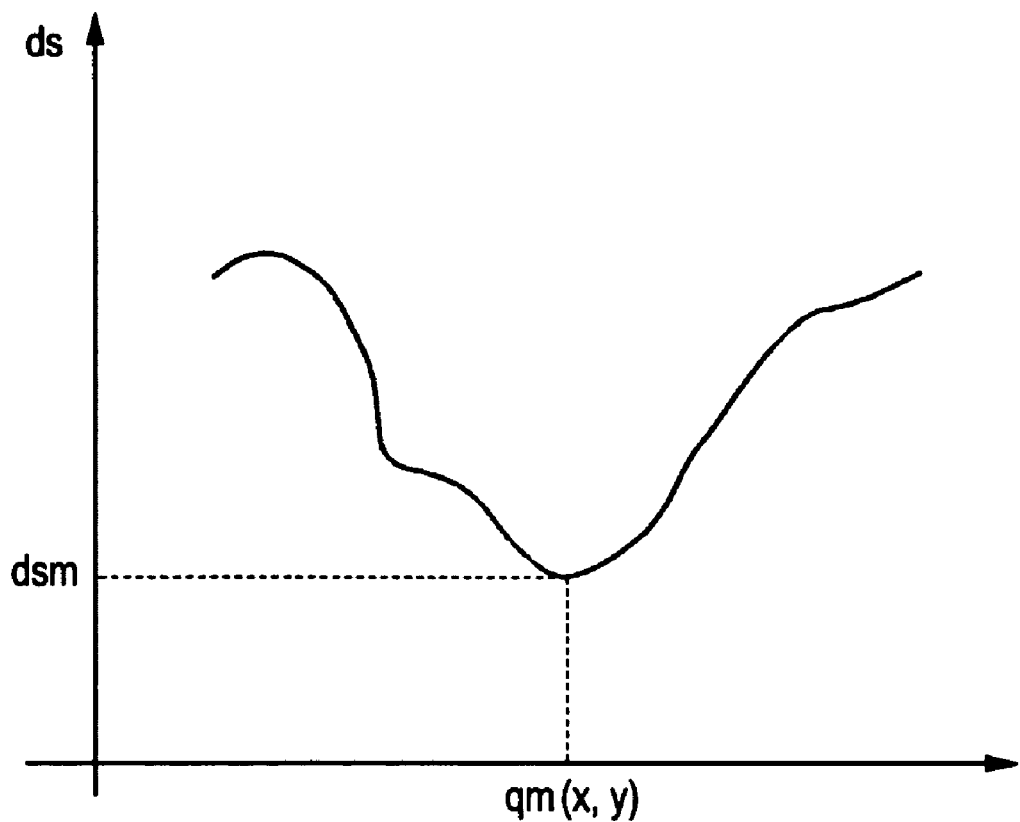
FIG. 5 is a diagram illustrating the motion vector estimation processing performed by the image processing apparatus shown in FIG. 1.

In step S36, the comparing section 12b compares all of the sums of absolute differences ds(i, j, x, y) obtained for the pixel of interest p(i, j). The comparing section 12b determines a minimum sum of absolute differences dsm having a minimum value thereamong, and also determines a minimum reference pixel qm(x, y) corresponding to the minimum sum of absolute differences dsm. That is, for example, as shown in FIG. 5, when the horizontal axis represents reference pixel q(x, y) and the vertical axis represents sum of absolute differences ds, the comparing section 12b sets a reference pixel q(x, y) whose sum of absolute differences ds is minimum as the minimum reference pixel qm(x, y), and sets the sum of absolute differences ds as the minimum sum of absolute differences dsm. Here, in the following description, this minimum sum of absolute differences dsm is referred to as the sum of absolute differences for the pixel of interest p(i, j) in the input image.

In step S37, the motion vector calculation section 12c calculates a motion vector v(i, j) using information regarding the pixel of interest p(i, j) and minimum reference pixel qm(x, y). That is, a motion vector is obtained by performing a calculation as expressed in Eq. (2) given below.

$$v(i, j) = (qmx - pi, qmy - pj) \quad (2)$$

Here, in Eq. (2), qmx represents a coordinate of the minimum reference pixel qm(x, y) in the horizontal direction, qmy represents a coordinate of the minimum reference pixel qm(x, y) in the vertical direction, pi represents a coordinate of the pixel of interest p(i, j) in the horizontal direction, and pj presents a coordinate of the pixel of interest p(i, j) in the vertical direction. Thus, Eq. (2) indicates that the motion vector v(i, j) is a vector whose starting point is the pixel of interest p(i, j) in the input image and whose endpoint is the minimum reference pixel qm(x, y) in the immediately preceding image.

In step S38, the comparing section 12b supplies the minimum sum of absolute differences dsm, as a sum of absolute differences dsm for the pixel of interest, to the error processing unit 14.

In step S39, the motion vector calculation section 12c supplies the motion vector v(i, j), which was calculated, of the pixel of interest p(i, j) to the motion compensation processing unit 13.

In step S40, the sum-of-absolute-difference calculation section 12a determines whether there is any unprocessed pixel in the input image. If there are one or more unprocessed pixels therein, the procedure returns to step S31. That is, processes in steps S31 through S40 are repeatedly performed until motion vectors and minimum sums of absolute differences are obtained for all the pixels in the input image. In step S40, if there is no unprocessed pixel therein, that is, the motion vectors are obtained for all the pixels in the input image, the procedure is completed.

By performing the above-described processing, for each of all the pixels in the input image, a reference pixel whose sum of absolute differences is minimum among sums of absolute differences is set as the endpoint of a motion vector for the pixel, to which a pixel of interest is set, and the motion vector for the pixel of interest is obtained. Here, each of the sums of absolute differences is obtained between pixel values at pixel positions in the block of interest for the pixel of interest and pixel values at corresponding pixel positions in the reference block set for one of reference pixels in the immediately preceding image. Thus, motion vectors for all the pixels in the input image can be obtained. Moreover, for each of the pixels in the input image, the minimum sum of absolute differences calculated when the motion vector for the pixel in the input image is obtained is supplied to the error processing unit 14 as the sum of absolute differences dsm for the pixel in the input image.

Figure 2:
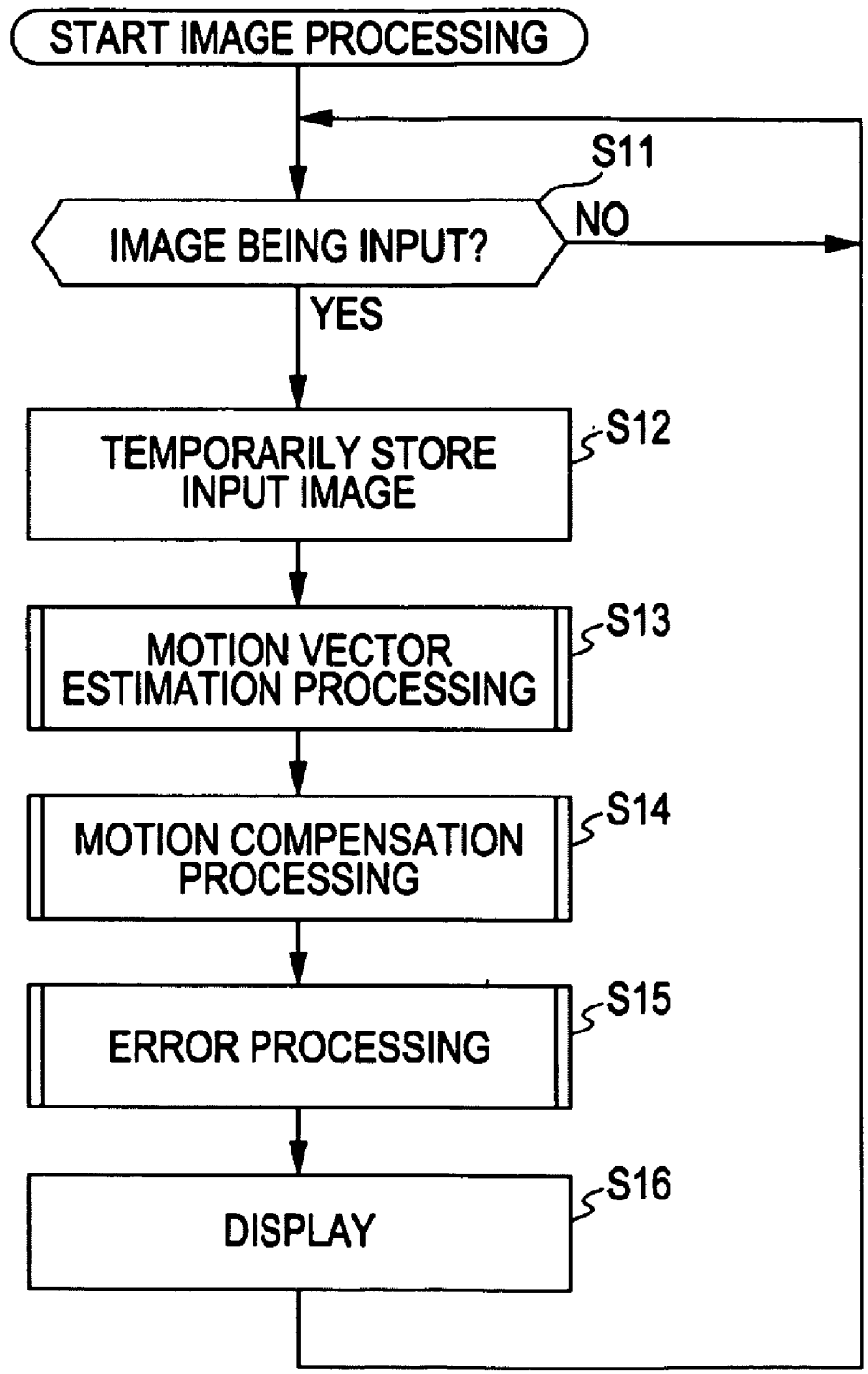
FIG. 2 is a flowchart illustrating image processing.

Here, please refer to the flowchart shown in FIG. 2.

When the motion vector estimation processing is completed in step S13, the motion compensation processing unit 13 executes motion compensation processing, generates the MC image, and supplies the MC image to the error processing unit 14 in step S14.

Figure 6:
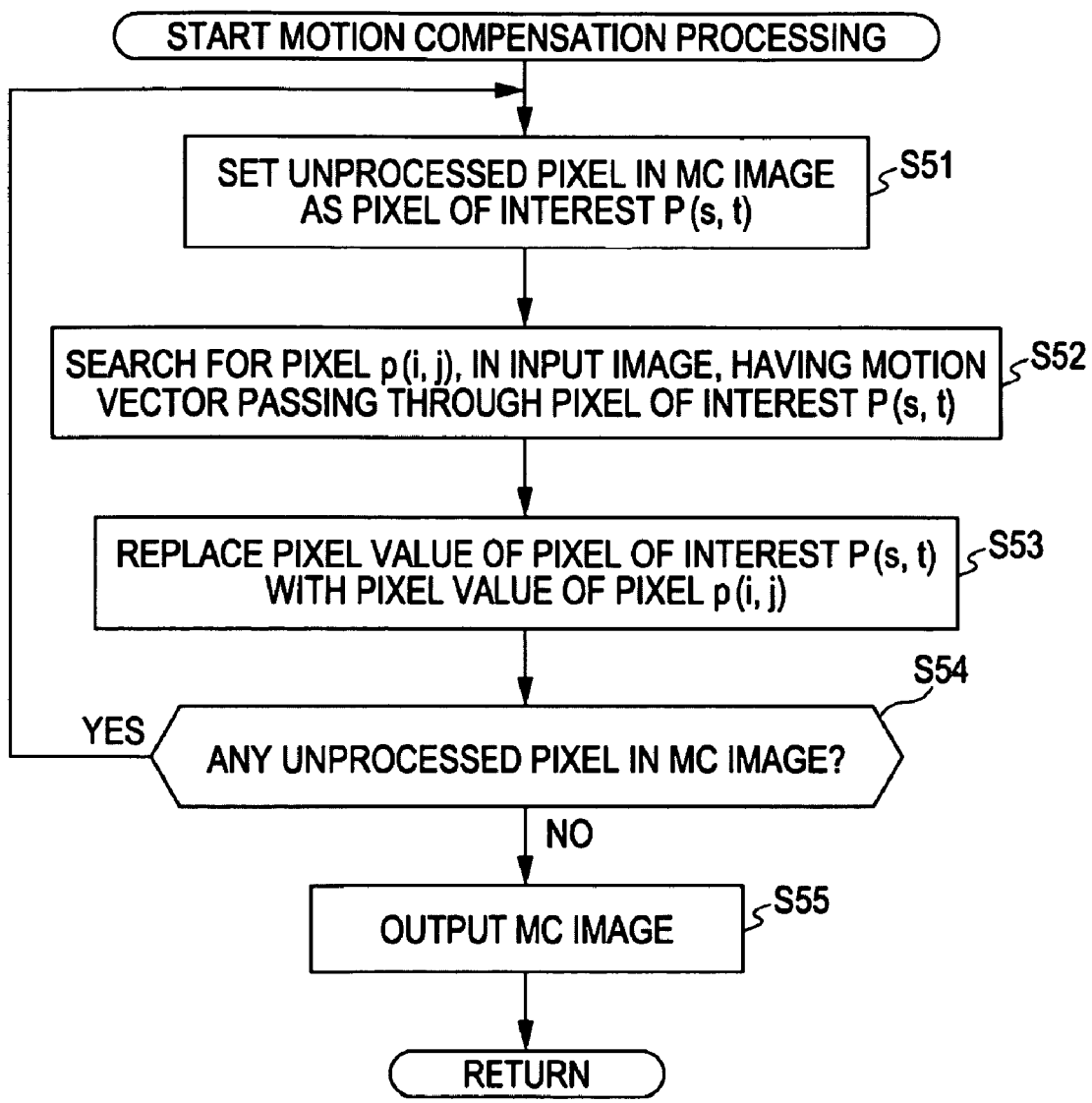
FIG. 6 is a flowchart illustrating motion compensation processing.

Here, the motion compensation processing will be described with reference to a flowchart shown in FIG. 6.

In step S51, the motion compensation processing unit 13 sets a pixel in the MC image as a pixel of interest P(s, t). Here, the pixel in the MC image has not yet been generated, but is to be generated by performing interpolation, and hereinafter is simply referred to as an unprocessed pixel in the MC image.

In step S52, the vector analyzing section 13a analyzes motion vectors for the input image supplied from the motion vector estimation unit 12, and searches for a pixel p(i, j), in the input image, having a motion vector that passes through the pixel of interest P(s, t).

Figure 7:
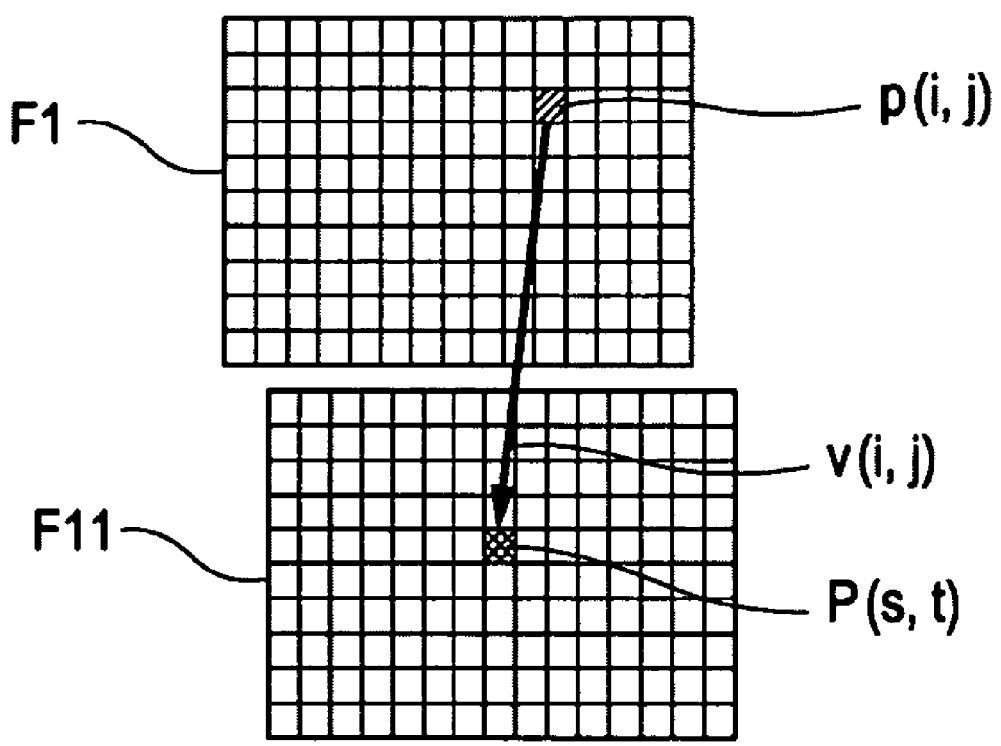
FIG. 7 is a diagram illustrating motion compensation processing.

That is, for example, as shown in FIG. 7, the vector analyzing section 13a searches for a pixel p(i, j), in the input image, having a motion vector v(i, j) that passes through the pixel of interest P(s, t) in the MC image F11. Here, in FIG. 7, the motion vector that passes through the pixel of interest P(s, t) in the MC image F11 is shown from among motion vectors v(i, j), each of which has been obtained for one of the pixels p(i, j) in the input image F1 in the manner described above with reference to FIG. 4.

In step S53, the pixel generation section 13b reads the pixel value of the pixel p(i, j), which has been searched for, in the input image F1 as the pixel value of the pixel of interest P(s, t) in the MC image F11, and stores the read pixel value in the MC image memory 13c. That is, in this example, the pixel generation section 13b generates the pixel of interest P(s, t) in the MC image F11 by simply setting the pixel value of the pixel p(i, j) in the input image F1 as the pixel value of the pixel of interest P(s, t) in the MC image F11. Here, the pixel value of the pixel p(i, j) is the starting point of the motion vector v(i, j) and the pixel of interest P(s, t) corresponds to the pixel of interest p(i, j). However, as long as a pixel determined using the motion vector v(i, j) is used, the pixel of interest P(s, t) may be, for example, the average of the pixel values of the pixels p(i, j) which is the starting point of the motion vector v(i, j) and q(x, y) which is the endpoint of the motion vector v(i, j) and is in the immediately preceding image, that is, (p+q)/2, p representing the pixel value of the pixel p(i, j) and q representing the pixel value of the pixel q(x, y), may be used. Alternatively, the pixel of interest P(s, t) may be, for example, a weighted average of the pixel values of the pixels p(i, j) and q(x, y), the weighed average being obtained using a ratio based on a temporal distance between the MC image and the input image and a temporal distance between the MC image and the immediately preceding image, that is, w×p+(1−w)×q, p representing the pixel value of the pixel p(i, j), q representing the pixel value of the pixel q(x, y), and w(0≦w≦1) representing a weighting factor.

In step S54, the motion compensation processing unit 13 determines whether there is any unprocessed pixel in the MC image to be generated by performing interpolation. For example, if there are one or more pixels therein, the procedure returns to step S51. That is, processes in steps S51 through S54 are repeatedly performed until, for each of all pixels in the MC image to be generated by performing interpolation, the pixel value of the pixel in the MC image is replaced with the pixel value of a pixel in the input image, the pixel in the input image being the starting point of a motion vector that passes through the pixel in the MC image. In step S54, if there is no unprocessed pixel therein, that is, for each of all the pixels in the MC image, the pixel value of the pixel in the MC image has been replaced with the pixel value of a pixel in the input image, the pixel in the input image being the starting point of a motion vector that passes through the pixel in the MC image, in step S55, the motion compensation processing unit 13 reads data regarding the MC image, the data being stored in the MC image memory 13c, and supplies it to the error processing unit 14.

By performing the above-described processing, the MC image is generated from the input image by performing the motion compensation processing, that is, motion compensation is realized between the MC image and the input image, and the MC image is supplied to the error processing unit 14.

Here, please refer to the flowchart shown in FIG. 2.

In step S14, when the motion compensation processing is executed and the MC image is generated, in step S15, the error processing unit 14 executes error processing and mixes the MC image and the input image using the sums of absolute differences supplied from the motion vector estimation unit 12, each of the sums of absolute differences being obtained when a motion vector for a corresponding one of the pixels in the input image is estimated, and the mixed image is displayed on the display unit 2.

Figure 8:
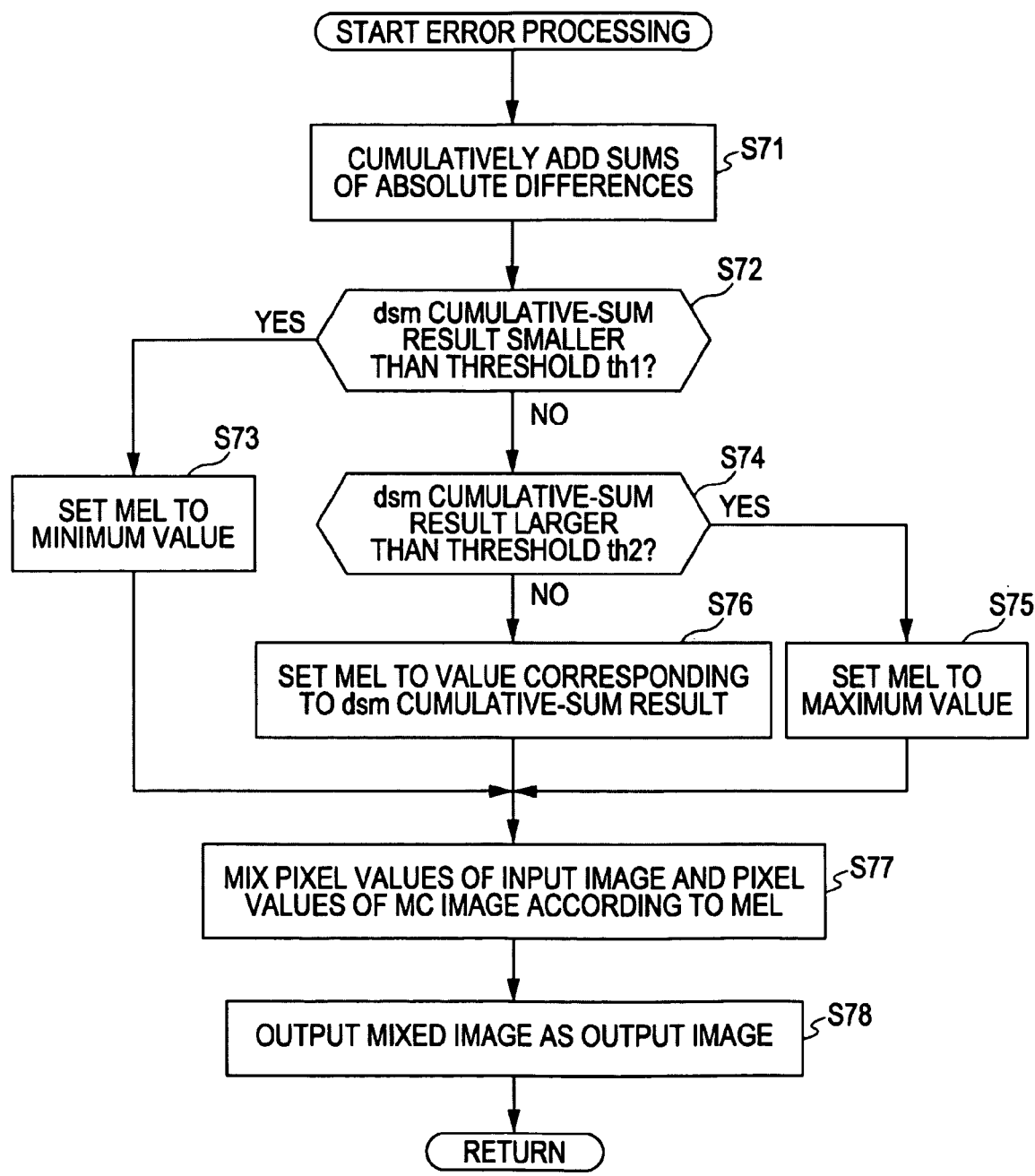
FIG. 8 is a flowchart illustrating error processing performed by the image processing apparatus shown in FIG. 1.

Here, error processing will be described with reference to a flowchart shown in FIG. 8.

In step S71, the cumulation section 14a cumulatively adds the sums of absolute differences (dsm) supplied from the motion vector estimation unit 12, each of the sums of absolute differences dsm is obtained between pixel values of the pixels at pixel positions in the block of interest at the starting point of the motion vector and pixel values of the pixels at corresponding pixel positions in the reference block at the endpoint of the motion vector. The error processing unit 14 performs normalization by dividing a resulting sum, for example, by a maximum value, and supplies a normalized value as a dsm cumulative-sum result to the MEL calculation section 14b.

In step S72, the MEL calculation section 14b compares the dsm cumulative-sum result with a threshold th1, and determines whether the dsm cumulative-sum result is smaller than the threshold th1. For example, if the dsm cumulative-sum result is smaller than the threshold th1, in step S73, the MEL calculation section 14b sets a mean error level MEL of the MC image to a minimum value, and supplies it to the mixing section 14c.

On the other hand, in step S72, for example, if the dsm cumulative-sum result is not smaller than the threshold th1, in step S74, the MEL calculation section 14b compares the dsm cumulative-sum result with a predetermined threshold th2 (>th1) and determines whether the dsm cumulative-sum result is larger than the threshold th2.

In step S74, for example, if the dsm cumulative-sum result is larger than the threshold th2, in step S75, the MEL calculation section 14b sets the mean error level MEL of the MC image to a maximum value and supplies it to the mixing section 14c.

Moreover, in step S74, for example, if the dsm cumulative-sum result is not larger than the threshold th2, in step S76, the MEL calculation section 14b multiplies the dsm cumulative-sum result by a predetermined coefficient, sets a resulting value as the mean error level MEL, and then supplies it to the mixing section 14c.

Figure 9:
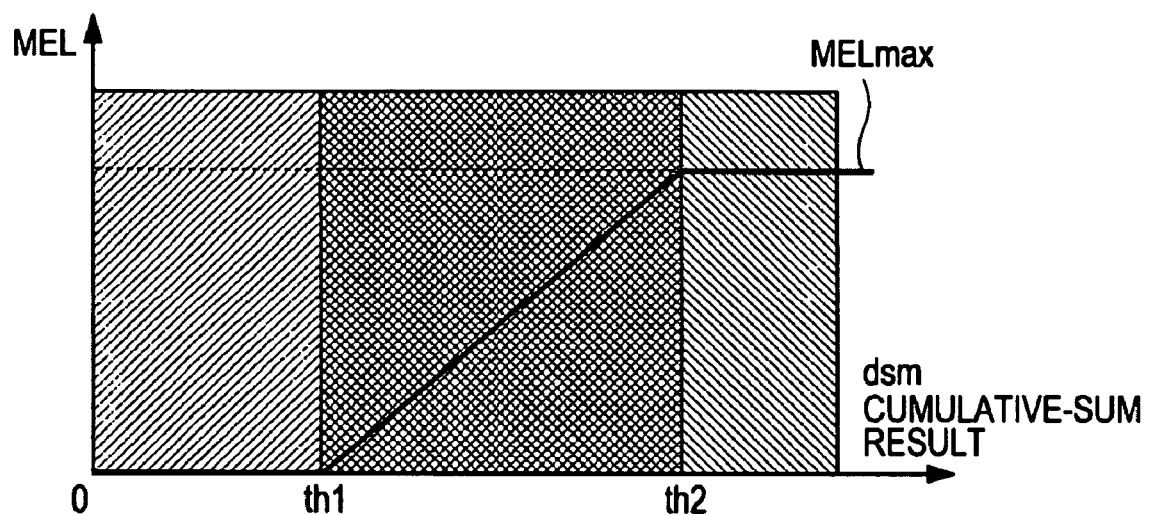
FIG. 9 is a diagram illustrating error processing performed by the image processing apparatus shown in FIG. 1.

That is, for example, as shown in FIG. 9, if the dsm cumulative-sum result is smaller than the threshold th1, the mean error level MEL is set to a minimum value, 0, and if the dsm cumulative-sum result is larger than the threshold th2, the mean error level MEL is set to a maximum value, an MELmax. If the dsm cumulative-sum result is not smaller than the threshold th1 and not larger than the threshold th2, the mean error level MEL is set to a value between 0 and the MELmax which changes linearly according to the dsm cumulative-sum result.

In this way, the mean error level MEL is set to a value proportional to the dsm cumulative-sum result, which is obtained by cumulatively adding the sums of absolute differences dsm, each of the sums of absolute differences dsm indicating the magnitude of a change of a corresponding pixel value.

Figure 10:
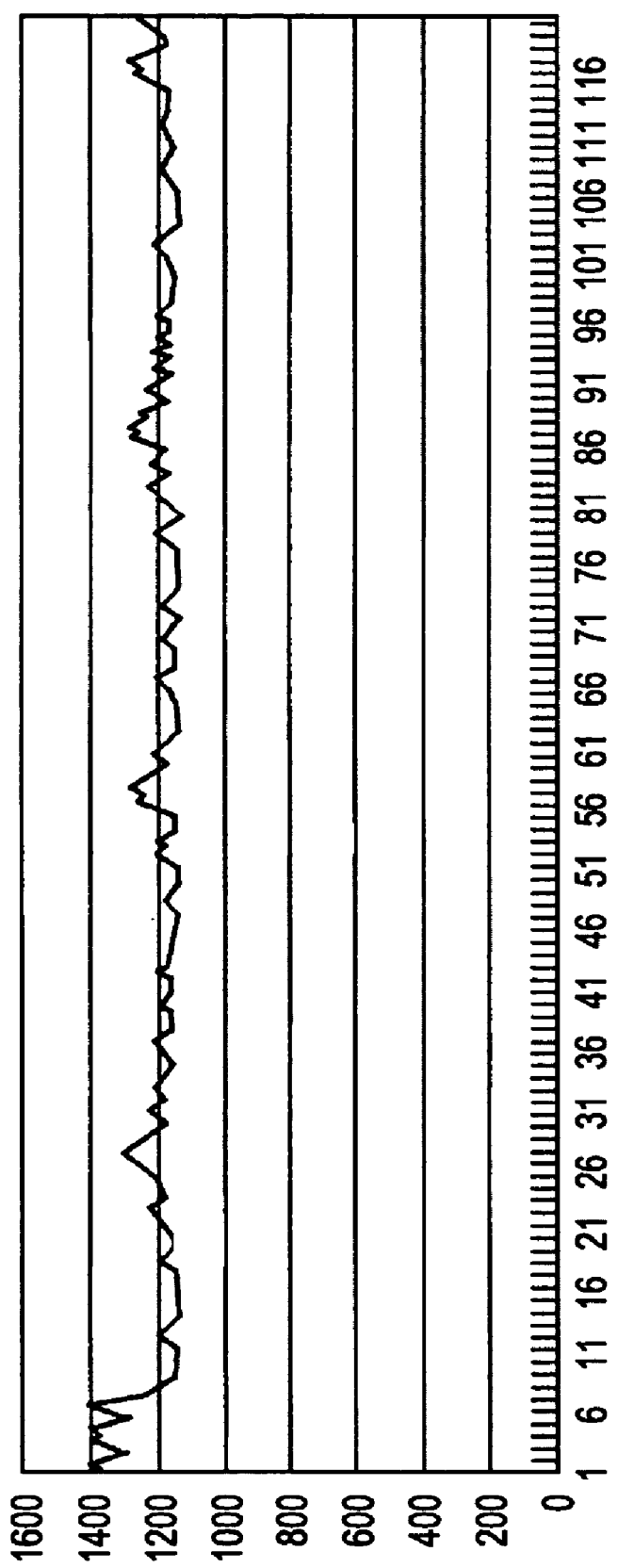
FIG. 10 is a plan view for describing a dsm cumulative-sum result in images in which a scene change occurs or in which an object moves fast.
Figure 11:
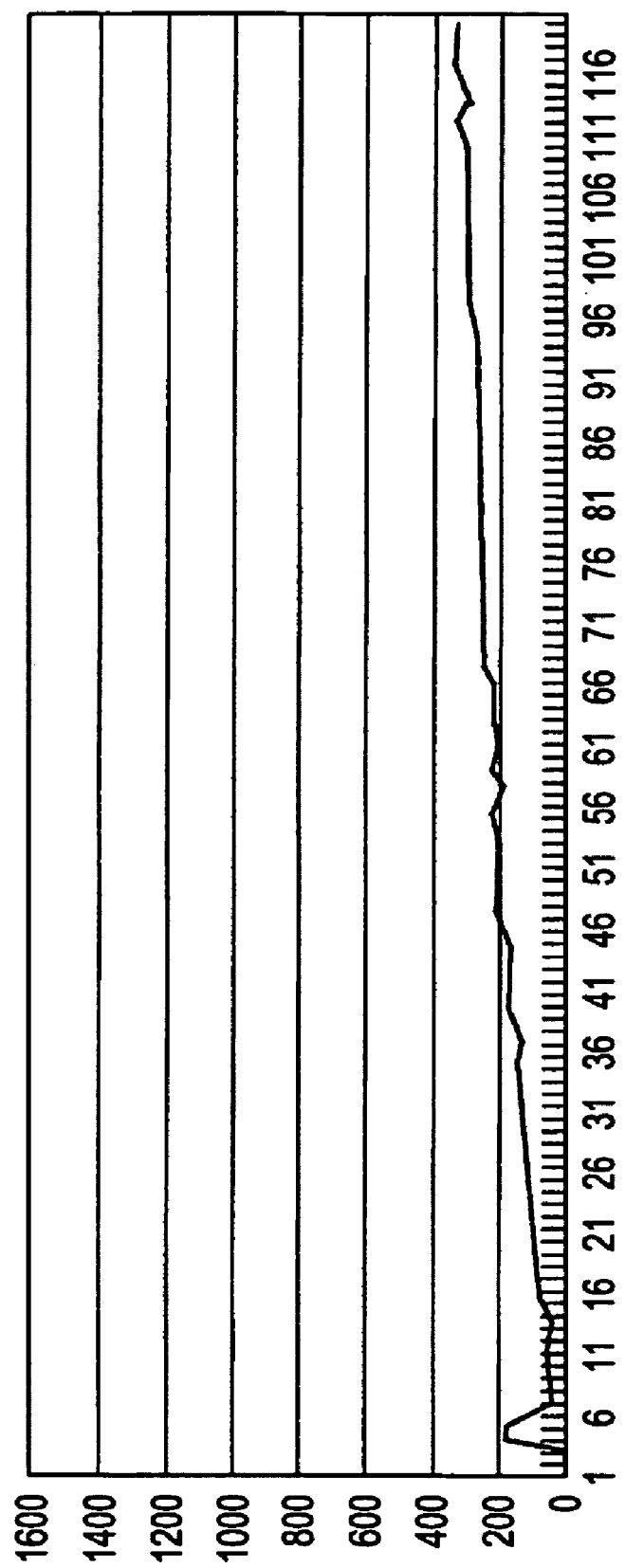
FIG. 11 is a plan view for describing a dsm cumulative-sum result in images in which no scene change occurs or in which an object moves slow.

In a case of a series of images in which it is not possible to follow a subject using a motion vector because, for example, a scene change occurs or the subject in the images moves too fast, as shown in FIG. 10, the dsm cumulative-sum result has a large value. In a case of a series of images in which, for example, no scene change occurs and a subject can be followed in a frame using a motion vector, as shown in FIG. 11, the dsm cumulative-sum result has a small value. That is, it is indicated that in the case of a series of images in which no scene change occurs and a subject can be followed in a frame using a motion vector, as shown in FIG. 11, the dsm cumulative-sum result fluctuates around 200 as one frame changes to another; however, in the case of a series of images in which it is not possible to follow a subject using a motion vector because, for example, a scene change occurs or the subject in the images moves too fast, as shown in FIG. 10, the dsm cumulative-sum result fluctuates around 1200. Here, in FIGS. 10 and 11, the horizontal axis represents frame number and the vertical axis represents dsm cumulative-sum result. Moreover, FIGS. 10 and 11 show examples in which the dsm cumulative-sum result is obtained in cases in which the value used to perform normalization is constant.

That is, when a minimum value among the sums of absolute differences is large, each of the sums of absolute differences being obtained between the pixel values of pixels to which a motion vector is set, and a difference between the input image and the immediately preceding image is large, the mean error level MEL becomes large. Thus, it is assumed that the reliability of a motion vector is low. If the mean error level MEL is small, a minimum value among the sums of absolute differences is small, each of the sums of absolute differences being obtained between the pixel values of pixels to which a motion vector is set, and a difference between the input image and the immediately preceding image is small. Thus, it is assumed that, with a certain degree of accuracy, a subject can be followed by a motion vector and the reliability of the motion vector is high.

In step S77, the mixing section 14c mixes all pixels in the input image and corresponding pixels in the MC image according to the mean error level MEL, and generates a mixed image. That is, the mixing section 14c mixes pixels by performing a calculation as expressed in Eq. (3) given below.

$$Pe=(P(i,j)\times(\text{MELmax}-\text{MEL})+p(i,j)\times\text{MEL})/\text{MELmax} \quad (3)$$

In Eq. (3) given above, Pe represents a pixel generated by a mixing operation, P(i, j) represents the pixel value of a pixel P(i, j) in the MC image, p(i, j) represents the pixel value of a pixel p(i, j) in the input image, MEL represents a mean error level, and MELmax represents the maximum value of the mean error level MEL.

In step S78, the mixing section 14c outputs the mixed image, as an output image, to the display unit 2.

Here, please refer to the flowchart shown in FIG. 2.

In step S16, the display unit 2 displays the output image supplied from the error processing unit 14, and the procedure returns to step S11 and steps thereafter are repeatedly performed.

Here, in the above-described processing, processing in which the input image and the immediately preceding image are used has been described; however, different images may be used as long as the images are obtained at different times. For example, the images may be the input image and an immediately following image, or may be the image which is two frames before the input image and the input image. Moreover, an example in which two images of the input image and immediately preceding image are used has been described; however, three or more images may be used. For example, processing in which the input image, the immediately preceding image, and the immediately following image are used may be performed, or processing in which four or more images are used may be performed.

In the above-described processing, with respect to an image whose motion vectors have high reliability because no scene change occurs and in which a subject moves within a frame, an image, a high proportion of which is the MC image, is output, the MC image being generated by performing the motion compensation processing, and in contrast, in a case in which it is not possible to follow a movement of a subject using a motion vector and whose motion vectors have low reliability because a scene change occurs or the subject moves to an area outside a frame, an image, a high proportion of which is the input image, is output. Thus, with respect to an image whose motion vectors have high reliability, an image, a high proportion of which is the image obtained by performing the motion compensation processing, is generated by performing interpolation and is displayed; however, with respect to an image whose motion vectors have low reliability, an image, a high proportion of which is the input image, is generated by performing interpolation.

As a result, even in interpolation-image generation processing employing the motion compensation processing using a motion vector obtained in an image whose changes in brightness are large and which tends to be distorted, when an interpolation image is generated, the distortion of the image which is generated by performing interpolation can be reduced.

In the description above, an example of block matching between two frames has been described in which, when a motion vector is estimated, reference pixels are set in an area which may include endpoints of motion vectors with respect to a pixel of interest which is the starting point of the motion vectors and, by obtaining the sums of absolute differences dsm, each of which is obtained between pixel values of the pixels at pixel positions in the block of interest and pixel value of the pixels at corresponding pixel positions in the reference block, a reference pixel having the minimum sum of absolute differences dsm is set as the endpoint of the motion vector for the pixel of interest. However, distortion in an image generated by performing interpolation may be reduced by performing the same processing in frame-recursive block matching in which, by setting a smaller area of reference pixels corresponding to a pixel of interest, block matching is performed recursively over a plurality of frames and the accuracy of a motion vector for the pixel of interest can be gradually improved.

Figure 12:
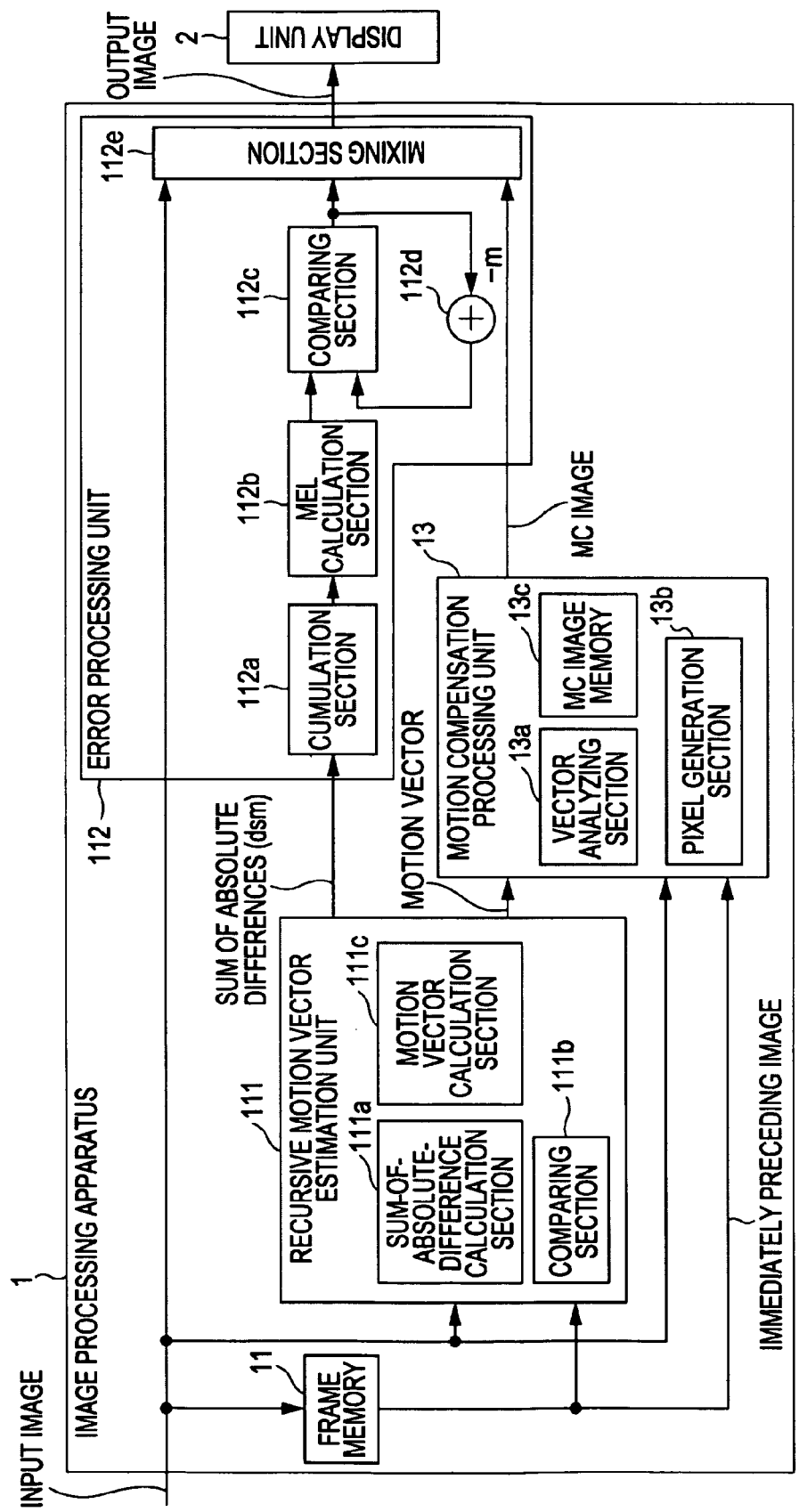
FIG. 12 is a block diagram showing an exemplary structure of another image processing apparatus according to the present invention.

FIG. 12 is a diagram showing an exemplary structure according to another embodiment of an image processing apparatus which is designed to obtain a motion vector by performing frame-recursive block matching. Here, in the image processing apparatus shown in FIG. 12, components having substantially the same functions as those provided in the image processing apparatus 1 shown in FIG. 1 will be referred to by the same names and denoted by the same reference numerals. The description thereof will be omitted as necessary.

That is, the image processing apparatus 1 shown in FIG. 12 differs from the image processing apparatus 1 shown in FIG. 1 in that a recursive motion vector estimation unit 111 and an error processing unit 112 are provided instead of the motion vector estimation unit 12 and the error processing unit 14.

The recursive motion vector estimation unit 111 includes a sum-of-absolute-difference calculation section 111a, a comparing section 111b, and a motion vector calculation section 111c. The recursive motion vector estimation unit 111 basically executes processing the same as that performed by the motion vector estimation unit 12; however, when a motion vector is estimated as described above, an area of reference pixels for a pixel of interest is set to be small and covers an area at and near a position corresponding to the pixel position of the pixel of interest. Thus, compared with the motion vector estimation unit 12, in two frame images, the recursive motion vector estimation unit 111 has a lower probability of detecting an accurate reference pixel, which is the endpoint of an accurate motion vector, whereby the recursive motion vector estimation unit 111 has a low probability of estimating the accurate motion vector. Thus, the recursive motion vector estimation unit 111 calculates a motion vector, the accuracy of which is gradually improved, by repeating the same processing recursively between frames.

The error processing unit 112 includes a cumulation section 112a, an MEL calculation section 112b, a comparing section 112c, an adding section 112d, and a mixing section 112e. Among these components, the cumulation section 112a, the MEL calculation section 112b, and the mixing section 112e execute processes substantially the same as those performed by the cumulation section 14a, the MEL calculation section 14b, and the mixing section 14c of the error processing unit 14, respectively. Here, in the following description, the mean error level MEL obtained by the error processing unit 14 will be referred to as a mean error level MELc. The comparing section 112c compares a value (MELp−m) with the mean error level MELc of the input image, the value (MELp−m) being obtained by subtracting a predetermined value m from a mean error level MELp of the immediately preceding image using the adding section 112d. The comparing section 112c outputs, as the mean error level MELc of the input image, a larger one of the value (MELp−m) and the mean error level MELc of the input image to the mixing section 112e, and also stores the mean error level MELc of the input image as the mean error level MELp of the immediately preceding image. In the processing thereafter, the mean error level MELp, which is stored, of the immediately preceding image is output to the adding section 112d. The mixing section 112e mixes the input image and the MC image according to the mean error level MELc of the input image and outputs a mixed image to the display unit 2, and the mixed image is displayed thereon.

Next, image processing performed by the image processing apparatus 1 shown in FIG. 12 will be described. Here, the image processing is basically the same as that described with reference to the flowchart shown in FIG. 2. Thus, description the same as that has been described with reference to FIG. 2 will be omitted. The image processing performed by the image processing apparatus 1 shown in FIG. 12 differs from the image processing performed by the image processing apparatus 1 shown in FIG. 1 in terms of the motion vector estimation processing and the error processing in the processing represented by the flowchart shown in FIG. 2. Thus, motion vector estimation processing and error processing performed by the image processing apparatus 1 shown in FIG. 12 will be described below.

Figure 13:
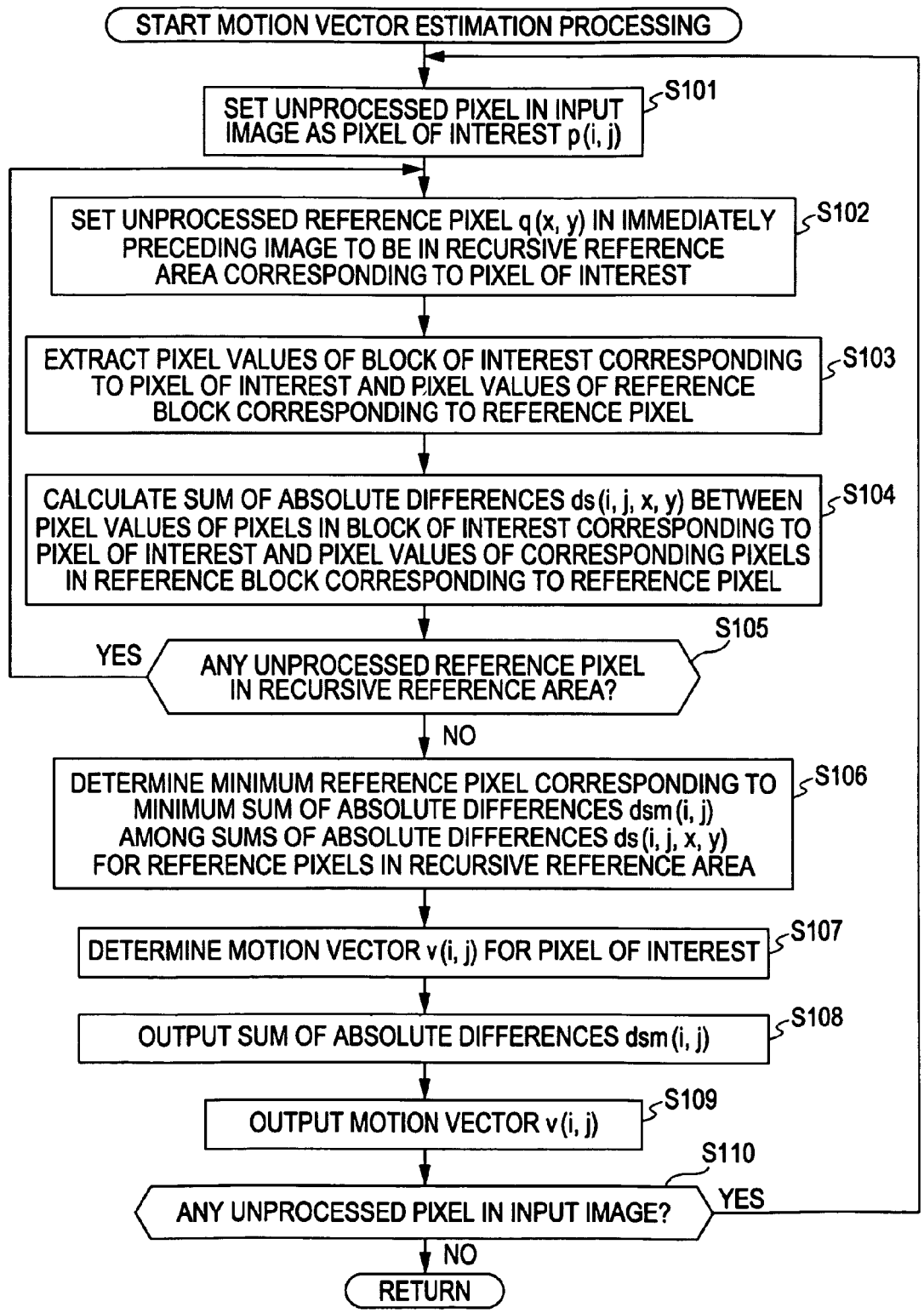
FIG. 13 is a flowchart illustrating motion vector estimation processing performed by the image processing apparatus shown in FIG. 12.

First, with reference to a flowchart shown in FIG. 13, the motion vector estimation processing performed by the image processing apparatus 1 shown in FIG. 12 will be described. Here, processes performed in step S101 and steps S106 through S110 in the flowchart shown in FIG. 13 are substantially the same as those performed in step S31 and steps S36 through 40 described with reference to the flowchart shown in FIG. 3. Thus, a description thereof will be omitted.

That is, in step S102, the sum-of-absolute-difference calculation section 111a sets an unprocessed reference pixel q(x, y) in the immediately preceding image within a recursive-use reference area for a pixel of interest. That is, as shown in a shaded area in FIG. 14, the recursive-use reference area is a reference area Z', for example, which includes reference pixels q(x, y) in the immediately preceding image F2 corresponding to the pixel of interest p(i, j) in the input image F1, the reference area Z' being defined by an alternate-long-and-short-dash line in FIG. 14. The reference area Z', which is the recursive-use reference area, is an area to which the pixel of interest p(i, j) is allowed to move, that is a part of the area including reference pixels q(x, y), each of which may be the endpoint of a motion vector when the pixel of interest p(i, j) is the starting point of the motion vector. In comparison with FIG. 4, it is clear that the reference area Z' covers an area at and near a position corresponding to the pixel position of the pixel of interest p(i, j). That is, in FIG. 14, an area including a position corresponding to the pixel of interest p(i, j) and two pixels above, below, right of, and left of the position corresponding to the position of the pixel of interest p(i, j) is set as the recursive-use reference area.

Figure 14:
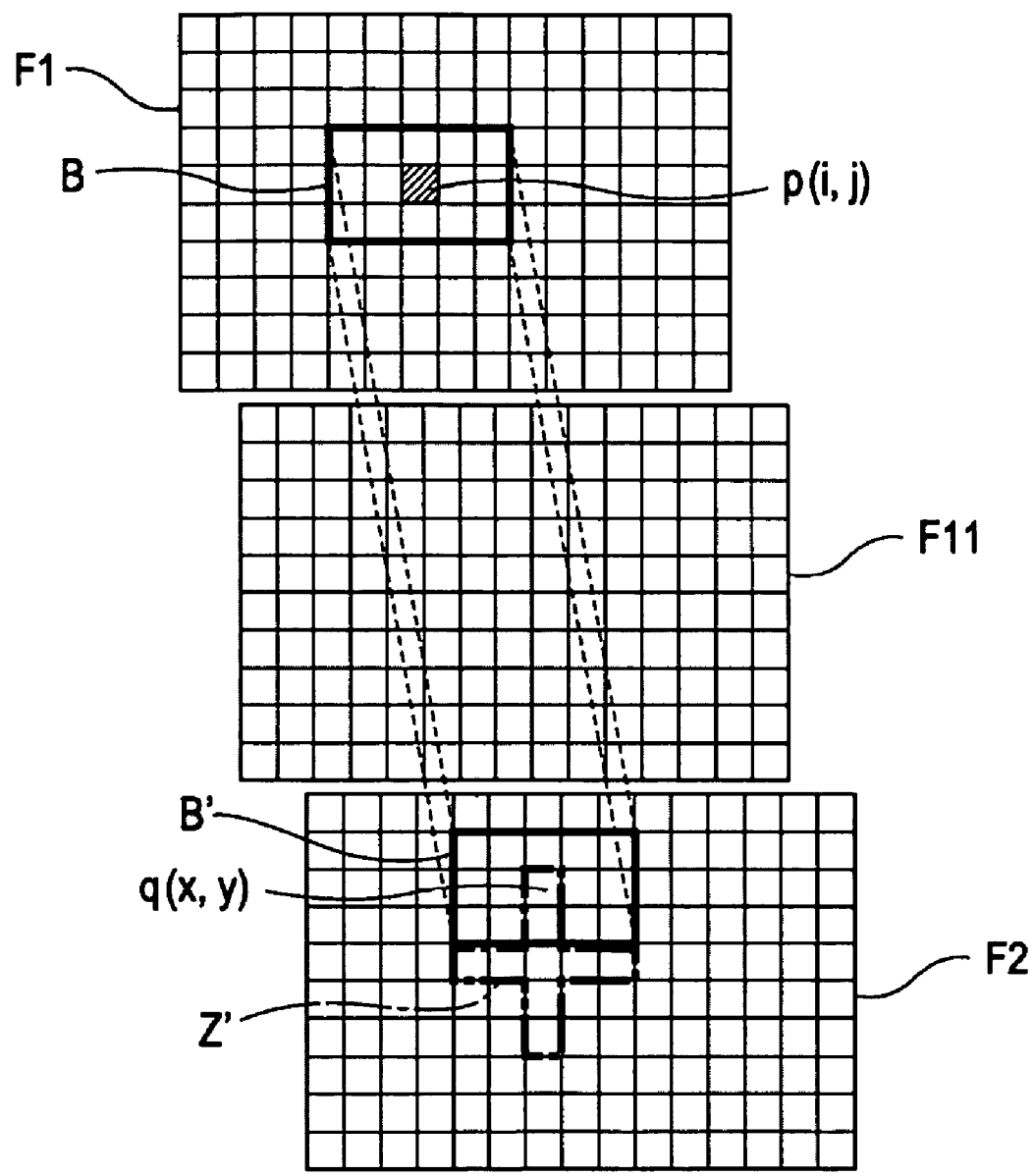
FIG. 14 is a diagram illustrating motion vector estimation processing performed by the image processing apparatus shown in FIG. 12.

Here, in FIG. 14, the image F1 shown in the upper part of FIG. 14 represents the input image, and the image F2 represents the immediately preceding image. Moreover, the image F11 represents the MC image to be generated. Moreover, each of cells represents a pixel, and (x, y) represents position coordinates of a pixel in the immediately preceding image.

In step S103, the sum-of-absolute-difference calculation section 111a extracts pixel values of pixels constituting a block of interest B corresponding to the pixel of interest p(i, j) and pixel values of pixels constituting a reference block B' corresponding to a reference pixel. That is, in a case shown in FIG. 14, the block of interest B corresponding to the pixel of interest p(i, j) is a block of a plurality of pixels indicated by a thick line in the input image F1, and the reference block B' corresponding to a reference pixel is a block of a plurality of pixels indicated by a thick line in the immediately preceding image F2. In FIG. 14, the block of interest B and the reference block B' are each a block of fifteen pixels.

In step S104, the sum-of-absolute-difference calculation section 111a calculates a sum of absolute differences according to Eq. (1) given above. Each of the absolute differences is obtained between the pixel value of one of the pixels in the block of interest B and the pixel value of a corresponding one of the pixels in the reference block B'.

In step S105, the sum-of-absolute-difference calculation section 111a determines whether there is any unprocessed pixel in the reference area Z'. If there are one or more unprocessed pixels therein, the procedure returns to step S102. That is, processes in steps S102 through S105 are repeatedly performed until all the pixels in the reference area Z' are each set as a reference pixel q(x, y) and sums of absolute differences ds(i, j, x, y) are obtained for all the pixels in the reference area Z', the reference area Z' being set corresponding to the pixel of interest p(i, j).

By performing the above-described processing, the sums of absolute differences are obtained with respect to all the reference pixels in the reference area, and a reference pixel having the minimum sum of absolute differences among these sums of absolute differences is set as the endpoint of the motion vector for the pixel of interest. The motion vector whose starting point is the pixel of interest and whose endpoint is the reference pixel is determined as the motion vector for the pixel of interest.

Here, in this processing, as described with reference to FIG. 14, since the reference area Z' is smaller than the reference area Z, which has been described with reference to FIG. 4, and also covers the area at and near a position corresponding to the pixel position of the pixel of interest, it is anticipated that the accuracy of a motion vector obtained between two frames will be low. However, since the same processing is recursively performed over frames, the endpoint of the motion vector representing the position of a reference pixel gradually becomes closer to the endpoint of an accurate motion vector.

Figure 15:
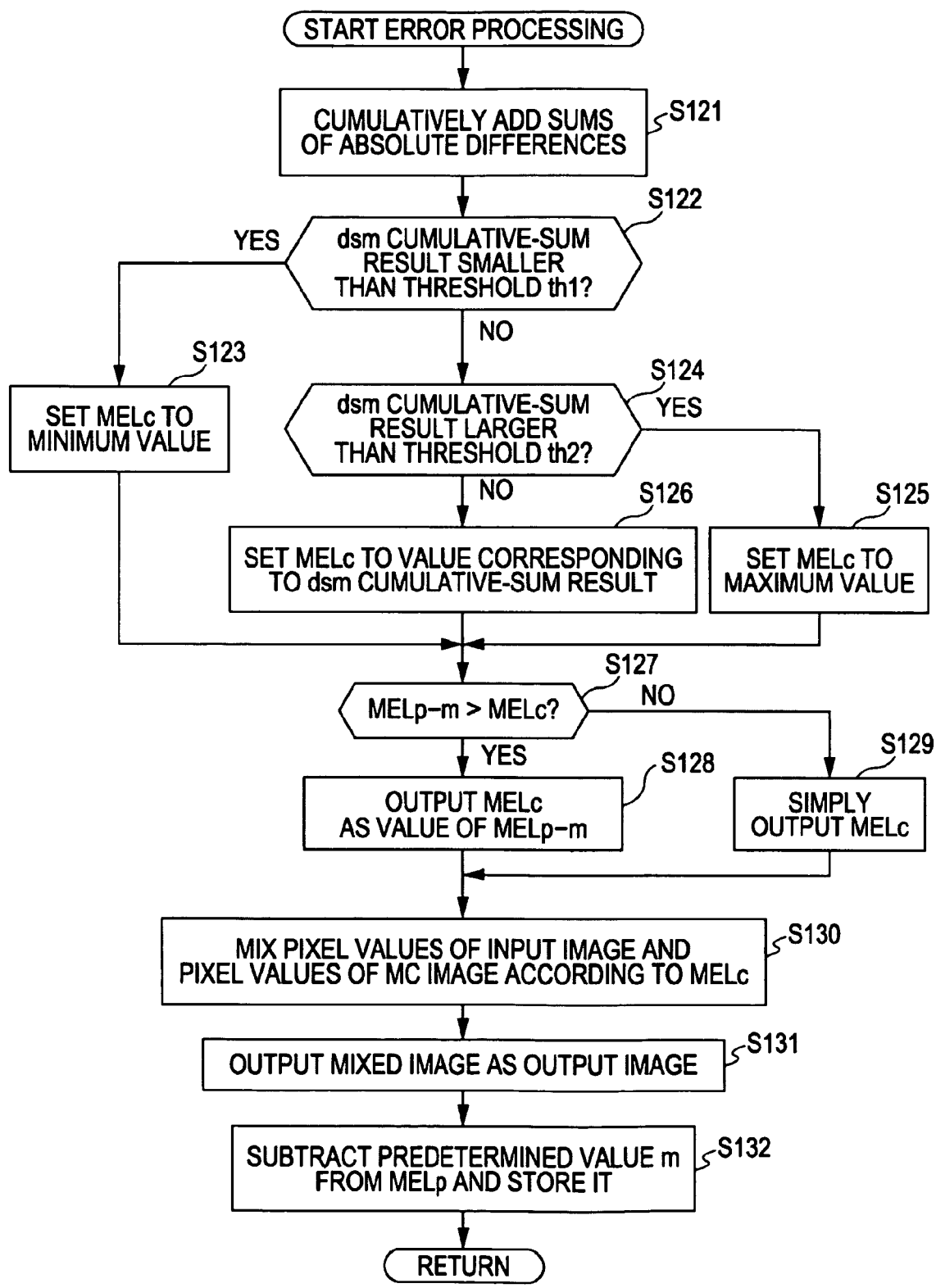
FIG. 15 is a flowchart illustrating error processing performed by the image processing apparatus shown in FIG. 12.

Next, the error processing performed by the image processing apparatus 1 shown in FIG. 12 will be described with reference to a flowchart shown in FIG. 15. Here, processes performed in steps S121 through S126 in the flowchart shown in FIG. 15 are substantially the same as those performed in steps S71 through S76 described with reference to the flowchart shown in FIG. 8, and thus a description thereof will be omitted. Here, the mean error level MELc of the input image obtained in steps S123, S125, and S126 in the flowchart shown in FIG. 15 is substantially the same as the mean error level MEL of the input image obtained in steps S73, S75, and S76 shown in FIG. 8.

That is, in steps S123, S125, and S126, when the mean error level MELc of the input image is obtained, in step S127, the comparing section 112c compares the value (MELp−m) with the mean error level MELc of the immediately preceding image, the value (MELp−m) being obtained by subtracting a predetermined value m from the mean error level MELp and being stored when the immediately preceding image is processed, and determines whether the value (MELp−m) which has been obtained by subtracting the predetermined value m from the mean error level MELp of the immediately preceding image is larger than the mean error level MELc of the input image.

In step S127, for example, if it is determined that the value (MELp−m) which has been obtained by subtracting the predetermined value m from the mean error level MELp of the immediately preceding image is larger than the mean error level MELc of the input image, in step S128, the comparing section 112c replaces the mean error level MELc of the input image with the value (MELp−m) which has been obtained by subtracting the predetermined value m from the mean error level MELp of the immediately preceding image, and outputs it to the mixing section 112e and the adding section 112d.

On the other hand, in step S127, for example, if it is determined that the value (MELp−m) which has been obtained by subtracting the predetermined value m from the mean error level MELp of the immediately preceding image is not larger than the mean error level MELc of the input image, in step S129, the comparing section 112c simply outputs the mean error level MELc of the input image to the mixing section 112e and the adding section 112d.

In step S130, the mixing section 112e mixes all the pixels in the input image and corresponding pixels in the MC image according to the mean error level MELc by performing a calculation expressed by Eq. (3) given above, and generates a mixed image. Here, in step S130, in the calculation expressed by Eq. (3) given above, the mean error level MELc is used instead of the mean error level MEL.

In step S131, the mixing section 112e outputs the mixed image as an output image to the display unit 2.

In step S132, the adding section 112d treats the supplied mean error level MELc of the input image as the mean error level MELp of the immediately preceding image in the processing thereafter, and also calculates and supplies the value (MELp−m) which has been obtained by subtracting the predetermined value m from the mean error level MELp to the comparing section 112c, and the value (MELp−m) is stored.

By performing the above-described processing, even in a state in which the mean error level of the input image sharply becomes large and a certain period of time is necessary until the mean error level becomes stable, the mean error level MELc of the input image is gradually decreased by comparing the mean error level MELc of the input image with the value (MELp−m) which is a little smaller than the mean error level of the immediately preceding image and selecting the larger one. Until the state of the mean error level MELc becomes stable, the mixing proportion of the input image is increased, whereby the mixing proportion of the MC image which has a high probability of being distorted can be reduced.

Figure 16:
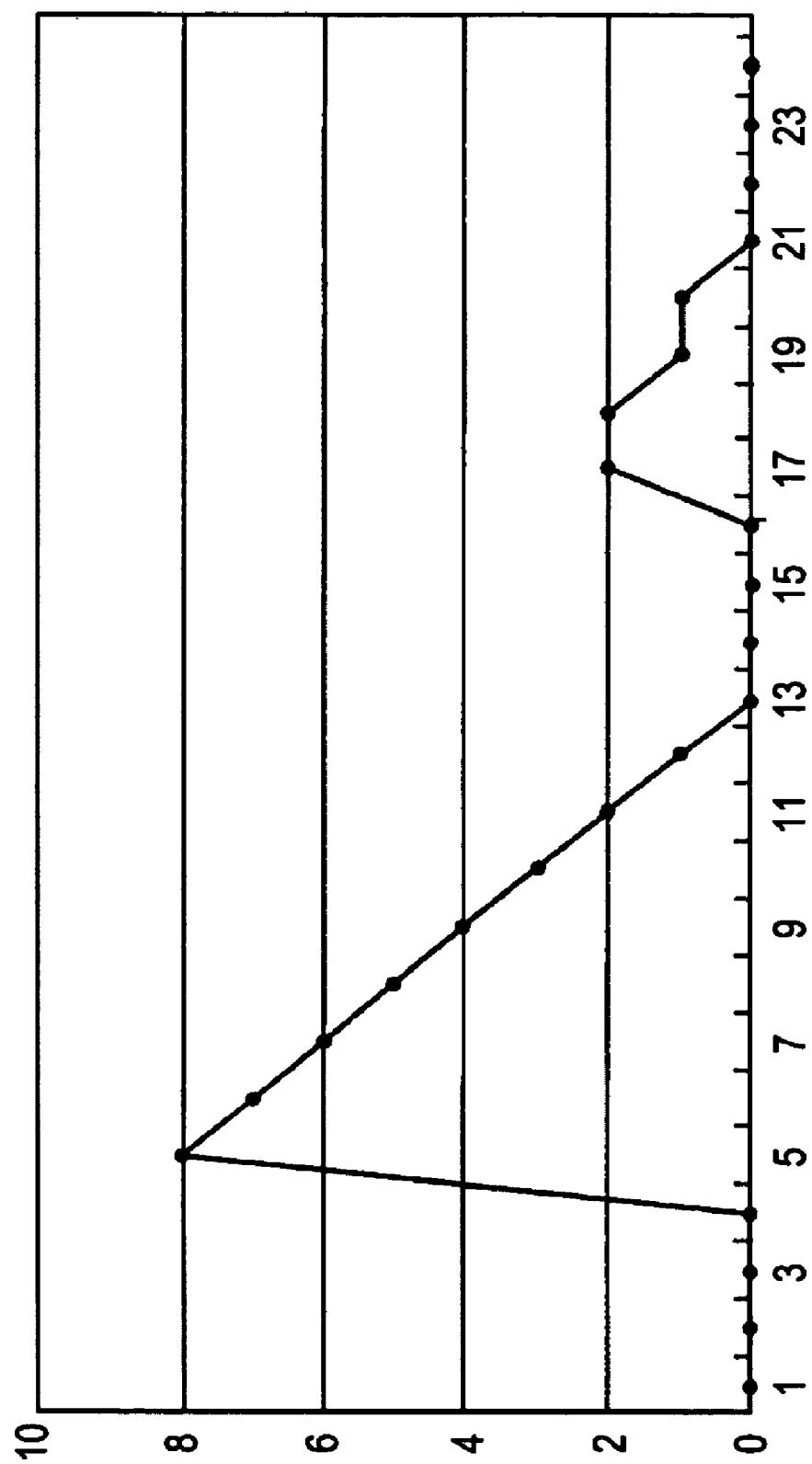
FIG. 16 is a diagram illustrating error processing performed by the image processing apparatus shown in FIG. 12.

For example, as shown in FIG. 16, the first through fourth frames are a series of images, and even if a scene change occurs in the fifth frame, the mean error level MELc of the input image is gradually decreased in the sixth through thirteenth frames. Moreover, in the fourteenth through sixteenth frames, a series of images are input, and, for example, even if the reliability of a motion vector becomes low or the like frame and the mean error level is increased in the seventeenth. In the eighteenth through twenty-first frames, the mean error level of the input image is decreased in steps, and in the twenty-first frame and thereafter, the mean error level of the input image is stable.

In particular, in a case in which a motion vector is obtained by performing the frame-recursive block matching, the accuracy of the motion vector is gradually improved. Thus, a certain period of time necessary to display some frames is necessary until an accurate motion vector is obtained. Thus, if a scene change occurs, a certain period of time is necessary thereafter until the motion vector becomes stable, and meanwhile, distortion appears in the MC image.

Therefore, as described above, by reducing the speed of the attenuation of the mean error level of the input image, the mixing proportion of the MC image which is distorted is gradually decreased and the input image is displayed, whereby images can be naturally displayed.

Here, the period of time which is necessary until the mean error level MELc of the input image becomes stable can be set according to the setting of the predetermined value m. If the predetermined value m is large, the attenuation of the mean error level MELc becomes fast, however, the possibility of a distorted MC image being displayed becomes high. In contrast, if the predetermined value m is small, the attenuation of the mean error level MELc becomes slow, however, the possibility of a distorted MC image being displayed becomes low. In this way, the predetermined value m can be considered as a time constant used to determine the degree of attenuation of the mean error level MELc. Thus, by setting the predetermined value m as necessary, a mixing process of the MC image and the input image may be controlled.

In addition, even in a case in which the error processing unit 112 is provided instead of the error processing unit 14 in the image processing apparatus 1 shown in FIG. 1 and a motion vector is obtained using the sum of absolute differences between pixels between two frames, the mixing proportion of the MC image which has a high probability of being distorted may be decreased by reducing the speed of the attenuation of the mean error level.

In any case, as a result, when an interpolation image is generated, even in the interpolation-image generation processing employing the motion compensation processing using a motion vector obtained in an image in which brightness changes significantly and distortion tends to occur, the distortion in an image which is to be generated by performing interpolation can be reduced. In addition, even when a method in which the mean error level of the input image significantly changes such as a motion vector estimation method in which such frame-recursive block matching is performed is used, the distortion in the MC image can be suppressed.

In the above, in the frame-recursive block matching, an example has been described in which distortion in the MC image is suppressed by reducing the speed of the attenuation of the mean error level even if, in particular, a certain period of time is necessary to obtain an accurate motion vector with respect to discontinuous images which are caused when a scene change occurs. However, the period of time which is necessary to obtain an accurate motion vector can be shortened.

Figure 17:
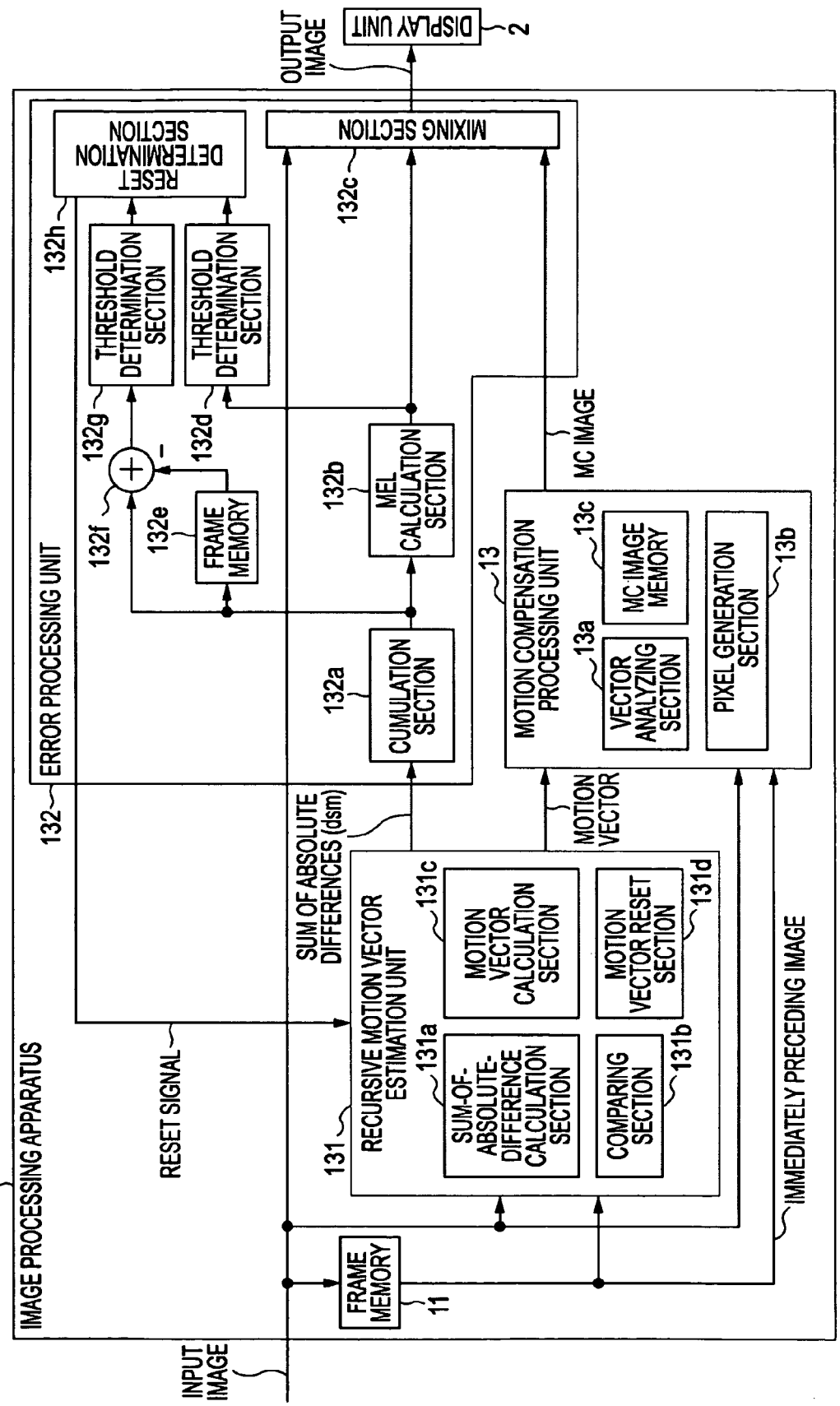
FIG. 17 is a block diagram showing an exemplary structure of another image processing apparatus to which the present invention is applied.

FIG. 17 is a diagram showing an exemplary structure according to another embodiment of an image processing apparatus capable of reducing a period of time necessary to obtain an accurate motion vector, the image processing apparatus being used to obtain a motion vector by performing frame-recursive block matching. Here, in the image processing apparatus 1 shown in FIG. 17, components having substantially the same functions as those provided in the image processing apparatus 1 shown in FIG. 1 will be referred to by the same names and denoted by the same reference numerals. The description thereof will be omitted as necessary.

That is, the image processing apparatus 1 shown in FIG. 17 differs from the image processing apparatus 1 shown in FIG. 1 in that a recursive motion vector estimation unit 131 and an error processing unit 132 are provided instead of the motion vector estimation unit 12 and the error processing unit 14.

The recursive motion vector estimation unit 131 includes a sum-of-absolute-difference calculation section 131a, a comparing section 131b, a motion vector calculation section 131c, and a motion vector reset section 131d. Among these components, the sum-of-absolute-difference calculation section 131a, the comparing section 131b, and the motion vector calculation section 131c execute processes substantially the same as those performed by the sum-of-absolute-difference calculation section 111a, the comparing section 111b, and the motion vector calculation section 111c of the recursive motion vector estimation unit 111, respectively, in the image processing apparatus described with reference to FIG. 12. Moreover, according to a reset signal supplied from the error processing unit 132, the motion vector reset section 131d resets a motion vector which is recursively estimated (the motion vector being caused to be a still vector having an amount of motion of 0). That is, the recursive motion vector estimation unit 131 basically executes processing substantially the same as that performed by the recursive motion vector estimation unit 111, and resets a motion vector according to the reset signal.

The error processing unit 132 includes a cumulation section 132a, an MEL calculation section 132b, a mixing section 132c, a threshold determination section 132d, a frame memory 132e, an adding section 132f, a threshold determination section 132g, and a reset determination section 132h. Among these components, the cumulation section 132a, the MEL calculation section 132b, and the mixing section 132c execute processes substantially the same as those performed by the cumulation section 14a, the MEL calculation section 14b, and the mixing section 14c of the error processing unit 14, respectively. That is, the error processing unit 132 mixes the MC image and the input image according to the sums of absolute differences each corresponding to the motion vector for one of pixels, the motion vector being supplied from the recursive motion vector estimation unit 131, and outputs the mixed image to the display unit 2, and the mixed image is displayed thereon.

Moreover, the error processing unit 132 generates a reset signal which indicates resetting of a motion vector according to the cumulative-sum result of the sums of absolute differences, the cumulative-sum result being supplied from the recursive motion vector estimation unit 131, and the mean error level MEL, and supplies the reset signal to the recursive motion vector estimation unit 131. More particularly, the threshold determination section 132d determines whether the mean error level MEL calculated by the MEL calculation section 132b is larger than a predetermined threshold. The frame memory 132e temporarily stores the cumulative-sum result of the sums of absolute differences, and supplies, to the adding section 132f, the cumulative-sum result of the sums of absolute differences with respect to the an image preceding the current image by one frame. The adding section 132f calculates an increased amount of the cumulative-sum result of the sums of absolute differences according to the cumulative-sum result of the sums of absolute differences, the cumulative-sum result being supplied form the cumulation section 132a, and the cumulative-sum result of the sums of absolute differences of the image preceding the current image by one frame, the cumulative-sum result being supplied from the frame memory 132e, and supplies the increased amount to the threshold determination section 132g. The threshold determination section 132g determines whether the increased amount of the cumulative-sum result of the sums of absolute differences supplied from the adding section 132f is larger than a predetermined threshold. The reset determination section 132h generates a reset signal according to a determination result from the threshold determination section 132d and a determination result from the threshold determination section 132g, and supplies the reset signal to the recursive motion vector estimation unit 131.

Next, image processing performed by the image processing apparatus 1 shown in FIG. 17 will be described. Here, the image processing is basically the same as that described with reference to the flowchart shown in FIG. 2. Thus, description the same as that has been described with reference to FIG. 2 will be omitted. Moreover, the image processing performed by the image processing apparatus 1 shown in FIG. 17 differs from the image processing performed by the image processing apparatus 1 shown in FIG. 1 in terms of the motion vector estimation processing and the error processing in the processing represented by the flowchart shown in FIG. 2. Thus, motion vector estimation processing and error processing performed by the image processing apparatus 1 shown in FIG. 17 will be described below.

Figure 18:
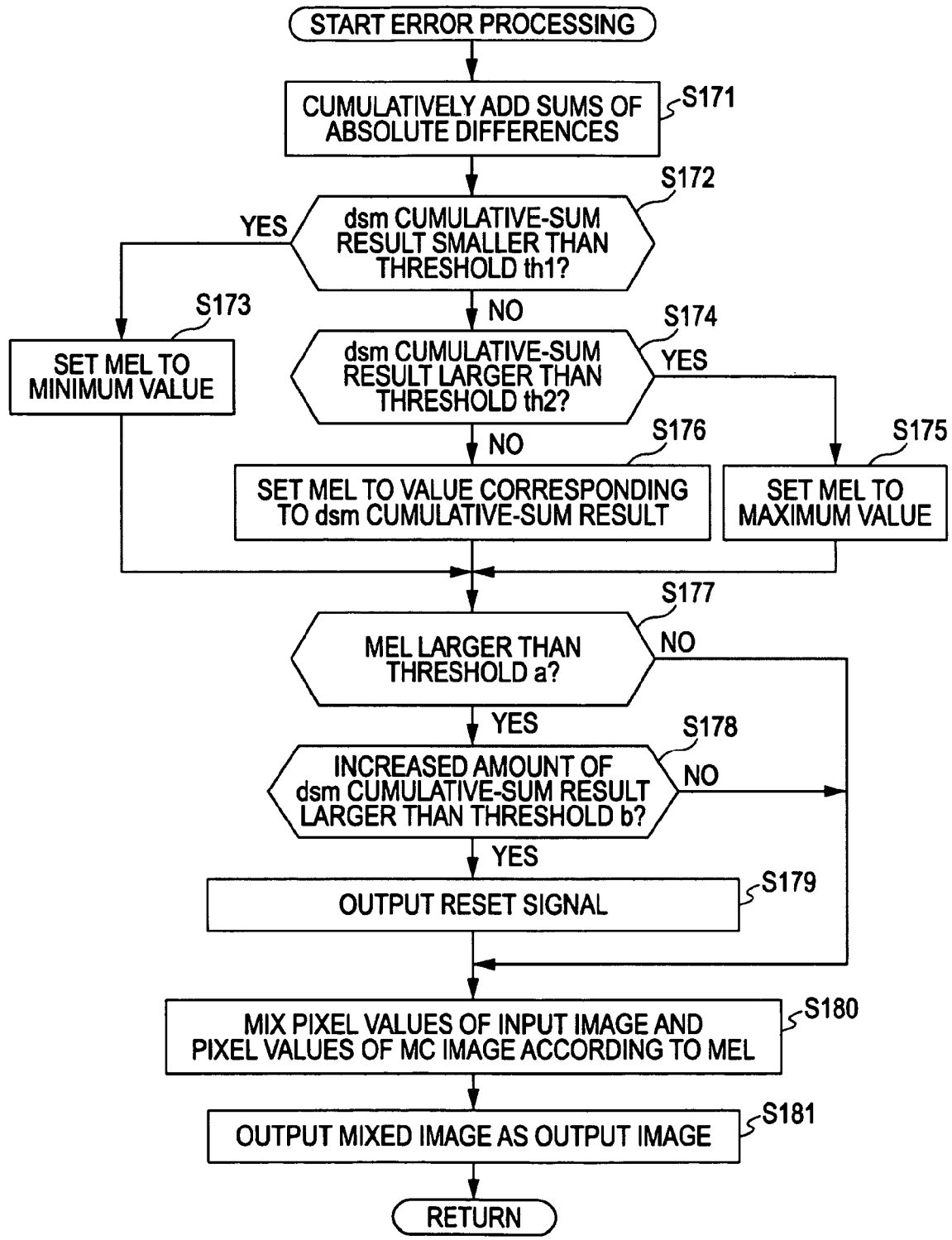
FIG. 18 is a flowchart illustrating error processing performed by the image processing apparatus shown in FIG. 17.

First, with reference to a flowchart shown in FIG. 18, the error processing performed by the image processing apparatus 1 shown in FIG. 17 will be described. Here, processes performed in steps S171 through S176 in the flowchart shown in FIG. 18 are substantially the same as those performed in steps S71 through S76 described with reference to the flowchart shown in FIG. 8. Thus, a description thereof will be omitted.

That is, in steps S173, S175, and S176, when the mean error level MEL of the input image is obtained, in step S177, the threshold determination section 132d determines whether the mean error level MEL is larger than a predetermined threshold a.

In step S177, for example, if it is determined that the mean error level MEL is larger than the predetermined threshold a, in step S178, the threshold determination section 132g determines whether the increased amount of the cumulative-sum result of the sums of absolute differences (the dsm cumulative-sum result) supplied from the adding section 132f is larger than a predetermined threshold b.

In step S178, for example, if it is determined that the increased amount of the dsm cumulative-sum result is larger than the predetermined threshold b, in step S179, the reset determination section 132h generates a reset signal, and supplies (outputs) the reset signal to the recursive motion vector estimation unit 131.

On the other hand, in step S177, if it is determined that the mean error level MEL is smaller than the predetermined threshold a, or, in step S178, if it is determined that the increased amount of the dsm cumulative-sum result is smaller than the predetermined threshold b, the procedure proceeds to step S180.

In step S180, the mixing section 132c mixes all the pixels in the input image and corresponding pixels in the MC image and generates a mixed image.

In step S181, the mixing section 132c outputs the mixed image as an output image to the display unit 2.

Figure 19:
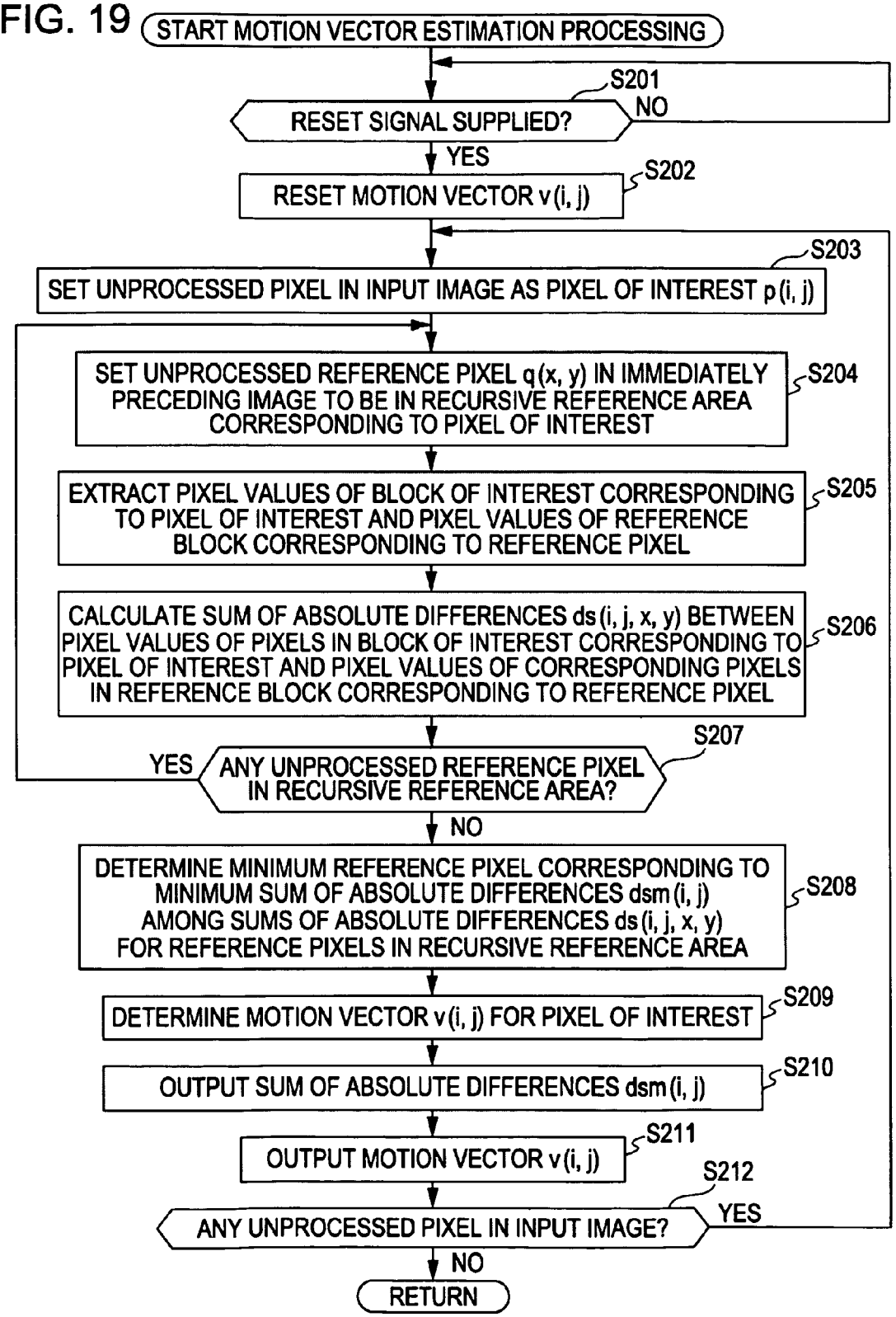
FIG. 19 is a diagram illustrating motion vector estimation processing performed by the image processing apparatus shown in FIG. 17.

Next, with reference to a flowchart shown in FIG. 19, motion vector estimation processing performed by the image processing apparatus 1 shown in FIG. 17 will be described. Here, processes performed in steps S203 through S212 in the flowchart shown in FIG. 19 are substantially the same as those performed in steps S101 through S110 described with reference to the flowchart shown in FIG. 13. Thus, a description thereof will be omitted.

That is, in step S201, the motion vector reset section 131d determines whether the reset signal has been supplied.

In step S201, if it is determined that the reset signal has been supplied, in step S202, the motion vector reset section 131d resets the motion vector v(i, j) which has been recursively processed to the still vector having an amount of motion of 0.

On the other hand, in step S201, if it is determined that the reset signal has not been supplied, step S202 is skipped and the procedure proceeds to step S203.

In the above-described processing, even in a case in which a motion vector becoming increasingly different from an accurate motion vector in amount of motion is recursively processed in the discontinuous images which are caused when a scene change occurs, by resetting the motion vector once, recursive processing of such a motion vector which is becoming increasingly different from the accurate motion vector can be avoided, and moreover, a period of time necessary to obtain the accurate motion vector can be shortened. Thus, the distortion in the MC image can be suppressed in a shorter period of time.

Figure 20:
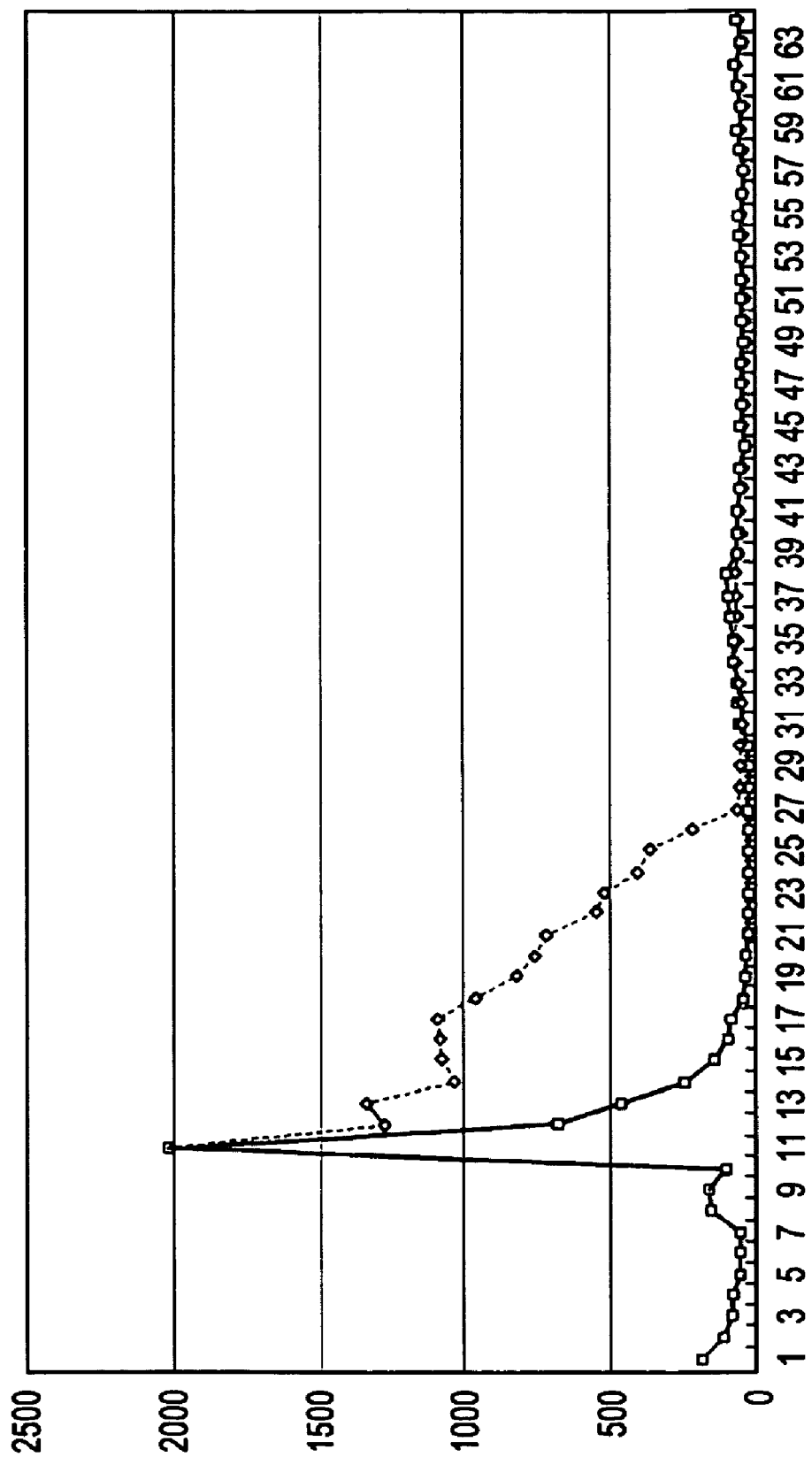
FIG. 20 is a diagram illustrating the attenuation of a dsm cumulative-sum result with respect to images including a scene change.

For example, as shown in FIG. 20, in the case of an existing processing represented by a broken line with respect to images in which a scene change occurs at the eleventh frame, since a certain period of time is necessary until an accurate motion vector is obtained after the scene change, a certain period of time is also necessary for the attenuation of the dsm cumulative-sum result. On the other hand, in the case of processing according to an embodiment represented by a solid line, a period of time for displaying only a few frames is necessary until an accurate motion vector is obtained after the scene change, and thus the dsm cumulative-sum result rapidly decreases. Here, in FIG. 20, the horizontal axis represents frame number and the vertical axis represents dsm cumulative-sum result. In addition, FIG. 20 shows an example in which the dsm cumulative-sum result is obtained in cases in which the value used to perform normalization is constant.

Next, with reference to a block diagram shown in FIG. 21, an exemplary structure according to another embodiment of an image processing apparatus which is designed to reduce a period of time necessary until an accurate motion vector is obtained will be described, the image processing apparatus obtaining a motion vector by performing frame-recursive block matching. Here, in the image processing apparatus 1 shown in FIG. 21, components having substantially the same functions as those provided in the image processing apparatus 1 shown in FIG. 17 will be referred to by the same names and denoted by the same reference numerals. The description thereof will be omitted as necessary.

Figure 21:
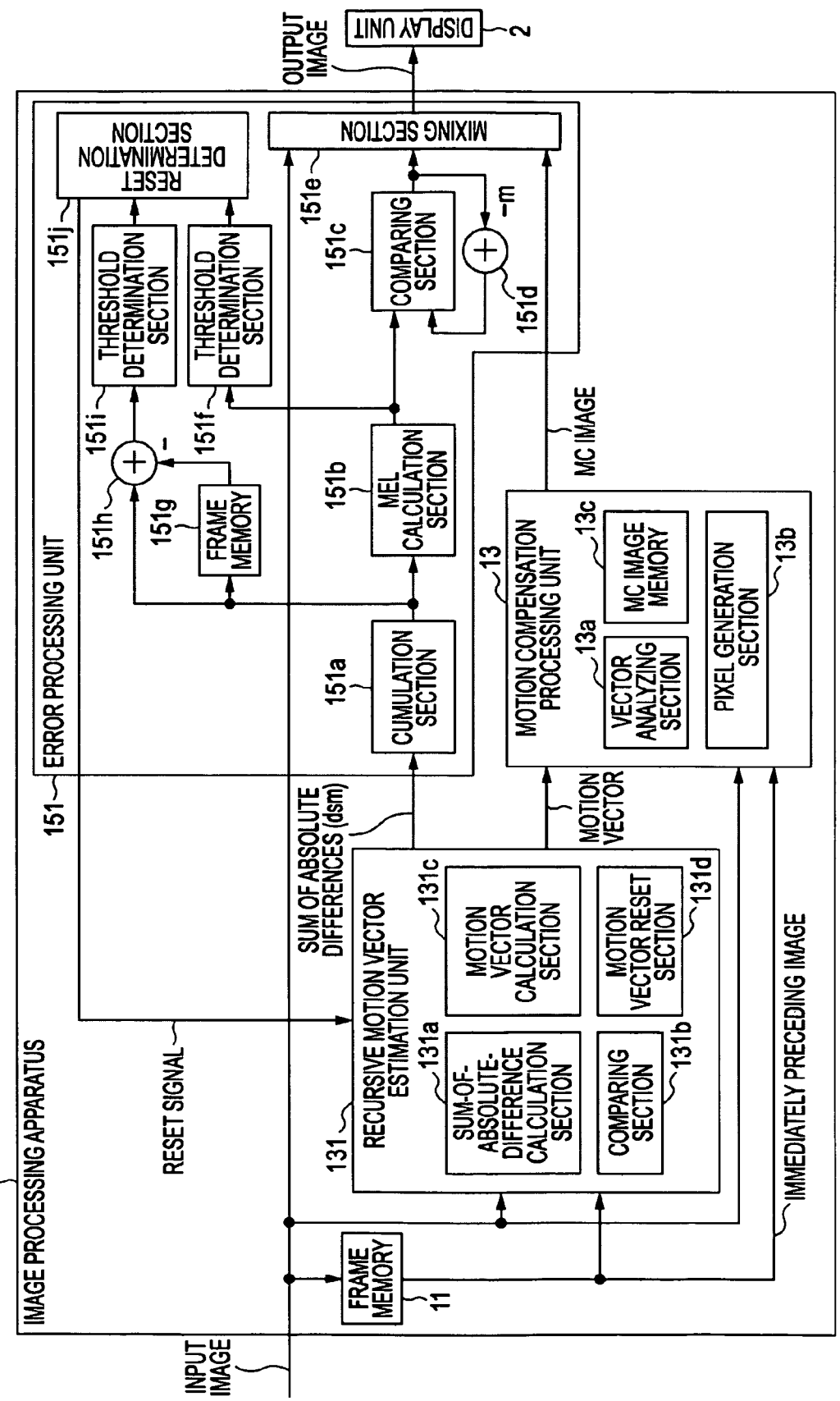
FIG. 21 is a block diagram showing an exemplary structure of another image processing apparatus to which the present invention is applied.

That is, the image processing apparatus 1 shown in FIG. 21 differs from the image processing apparatus 1 shown in FIG. 17 in that an error processing unit 151 is provided instead of the error processing unit 132.

The error processing unit 151 includes a cumulation section 151a, an MEL calculation section 151b, a comparing section 151c, an adding section 151d, a mixing section 151e, a threshold determination section 151f, a frame memory 151g, an adding section 151h, a threshold determination section 151i, and a reset determination section 151j. Among these components, the cumulation section 151a, the MEL calculation section 151b, the comparing section 151c, the adding section 151d, and the mixing-section 151e execute processes substantially the same as those performed by the cumulation section 112a, the MEL calculation section 112b, the comparing section 112c, the adding section 112d, and the mixing section 112e, respectively, in the image processing apparatus 1 shown in FIG. 12. That is, the error processing unit 151 mixes the MC image and the input image according to the sums of absolute differences each corresponding to the motion vector for one of the pixels, the sums of absolute differences being supplied from the recursive motion vector estimation unit 131, and outputs the mixed image to the display unit 2, and the mixed image is displayed thereon.

Moreover, the threshold determination section 151f, the frame memory 151g, the adding section 151h, the threshold determination section 151i, and the reset determination section 151j execute processing substantially the same as that performed by the threshold determination section 132d, the frame memory 132e, the adding section 132f, the threshold determination section 132g, and the reset determination section 132h, respectively. That is, the error processing unit 151 generates a reset signal according to the cumulative-sum result of the sums of absolute differences, the cumulative-sum result being supplied from the recursive motion vector estimation unit 131, and the mean error level MEL, and supplies the reset signal to the recursive motion vector estimation unit 131.

Figure 22:
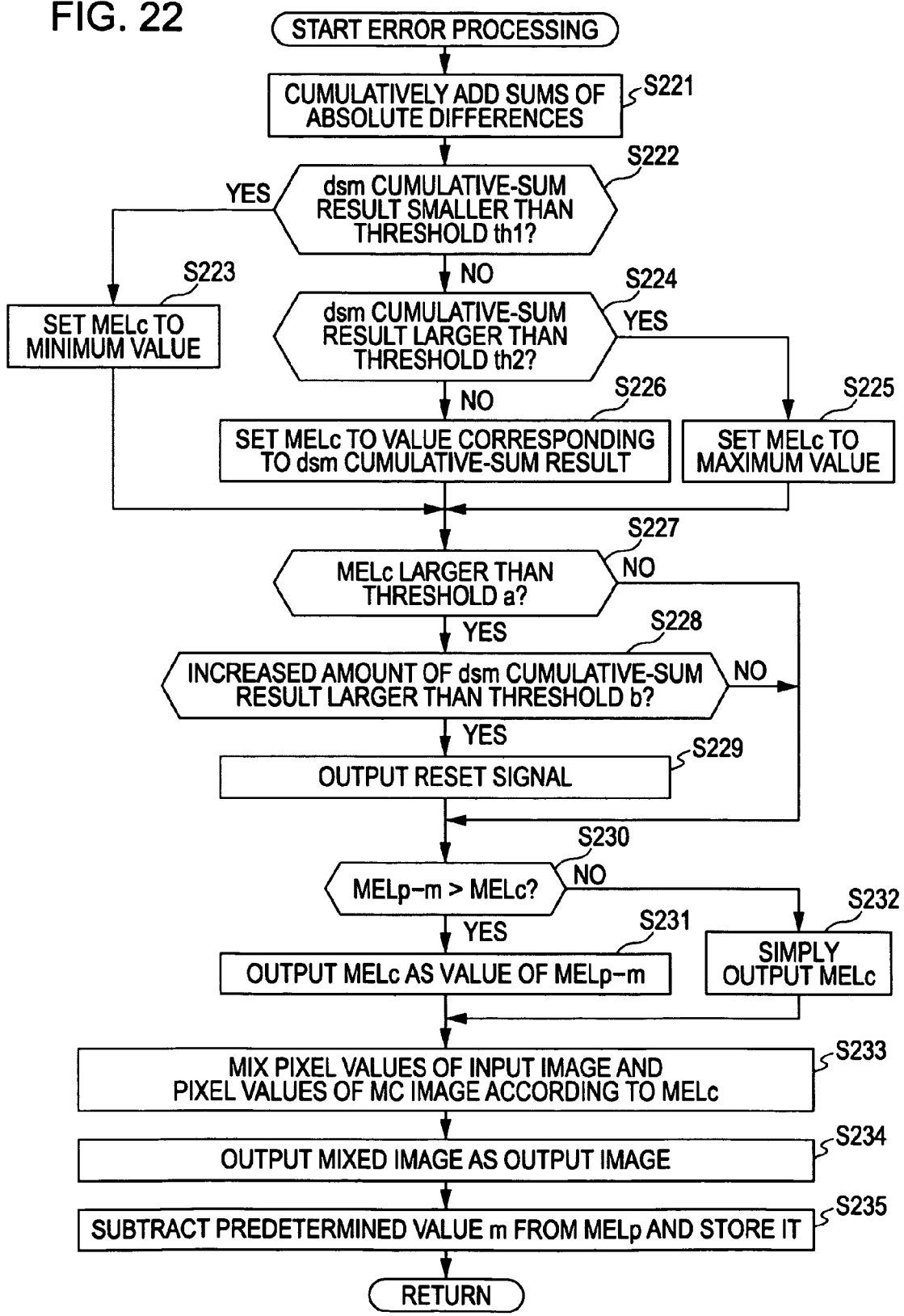
FIG. 22 is a flowchart illustrating error processing performed by the image processing apparatus shown in FIG. 21.

Next, image processing performed by the image processing apparatus 1 shown in FIG. 21 will be described. Here, the image processing is basically the same as that described with reference to the flowchart shown in FIG. 2. Thus, description the same as that has been described with reference to FIG. 2 will be omitted. Moreover, the image processing performed by the image processing apparatus 1 shown in FIG. 21 differs from the image processing performed by the image processing apparatus 1 shown in FIG. 17 in terms of the error processing in the processing represented by the flowchart shown in FIG. 2. Thus, error processing performed by the image processing apparatus 1 shown in FIG. 21 will be described with reference to a flowchart shown in FIG. 22. Here, processes performed in steps S221 through S226 and steps S230 through S235 in the flowchart shown in FIG. 22 are substantially the same as those performed in steps S121 through S126 and steps S127 through S132 described with reference to the flowchart shown in FIG. 15, and thus a description thereof will be omitted. Moreover, processes performed in steps S227 through S229 in the flowchart shown in FIG. 22 are substantially the same as those performed in steps S177 through S179 described with reference to the flowchart shown in FIG. 18, and thus a description thereof will be omitted.

Thus, even in a case in which a motion vector having a large difference between the motion vector and an accurate motion vector is recursively processed in discontinuous images which are caused when a scene change occurs, a period of time which is necessary to obtain the accurate motion vector can be shortened by resetting the motion vector.

In a case in which a motion vector having low reliability occurs in a part of a region in an image, even if the part of the region is sufficiently large such as half the entire image, there may be a case in which the dsm cumulative-sum result of the entire image is not a large value. Thus, even in such a case, a structure capable of detecting the occurrence of a motion vector having low reliability will be described.

Figure 23:
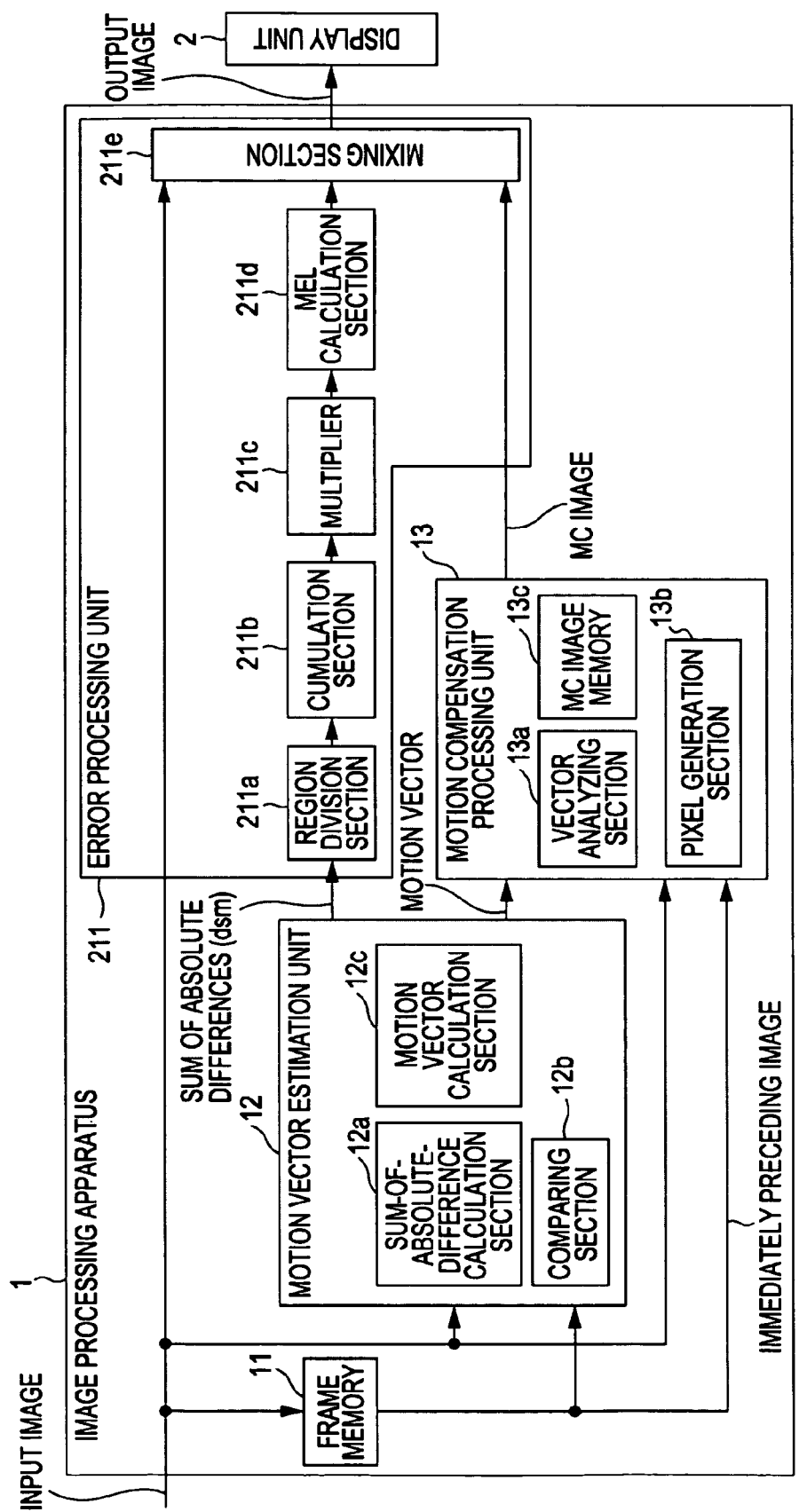
FIG. 23 is a block diagram showing an exemplary structure of another image processing apparatus to which the present invention is applied.

FIG. 23 is a diagram showing an exemplary structure according to another embodiment of an image processing apparatus which is designed to detect the occurrence of a motion vector having low reliability in a part of a region on a screen. Here, in the image processing apparatus 1 shown in FIG. 23, components having substantially the same functions as those provided in the image processing apparatus 1 shown in FIG. 1 will be referred to by the same names and denoted by the same reference numerals. The description thereof will be omitted as necessary.

That is, the image processing apparatus 1 shown in FIG. 23 differs from the image processing apparatus 1 shown in FIG. 1 in that an error processing unit 211 is provided instead of the error processing unit 14.

The error processing unit 211 includes a region division section 211a, a cumulation section 211b, a multiplier 211c, an MEL calculation section 211d, and a mixing section 211e. Among these components, the MEL calculation section 211d and the mixing section 211e execute processes substantially the same as those performed by the MEL calculation section 14b and the mixing section 14c of the error processing unit 14, respectively. The region division section 211a evenly divides the input image into n regions. For each of the n regions of the input image, the cumulation section 211b cumulatively adds the sums of absolute differences and supplies it to the multiplier 211c. The multiplier 211c multiplies the largest one from among cumulative-sum results supplied from the cumulation section 211b by n, each of the cumulative-sum results being obtained by cumulatively adding the sums of absolute differences for a corresponding region, and supplies it to the MEL calculation section 211d. That is, the error processing unit 211 mixes the MC image and the input image according to the sums of absolute differences each corresponding to one of the n regions into which the input image is divided, and outputs the mixed image to the display unit 2, and the mixed image is displayed thereon.

Figure 24:
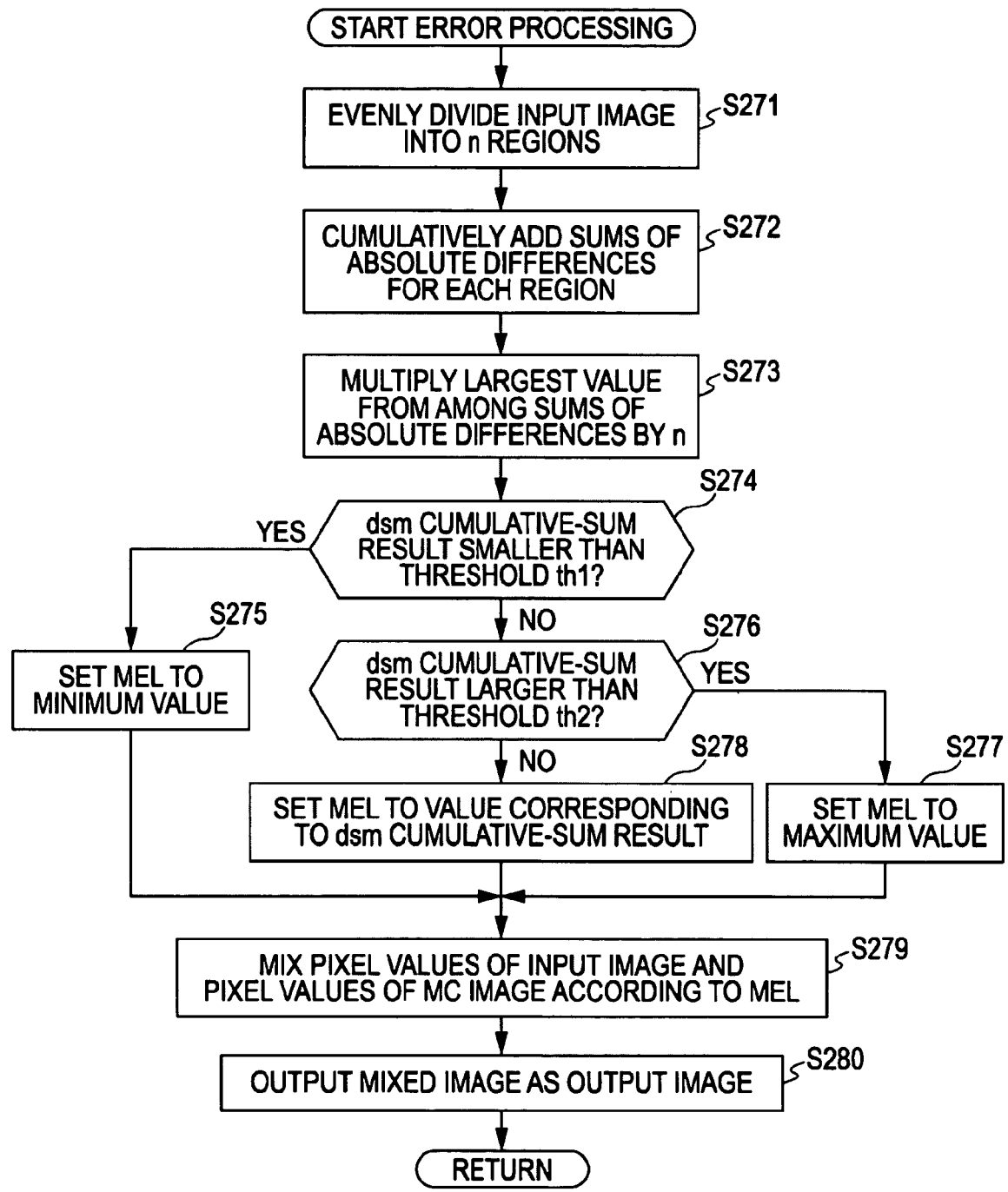
FIG. 24 is a flowchart illustrating error processing performed by the image processing apparatus shown in FIG. 23.

Next, image processing performed by the image processing apparatus 1 shown in FIG. 23 will be described. Here, the image processing is basically the same as that described with reference to the flowchart shown in FIG. 2. Thus, description the same as that has been described with reference to FIG. 2 will be omitted. The image processing performed by the image processing apparatus 1 shown in FIG. 23 differs from the image processing performed by the image processing apparatus 1 shown in FIG. 1 in terms of the error processing in the processing represented by the flowchart shown in FIG. 2. Thus, motion vector estimation processing and error processing performed by the image processing apparatus 1 shown in FIG. 23 will be described with reference to a flowchart shown in FIG. 24. Here, processes performed in steps S274 through S280 in the flowchart shown in FIG. 24 are substantially the same as those performed in steps S72 through S78 described with reference to the flowchart shown in FIG. 8. This, a description thereof will be omitted.

That is, in step S271, the region division section 211a evenly divides the input image into the n regions. For example, the region division section 211a groups the sums of absolute differences corresponding to pixels each being included in one of the n regions into which the input image is divided and supplies the grouped sums of absolute differences to the cumulation section 211b, the sums of absolute differences each corresponding to one of the pixels in the input image and being supplied from the motion vector estimation unit 12.

In step S272, for each of the n regions into which the input image is divided, the cumulation section 211b cumulatively add the sums of absolute differences, and supplies it to the multiplier 211c.

In step S273, the multiplier 211c multiplies the largest one from among the cumulative-sum results supplied from the cumulation section 211b by n, each of the cumulative-sum results being obtained by cumulatively adding the sums of absolute differences for a corresponding region. The multiplier 211c supplies the n multiple of the cumulative-sum result, as a dsm cumulative-sum result, to the MEL calculation section 211d, and the procedure proceeds to step S274.

In the above-described processing, even in a case in which a motion vector having low reliability occurs in a part of a region in an image, the occurrence of the motion vector having low reliability can be detected. Thus, even in a scene in which motion vectors having low reliability intensively occur in a part of an image, the distortion in the MC image can be suppressed.

In the above, an example in which the occurrence of a motion vector having low reliability is detected in a part of a region in an image has been described; however, in particular, in a region near the edge of the image, corresponding pixels do not often exist in a preceding frame and a following frame, and thus it is not possible to obtain an accurate motion vector and a wrong sum of absolute differences dsm may be obtained. Thus, a structure will be described in which an effect caused at the region near the edge of the image is eliminated and an MC image is generated.

Figure 25:
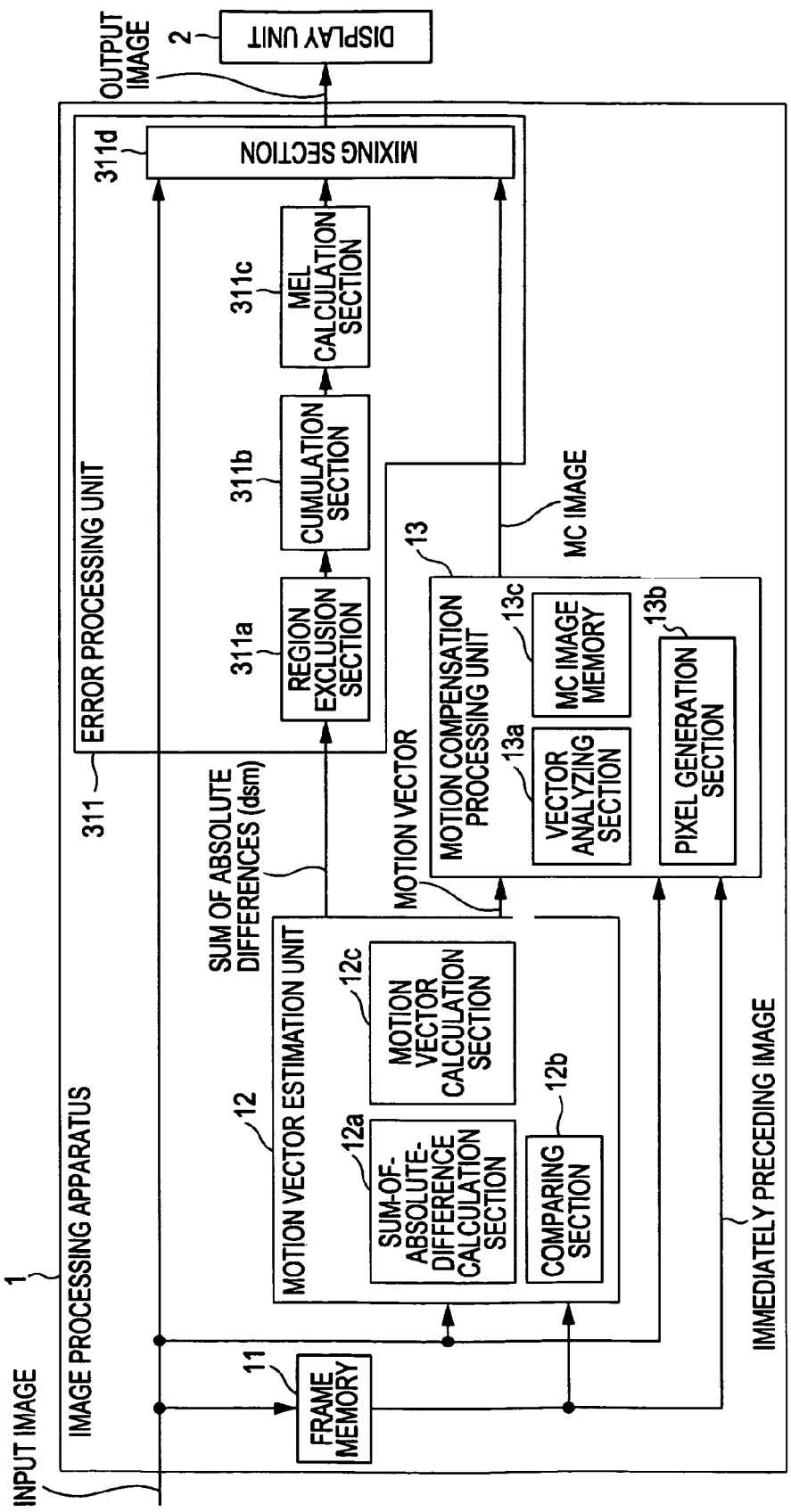
FIG. 25 is a block diagram showing an exemplary structure of another image processing apparatus to which the present invention is applied.

FIG. 25 is a diagram showing an exemplary structure according to an embodiment of an image processing apparatus which is designed to eliminate an effect caused at a region near the edge of an image and to generate an MC image. Here, in the image processing apparatus 1 shown in FIG. 25, components having substantially the same functions as those provided in the image processing apparatus 1 shown in FIG. 1 will be referred to by the same names and denoted by the same reference numerals. The description thereof will be omitted as necessary.

That is, the image processing apparatus 1 shown in FIG. 25 differs from the image processing apparatus 1 shown in FIG. 1 in that an error processing unit 311 is provided instead of the error processing unit 14.

The error processing unit 311 includes a region exclusion section 311a, a cumulation section 311b, an MEL calculation section 311c, and a mixing section 311d. Among these components, the MEL calculation section 311c and the mixing section 311d execute processes substantially the same as those performed by the MEL calculation section 14b and the mixing section 14c of the error processing unit 14, respectively. The region exclusion section 311a sets a region other than the region near the edge of the input image as a target region for the error processing. The cumulation section 311b cumulatively adds the sums of absolute differences corresponding to pixels included in the target region, and supplies it to the MEL calculation section 311c. That is, the error processing unit 311 mixes the MC image and the input image according to the sums of absolute differences for the region other than the region near the edge of the input image, and outputs the mixed image to the display unit 2, and the mixed image is displayed thereon.

Figure 26:
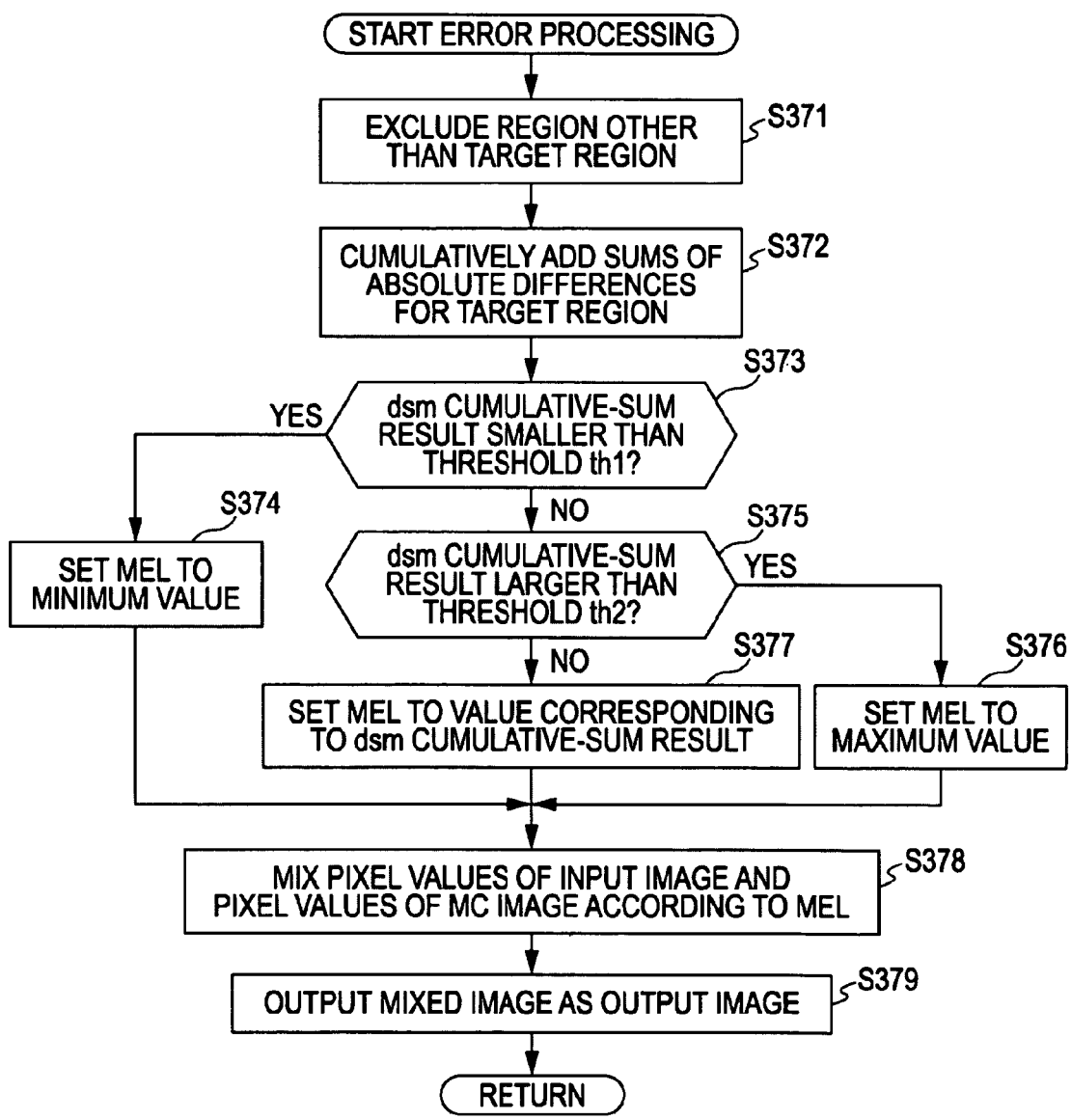
FIG. 26 is a flowchart illustrating error processing performed by the image processing apparatus shown in FIG. 25.

Next, image processing performed by the image processing apparatus 1 shown in FIG. 25 will be described. Here, the image processing is basically the same as that described with reference to the flowchart shown in FIG. 2. Thus, description the same as that has been described with reference to FIG. 2 will be omitted. The image processing performed by the image processing apparatus 1 shown in FIG. 25 differs from the image processing performed by the image processing apparatus 1 shown in FIG. 1 in terms of the error processing in the processing represented by the flowchart shown in FIG. 2. Thus, error processing performed by the image processing apparatus 1 shown in FIG. 25 will be described with reference to a flowchart shown in FIG. 26. Here, processes performed in steps S373 through S379 in the flowchart shown in FIG. 26 are substantially the same as those performed in steps S72 through S78 described with reference to the flowchart shown in FIG. 8. Thus, a description thereof will be omitted.

That is, in step S371, the region exclusion section 311a excludes the region near the edge of the input image, and sets the other region as a target region for the error processing. For example, as shown in FIG. 27, the region exclusion section 311a excludes a region near the edge, the region being defined by preset parameters such as the number of excluded lines at the top portion, the number of excluded lines at the bottom portion, the number of excluded pixels at the leftmost portion, and the number of excluded pixels at the rightmost portion.

Figure 27:
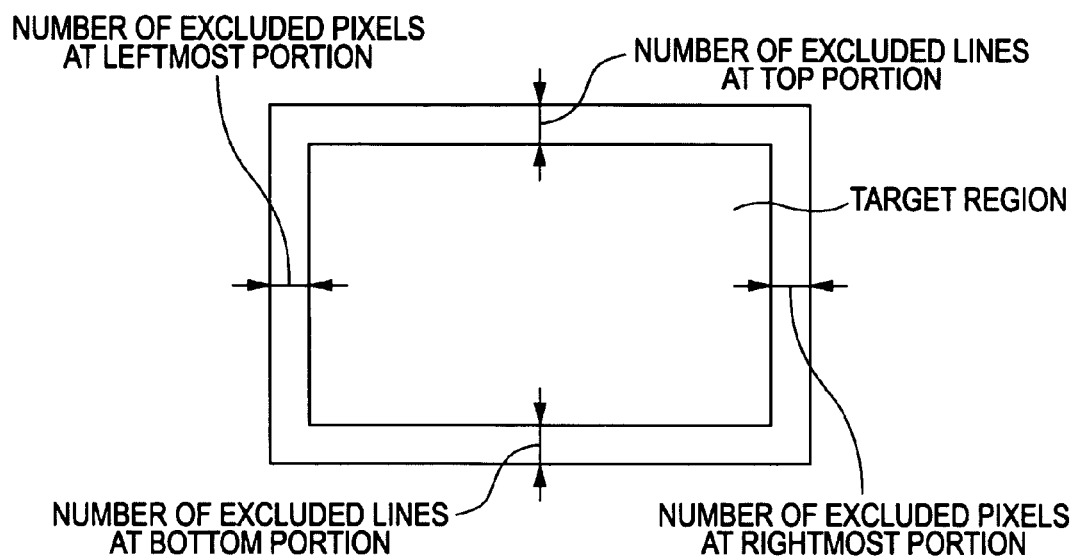
FIG. 27 is a diagram illustrating the error processing performed by the image processing apparatus shown in FIG. 25.

In step S372, the cumulation section 311b cumulatively adds, for example, the sums of absolute differences corresponding to the pixels included in the target region shown in FIG. 27. The cumulation section 311b supplies the cumulative-sum result, as the dsm cumulative-sum result, to the MEL calculation section 311c, and the procedure proceeds to step S373.

In the above-described processing, even in a case in which it is not possible to obtain an accurate motion vector and an accurate sum of absolute differences dsm, an effect caused at the region near the edge of the image is eliminated and the distortion in the MC image can be suppressed.

Here, a sum of absolute differences dsm is based on the difference in luminance between frames, and thus tends to be large in high-contrast images and tends to be small in low-contrast images. Thus, in error processing, error detection tends to be too sensitive with respect to such high-contrast images, and failure in error detection tends to occur with respect to such low-contrast images. Hence, an example will be described in which excessively high sensitivity in error detection with respect to high-contrast images is prevented and the occurrence of failure in error detection with respect to low-contrast images is reduced.

Figure 28:
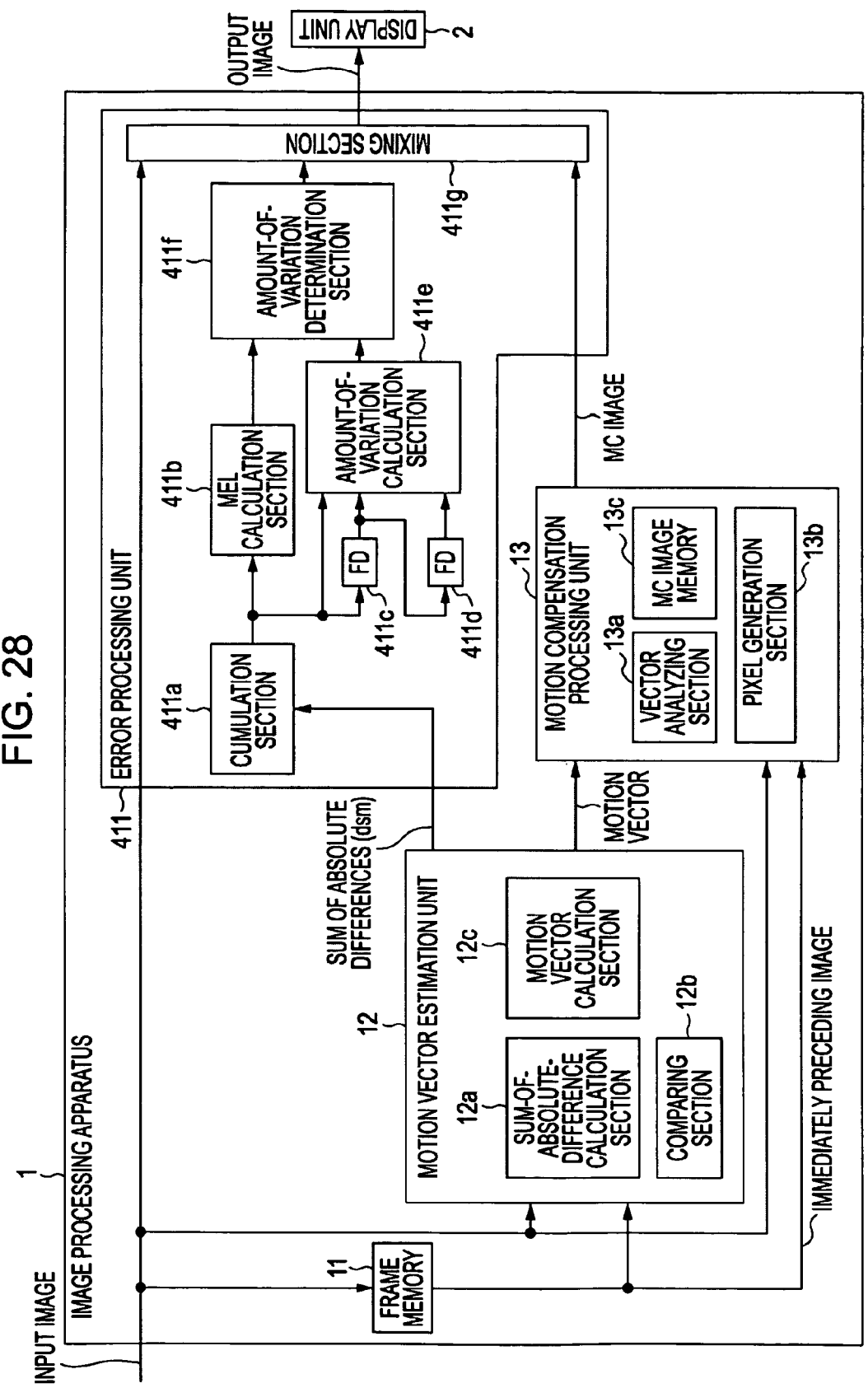
FIG. 28 is a block diagram showing an exemplary structure of another image processing apparatus to which the present invention is applied.

FIG. 28 is a diagram showing an exemplary structure according to another embodiment of an image processing apparatus which is designed to prevent excessively high sensitivity in error detection with respect to high-contrast images and to reduce the occurrence of failure in error detection with respect to low-contrast images. Here, in the image processing apparatus 1 shown in FIG. 28, components having substantially the same functions as those provided in the image processing apparatus 1 shown in FIG. 1 will be referred to by the same names and denoted by the same reference numerals. The description thereof will be omitted as necessary.

That is, the image processing apparatus 1 shown in FIG. 28 differs from the image processing apparatus 1 shown in FIG. 1 in that an error processing unit 411 is provided instead of the error processing unit 14.

The error processing unit 411 includes a cumulation section 411a, an MEL calculation section 411b, frame delay (FD) sections 411c and 411d, an amount-of-variation calculation section 411e, an amount-of-variation determination section 411f, and a mixing section 411g. Among these components, the cumulation section 411a, the MEL calculation section 411b, and the mixing section 411g execute processes substantially the same as those performed by the cumulation section 14a, the MEL calculation section 14b, and the mixing section 14c, respectively, of the error processing unit 14. The FD section 411c delays the dsm cumulative-sum result supplied form the cumulation section 411a by one frame, and supplies the delayed dsm cumulative-sum result to the FD section 411d and the amount-of-variation calculation section 411e. The FD section 411d further delays the delayed dsm cumulative-sum result supplied from the FD section 411c by one frame, and supplies the further delayed dsm cumulative-sum result to the amount-of-variation calculation section 411e. The amount-of-variation calculation section 411e calculates an amount of variation in dsm cumulative-sum result with respect to time (an amount of variation with respect to time)on the basis of a dsm cumulative-sum result which is obtained at the current time and supplied from the cumulation section 411a, the delayed dsm cumulative-sum result (which is obtained at a time one frame before the current time) supplied from the FD section 411c, and the further delayed dsm cumulative-sum result (which is obtained at a time two frames before the current time) supplied from the FD section 411d, and supplies the amount of variation with respect to time to the amount-of-variation determination section 411f. The amount-of-variation determination section 411f adjusts the mean error level MEL supplied from the MEL calculation section 411b on the basis of the amount of variation in dsm cumulative-sum result supplied from the amount-of-variation calculation section 411e, and supplies the adjusted mean error level MEL to the mixing section 411g. That is, the error processing unit 411 mixes the MC image and the input image according to the amount of variation in dsm cumulative-sum result with respect to time, and outputs the mixed image to the display unit 2, and the mixed image is displayed thereon.

Figure 29:
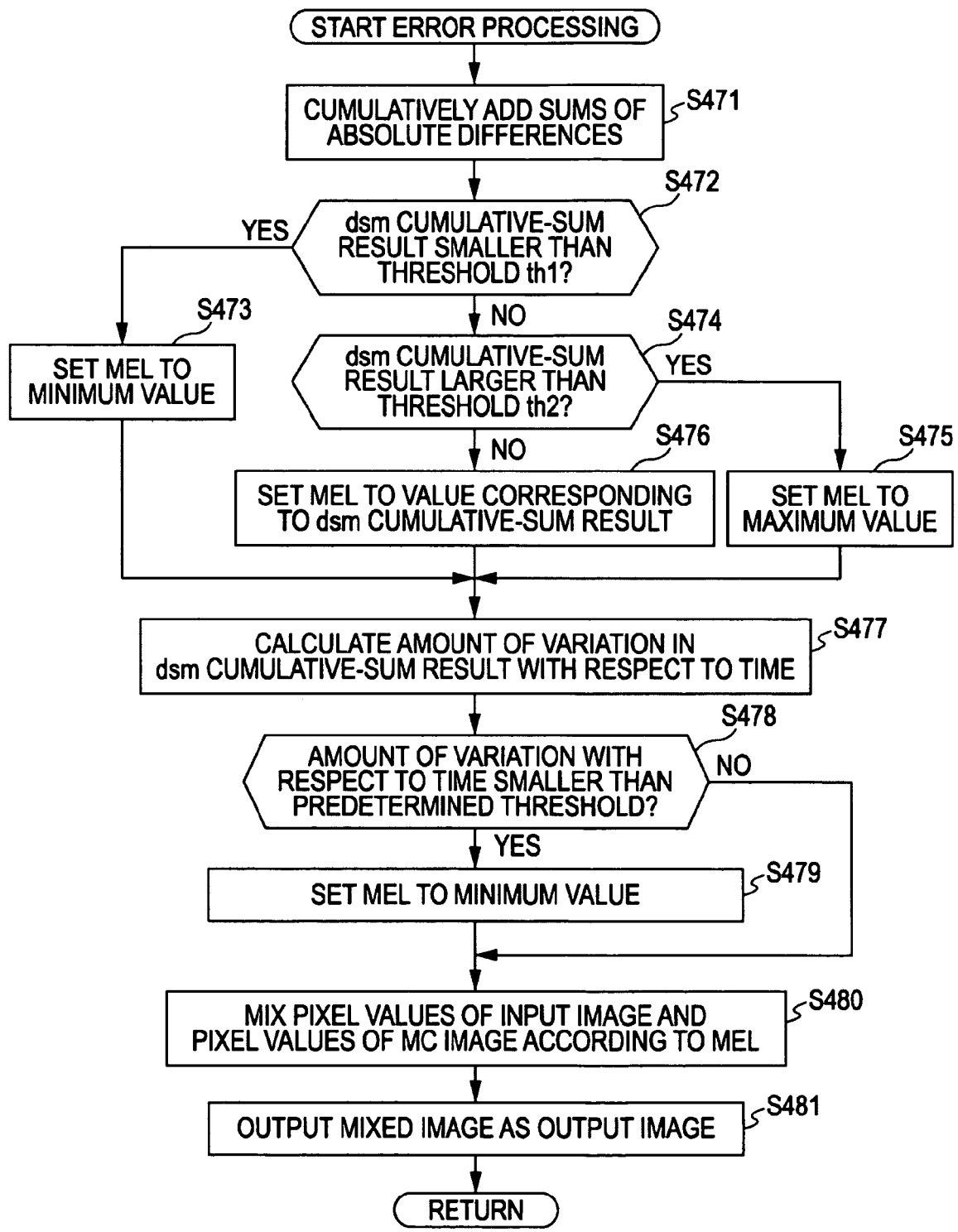
FIG. 29 is a flowchart illustrating error processing performed by the image processing apparatus shown in FIG. 28.

Next, image processing performed by the image processing apparatus 1 shown in FIG. 28 will be described. Here, the image processing is basically the same as that described with reference to the flowchart shown in FIG. 2. Thus, description the same as that has been described with reference to FIG. 2 will be omitted. Moreover, the image processing performed by the image processing apparatus 1 shown in FIG. 28 differs from the image processing performed by the image processing apparatus 1 shown in FIG. 1 in terms of the error processing in the processing represented by the flowchart shown in FIG. 2. Thus, the error processing performed by the image processing apparatus 1 shown in FIG. 28 will be described with reference to a flowchart shown in FIG. 29. Here, processes performed in steps S471 through S476 and steps S480 and S481 in the flowchart shown in FIG. 29 are substantially the same as those performed in steps S71 through S76 and steps S77 and S78 described with reference to the flowchart shown in FIG. 8, and thus a description thereof will be omitted.

Here, in steps S473, S475, and S476, the MEL calculation section 411b supplies the mean error level MEL, which has been set, to the amount-of-variation determination section 411f.

In step S477, the amount-of-variation calculation section 411e calculates the amount of variation in dsm cumulative-sum result with respect to time on the basis of the dsm cumulative-sum result which is obtained at the current time and supplied from the cumulation section 411a, the delayed dsm cumulative-sum result (which is obtained at the time one frame before the current time) supplied from the FD section 411c, and the further delayed dsm cumulative-sum result (which is obtained at the time two frames before the current time) supplied from the FD section 411d, and supplies the amount of variation with respect to time to the amount-of-variation determination section 411f.

In step S478, the amount-of-variation determination section 411f determines whether the amount of variation with respect to time is smaller than a predetermined threshold.

In step S478, if it is determined that the amount of variation with respect to time is smaller than the predetermined threshold, in step S479, the amount-of-variation determination section 411f sets the mean error level MEL supplied from the MEL calculation section 411b to the minimum value, and supplies it to the mixing section 411g. Here, if the mean error level MEL supplied from the MEL calculation section 411b has been already set to the minimum value (in step S473), the amount-of-variation determination section 411f simply supplies the mean error level MEL to the mixing section 411g.

On the other hand, in step S478, if it is determined that the amount of variation with respect to time is not smaller than the predetermined threshold, the procedure skips step S479 and proceeds to step S480.

In the above-described processing, the mean error level MEL can be set according to the amount of variation in dsm cumulative-sum result with respect to time.

In general, as the reliability of a motion vector becomes higher, the amount of variation in dsm cumulative-sum result with respect to time becomes smaller. Thus, if the amount of variation in dsm cumulative-sum result with respect to time is smaller than the predetermined threshold, it can be determined that an accurate motion vector has been obtained, whereby the mean error level MEL can be set to the minimum value. That is, regardless of a variation in sum of absolute differences dsm caused by a degree of contrast ranging from high to low, an error can be detected.

Thus, since excessively high sensitivity in error detection with respect to high-contrast images is prevented and the occurrence of failure in error detection with respect to low-contrast images is reduced, the distortion in the MC image can be suppressed.

In the above, although the image processing apparatus for detecting an error on the basis of the amount of variation in dsm cumulative-sum result with respect to time has been described, the image processing apparatus can be designed to detect an error on the basis of a degree-of-motion ratio of the input image.

Figure 30:
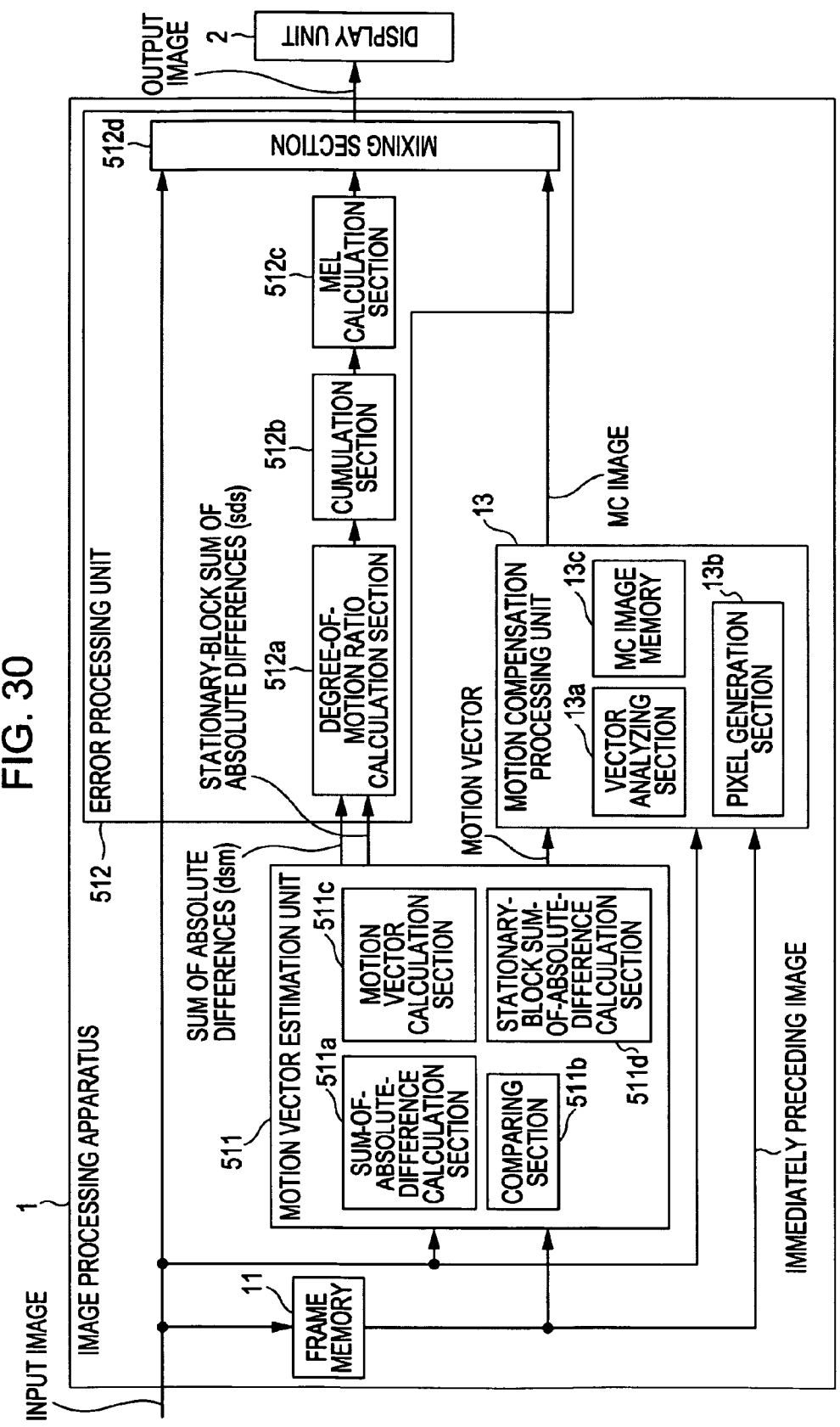
FIG. 30 is a block diagram showing an exemplary structure of another image processing apparatus to which the present invention is applied.

FIG. 30 is a diagram showing an exemplary structure according to an embodiment of an image processing apparatus which is designed to detect an error on the basis of a degree-of-motion ratio of the input image. Here, in the image processing apparatus 1 shown in FIG. 30, components having substantially the same functions as those provided in the image processing apparatus 1 shown in FIG. 1 will be referred to by the same names and denoted by the same reference numerals. The description thereof will be omitted as necessary.

That is, the image processing apparatus 1 shown in FIG. 30 differs from the image processing apparatus 1 shown in FIG. 1 in that a motion vector estimation unit 511 and an error processing unit 512 are provided instead of the motion vector estimation unit 12 and the error processing unit 14.

The motion vector estimation unit 511 includes a sum-of-absolute-difference calculation section 511a, a comparing section 511b, a motion vector calculation section 511c, and a stationary-block sum-of-absolute-difference calculation section 511d. Among these components, the sum-of-absolute-difference calculation section 511a, the comparing section 511b, and the motion vector calculation section 511c execute processes substantially the same as those performed by the sum-of-absolute-difference calculation section 12a, the comparing section 12b, and the motion vector calculation section 12c of the motion vector estimation unit 12, respectively. The stationary-block sum-of-absolute-difference calculation section 511d reads pixels in a block of interest corresponding to a pixel of interest (a processing-target pixel) in the input image and pixels in a block which is located in the immediately preceding image at a position the same as that of the block of interest, the pixels in the block having an arrangement the same as that of the pixels in the block of interest, and calculates a sum of absolute differences between pixel values at corresponding pixel positions (hereinafter referred to as a stationary-block sum of absolute differences).

The error processing unit 512 includes a degree-of-motion ratio calculation section 512a, a cumulation section 512b, an MEL calculation section 512c, and a mixing section 512d. Among these components, the MEL calculation section 512c and the mixing section 512d execute processes substantially the same as those performed by the MEL calculation section 14b and the mixing section 14c of the error processing unit 14, respectively. For each of the pixels in the input image, the degree-of-motion ratio calculation section 512a calculates a ratio of the sum of absolute differences supplied from the motion vector estimation unit 511 to a corresponding stationary-block sum of absolute differences, and supplies, to the cumulation section 512b, the calculation result, which is a degree-of-motion ratio as a parameter representing a degree of motion in the input image. For each of the pixels in the input image, the cumulation section 512b cumulatively adds the degree-of-motion calculation result to the sum of absolute differences dsm, and supplies it to the MEL calculation section 512c. That is, the error processing unit 512 mixes the MC image and the input image according to, for each of the pixels in the input image, the ratio of the sum of absolute differences to the stationary-block sum of absolute differences, and outputs the mixed image to the display unit 2, and the mixed image is displayed thereon.

Next, image processing performed by the image processing apparatus 1 shown in FIG. 30 will be described. Here, the image processing is basically the same as that described with reference to the flowchart shown in FIG. 2. Thus, description the same as that has been described with reference to FIG. 2 will be omitted. Moreover, the image processing performed by the image processing apparatus 1 shown in FIG. 30 differs from the image processing performed by the image processing apparatus 1 shown in FIG. 1 in terms of the motion vector estimation processing and the error processing in the processing represented by the flowchart shown in FIG. 2. Thus, motion vector estimation processing and error processing performed by the image processing apparatus 1 shown in FIG. 30 will be described with reference to a flowchart shown in FIG. 31. In the following, the motion vector estimation processing and the error processing performed by the image processing apparatus 1 shown in FIG. 30 will be described.

First, with reference to the flowchart shown in FIG. 31, the motion vector estimation processing performed by the image processing apparatus 1 shown in FIG. 30 will be described.

Figure 31:
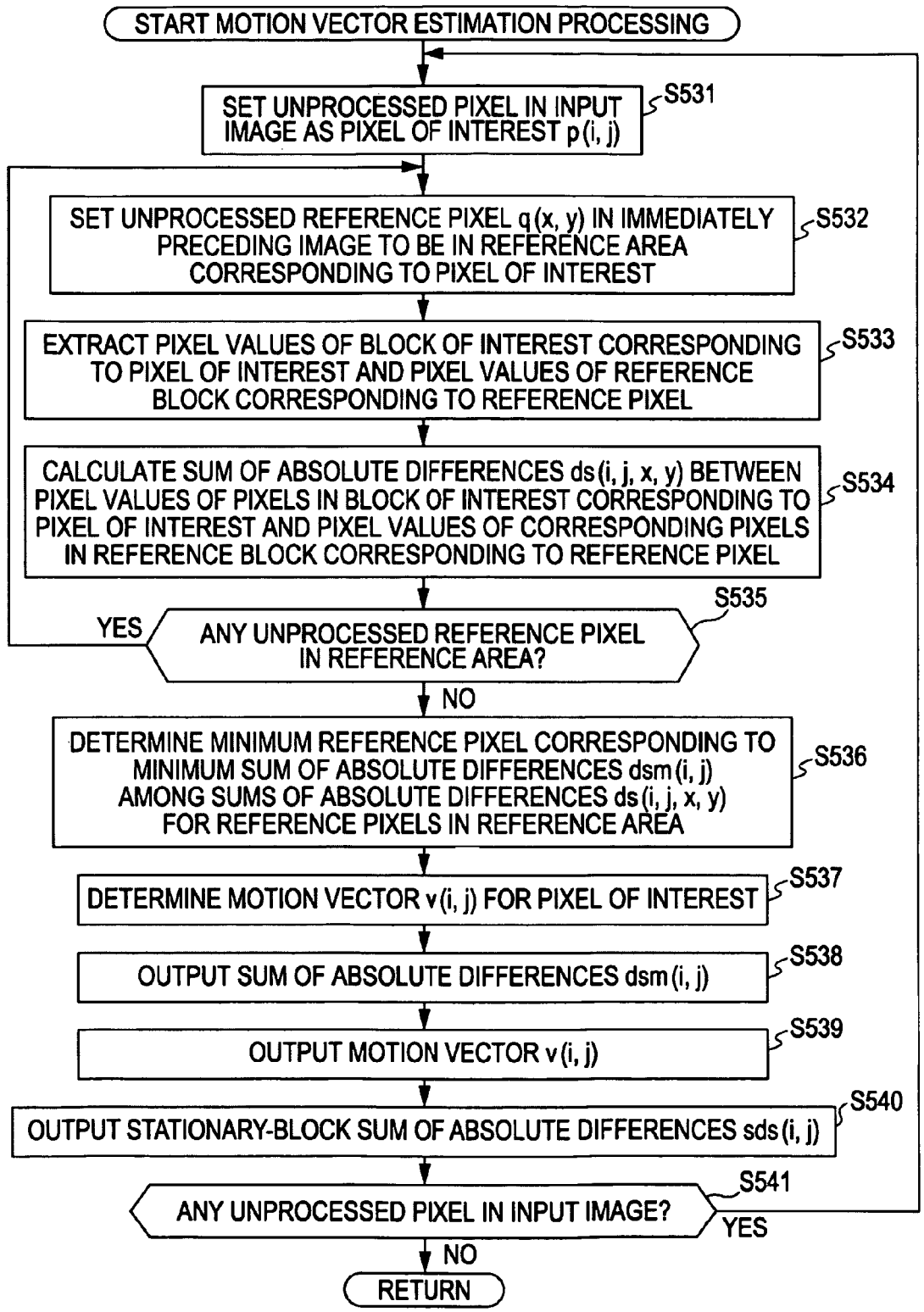
FIG. 31 is a flowchart illustrating motion vector estimation processing performed by the image processing apparatus shown in FIG. 30.

Here, processes performed in steps S531 through S539 in the flowchart shown in FIG. 31 are substantially the same as those performed in steps S31 through S39 described with reference to the flowchart shown in FIG. 3. Thus, a description thereof will be omitted.

That is, in step S540, the stationary-block sum-of-absolute-difference calculation section 511d reads pixels in a block of interest corresponding to a pixel of interest (a processing-target pixel) in the input image and pixels in a block which is located in the immediately preceding image at a position the same as that of the block of interest, the pixels in the block having an arrangement the same as that of the pixels in the block of interest, and calculates a stationary-block sum of absolute differences between pixel values at corresponding pixel positions.

Figure 32:
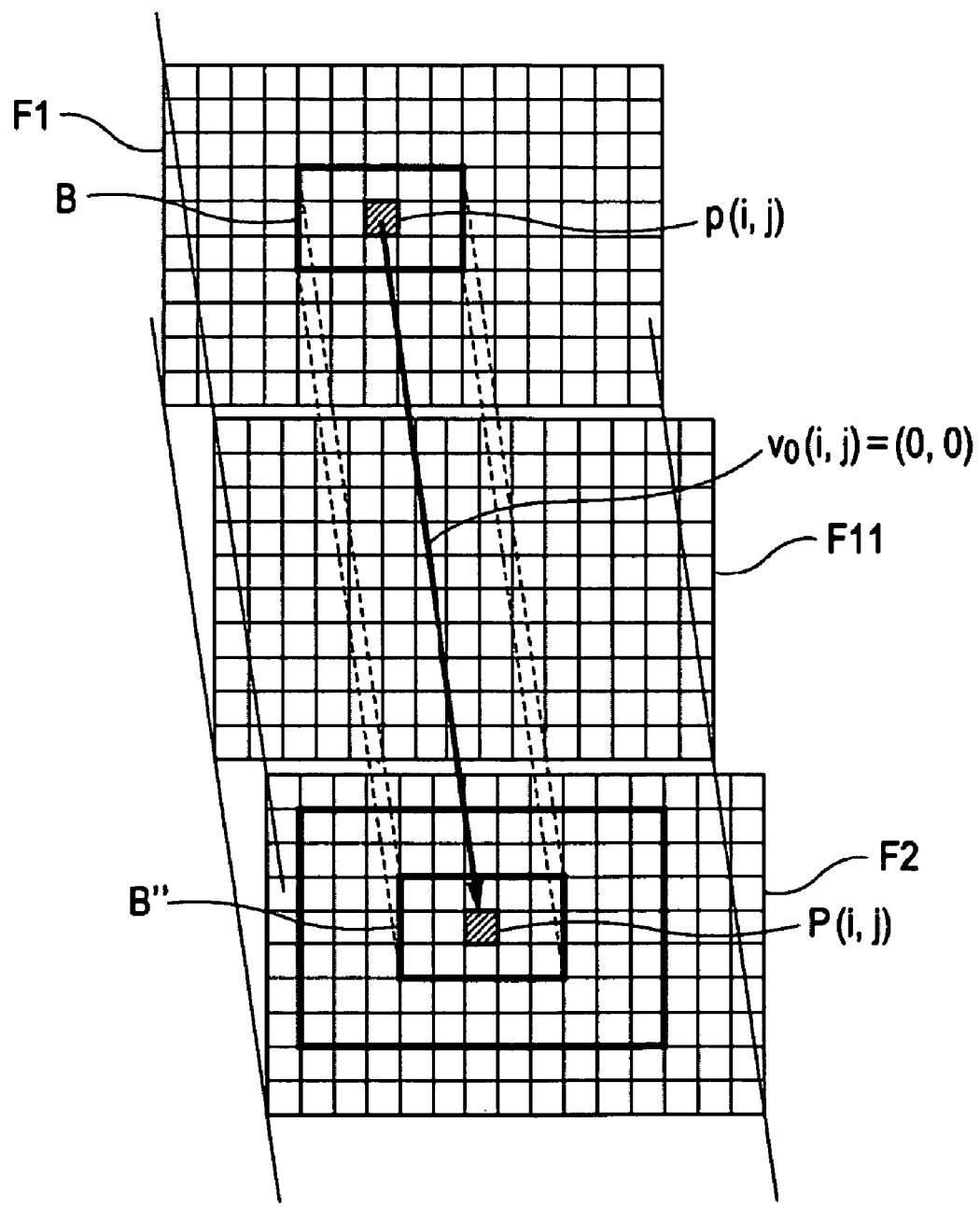
FIG. 32 is a diagram illustrating the motion vector estimation processing performed by the image processing apparatus shown in FIG. 30.

For example, as shown in a shaded area in FIG. 32, a same-arrangement pixel $P(i, j)$ in the immediately preceding image F2 is arranged so as to correspond to the pixel of interest $p(i, j)$ in the input image F1, the same-arrangement pixel $P(i, j)$ being located at a position the same as that of the pixel of interest $p(i, j)$ in the input image F1.

Here, in FIG. 32, the image F1 shown at the upper part of FIG. 32 represents the input image, and the image F2 represents the immediately preceding image. The image F11 represents an MC image to be generated. Each of cells represents a pixel, and (x, y) represents position coordinates of a pixel in the immediately preceding image.

The stationary-block sum-of-absolute-difference calculation section 511d extracts pixel values of pixels constituting a block of interest B corresponding to the pixel of interest $p(i, j)$ and pixel values of pixels constituting a same-arrangement block B" corresponding to a same-arrangement pixel. That is, in a case shown in FIG. 32, the block of interest B corresponding to the pixel of interest $p(i, j)$ is a block of a plurality of pixels indicated by a thick line in the input image F1, and the same-arrangement block B" is a block of a plurality of pixels indicated by a thick line in the immediately preceding image F2. In FIG. 32, similarly to FIG. 4, the block of interest B and the same-arrangement block B" are each a block of fifteen pixels.

In FIG. 32, a motion vector $v_0(i, j)$ whose starting point is the pixel of interest $p(i, j)$ in the input image and whose endpoint is the same-arrangement pixel $P(i, j)$ has an amount of motion of 0, namely, a still vector.

The stationary-block sum-of-absolute-difference calculation section 511d calculates a stationary-block sum of absolute differences $sds(i, j)$ obtained between the pixel values of the pixels in the block of interest B and the pixel values of pixels at corresponding positions in the same-arrangement block B", and supplies the stationary-block sum of absolute differences $sds(i, j)$ to the error processing unit 512.

In step S541, the sum-of-absolute-difference calculation section 511a determines whether there is any unprocessed pixel in the input image. If there are one or more unprocessed pixels therein, the procedure returns to step S531. That is, processes in steps S531 through S541 are repeatedly performed until motion vectors, minimum sums of absolute differences, and stationary-block sums of absolute differences are obtained for all the pixels in the input image. In step S541, if the sum-of-absolute-difference calculation section 511a determines that there is no unprocessed pixel in the input image, that is, if motion vectors are obtained for all the pixels in the input image, the processing is completed.

In the above-described processing, for each of the pixels in the input image, the minimum sum of absolute differences dsm and the stationary-block sum of absolute differences sds(i, j) are obtained and supplied to the error processing unit 512.

Figure 33:
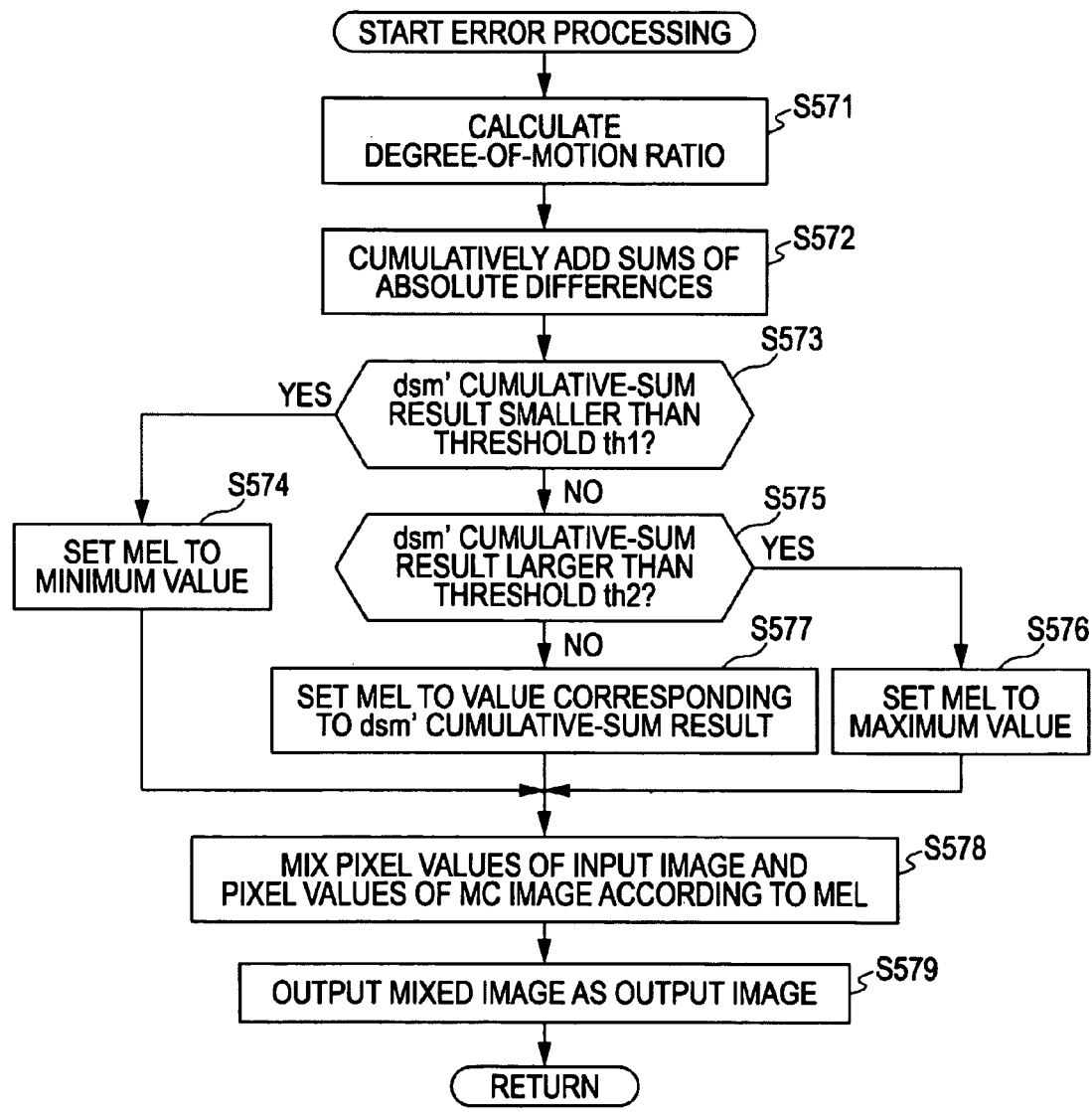
FIG. 33 is a flowchart illustrating error processing performed by the image processing apparatus shown in FIG. 30.

Next, with reference to a flowchart shown in FIG. 33, error processing performed by the image processing apparatus 1 shown in FIG. 30 will be described. Here, processes performed in steps S572 through S579 in the flowchart shown in FIG. 33 are substantially the same as those performed in steps S71 through S78 described with reference to the flowchart shown in FIG. 8. Thus, a description thereof will be omitted.

In step S571, the degree-of-motion ratio calculation section 512a calculates, for each of the pixels in the input image, a degree-of-motion ratio as a parameter representing a degree of motion in the input image using the sum of absolute differences (dsm) and the stationary-block sum of absolute differences sds(i, j) supplied from the motion vector estimation unit 511. For each of the pixels in the input image, the degree-of-motion ratio calculation section 512a supplies, to the cumulation section 512b, the degree-of-motion ratio for the pixel as a sum of absolute differences dsm'.

For example, the degree-of-motion ratio calculation section 512a calculates a degree-of-motion ratio by performing a calculation as expressed in Eq. (4) given below. Here, in Eq. (4), a constant α may be a value which can be adjusted from 0 to 1 as necessary.

$$dsm'(i, j) = dsm(i, j) / \{\alpha \times sds(i, j)\} \quad (4)$$

Moreover, for example, Eq. (5) given below may be used to obtain a degree-of-motion ratio as a parameter representing a degree of motion in the input image. Here, in Eq. (5), a constant β may be a value which can be adjusted from 0 to 1 as necessary.

$$dsm'(i, j) = dsm(i, j) - \beta \times sds(i, j) \quad (5)$$

After step S571, in step S572, the cumulation section 512b cumulatively adds sums of absolute differences (dsm'), each of which is a degree-of-motion ratio for one of pixels in the input image, and steps thereafter are executed.

In the above-described processing, the mean error level MEL can be set according to a ratio of the sum of absolute differences dsm to the stationary-block sum of absolute differences sds.

Figure 34:
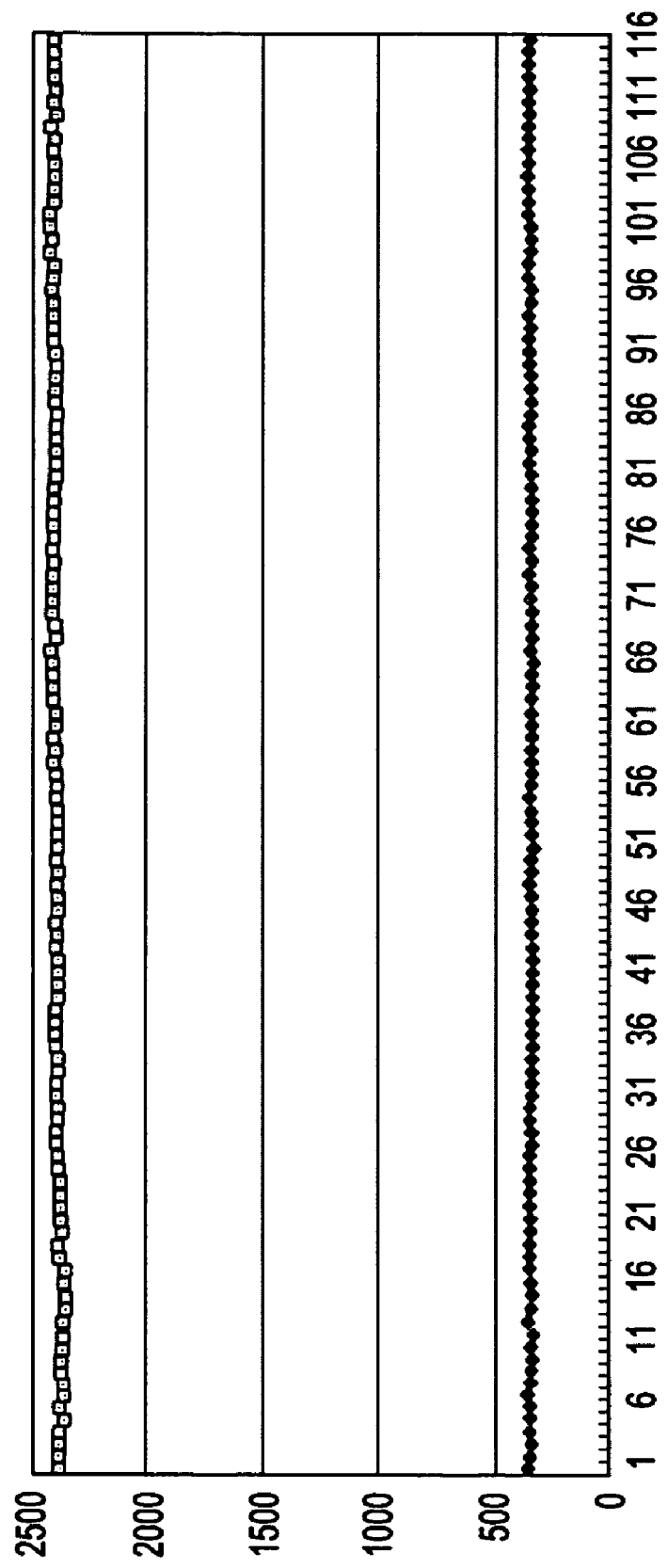
FIG. 34 is a diagram illustrating an sds cumulative-sum result and a dsm cumulative-sum result in a case in which an accurate motion vector is obtained.
Figure 35:
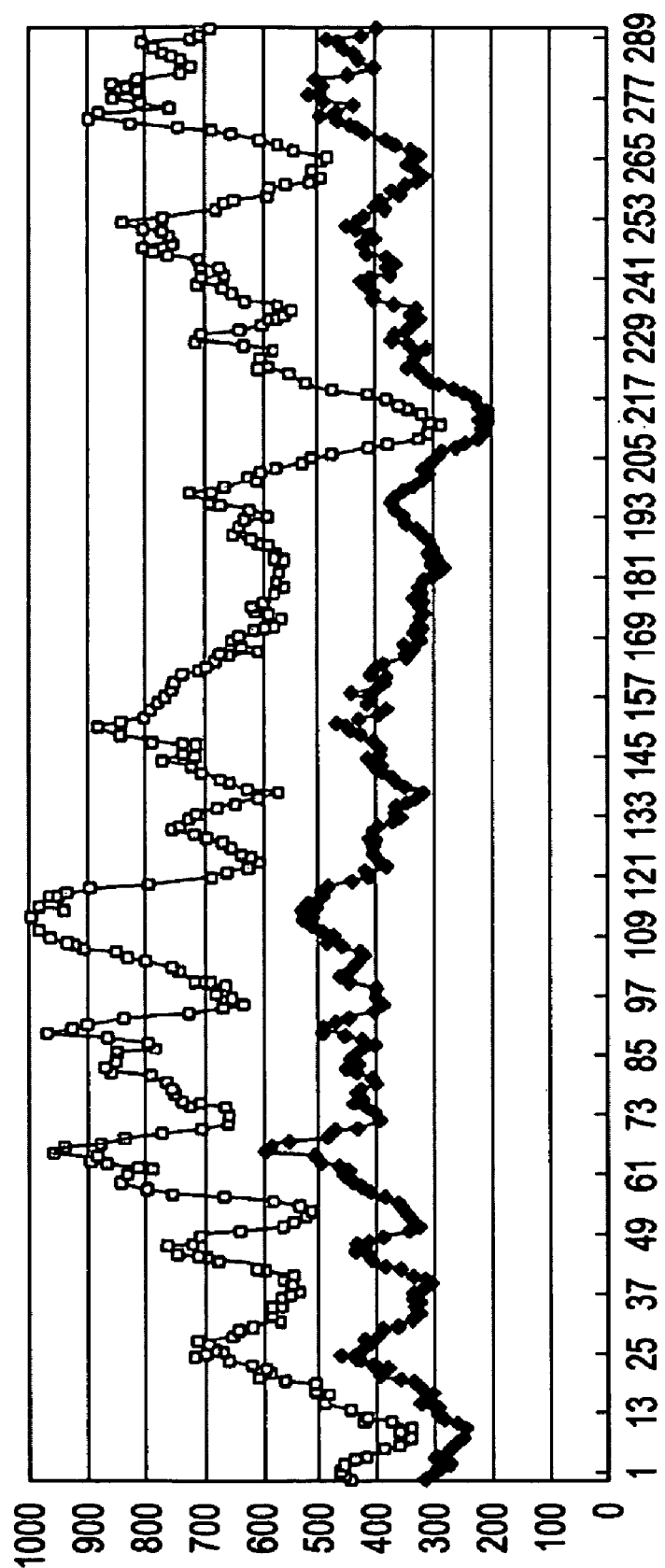
FIG. 35 is a diagram illustrating an sds cumulative-sum result and a dsm cumulative-sum result in a case in which an accurate motion vector is not obtained.

In general, as the reliability of a motion vector becomes higher, the sum of absolute differences dsm becomes smaller than the stationary-block sum of absolute differences sds. That is, as the reliability of a motion vector becomes higher, a degree of motion becomes small. For example, as shown in FIG. 34, in an image in which it is possible to obtain an accurate motion vector, the dsm cumulative-sum result represented by a line with (filled) diamond symbols is significantly small, with respect to the sds cumulative-sum result represented by a line with (shaded) square symbols. Moreover, as shown in FIG. 35, in an image in which it is not possible to obtain an accurate motion vector, the dsm cumulative-sum result represented by a line with (filled) diamond symbols is not as significantly small as that shown in FIG. 34, with respect to the sds cumulative-sum result represented by a line with (shaded) square symbols. Here, in FIG. 34, the horizontal axis represents frame number and the vertical axis represents dsm cumulative-sum result and sds cumulative-sum result.

Thus, if a degree-of-motion ratio as the sum of absolute differences dsm' represented by Eq. (4) is small, it can be determined that an accurate motion vector has been obtained, whereby the mean error level MEL can be set to the minimum value. That is, regardless of a variation in sum of absolute differences dsm caused by a degree of contrast ranging from high to low, an error can be detected.

Thus, since excessively high sensitivity in error detection with respect to high-contrast images is prevented and the occurrence of failure in error detection with respect to low-contrast images is reduced, the distortion in the MC image can be suppressed.

In the above, the image processing apparatus capable of detecting an error according to a degree of motion detected in the entirety of the input image has been described. However, if a predetermined proportion or more of an image is a stationary region, even if a motion vector having low reliability is obtained in the other region in the image, there is a possibility that the sum of absolute differences dsm of the entirety of the image may not be a large value. Thus, even in such a case, an example in which the presence of a motion vector having low reliability is detected will be described.

Figure 36:
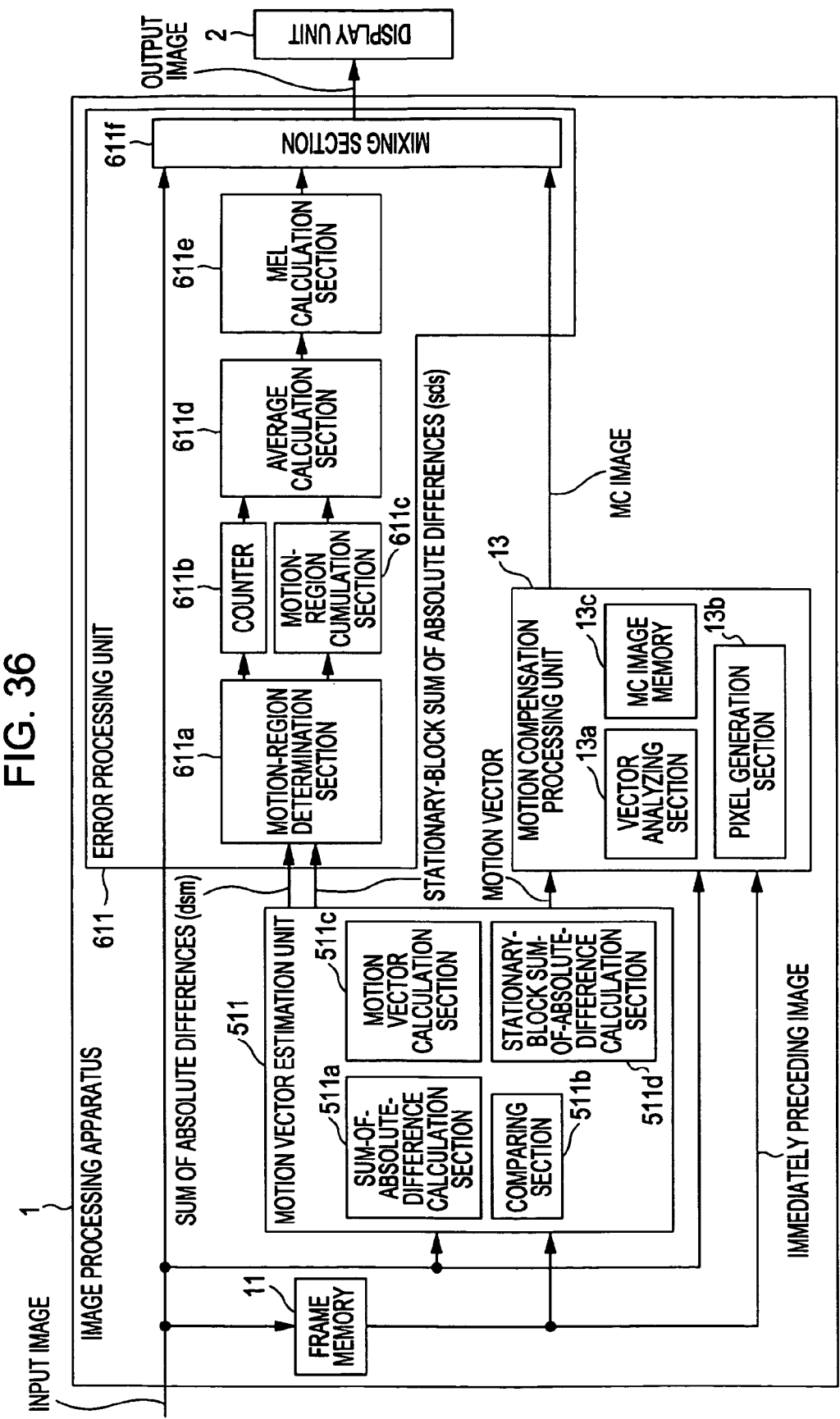
FIG. 36 is a block diagram showing an exemplary structure of another image processing apparatus to which the present invention is applied.

FIG. 36 is a diagram showing an exemplary structure of another embodiment of an image processing apparatus which is designed to detect the presence of a motion vector having low reliability. Here, in the image processing apparatus 1 shown in FIG. 36, components having substantially the same functions as those provided in the image processing apparatus 1 shown in FIG. 1 will be referred to by the same names and denoted by the same reference numerals. The description thereof will be omitted as necessary.

That is, the image processing apparatus 1 shown in FIG. 36 differs from the image processing apparatus 1 shown in FIG. 1 in that a motion vector estimation unit 511 and an error processing unit 611 are provided instead of the motion vector estimation unit 12 and the error processing unit 14. Moreover, the motion vector estimation unit 511 shown in FIG. 36 functions substantially the same as the motion vector estimation unit 511 shown in FIG. 30. Thus, a description thereof will be omitted.

The error processing unit 611 includes a motion-region determination section 611a, a counter 611b, a motion-region cumulation section 611c, an average calculation section 611d, an MEL calculation section 611e, and a mixing section 611f. Among these components, the MEL calculation section 611e and the mixing section 611f execute processes substantially the same as those performed by the MEL calculation section 14b and the mixing section 14c of the error processing unit 14, respectively. The motion-region determination section 611a determines a region in which there is motion (a motion region) in the input image according to stationary-block sums of absolute differences sds each obtained for one of predetermined regions (unit regions), the stationary-block sums of absolute differences sds being supplied from the motion vector estimation unit 511. The counter 611b counts the number of regions (unit regions) determined as motion regions by the motion-region determination section 611a, and supplies the number of the regions to the average calculation section 611d. The motion-region cumulation section 611c cumulatively adds sums of absolute differences with respect to the regions determined as the motion regions in the input image, and supplies dsm cumulative-sum results to the average calculation section 611d. The average calculation section 611d calculates a dsm average, which is a sum of absolute differences per unit region, using the number of the regions supplied from the counter 611b and the dsm cumulative-sum results supplied form the motion-region cumulation section 611c, and supplies the dsm average to the MEL calculation section 611e. That is, the error processing unit 611 mixes the MC image and the input image according to the sums of absolute differences in the motion regions in the input image, and outputs the mixed image to the display unit 2, and the mixed image is displayed thereon.

Figure 37:
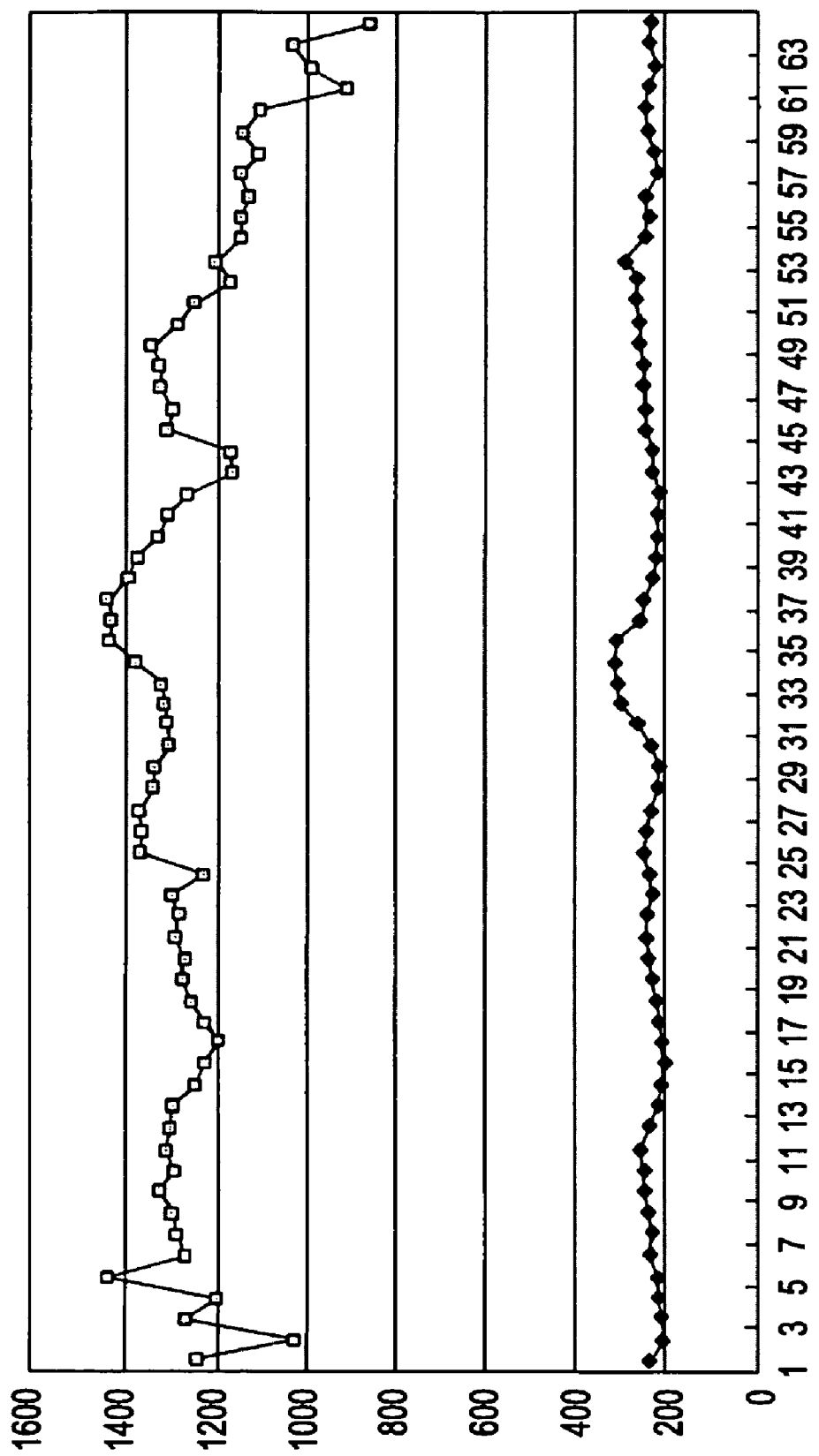
FIG. 37 is a diagram illustrating a dsm average in a case in which it is not possible to obtain an accurate motion vector because motion of an object in an image is difficult to follow.

Here, the error processing unit 611 calculates the average of the dsm cumulative-sum results in the motion regions in the input image in order to detect an error regardless of the size of a region which is not a motion region (a stationary region). For example, if almost half the input image is a stationary region and the other region is a motion region in which it is not possible to obtain an accurate motion vector because motion of an object in the image is difficult to follow, as shown in FIG. 37, the average of the dsm cumulative-sum results (dsm average) in the motion region, the average being represented by a line with (shaded) square symbols, is larger than the average of the dsm cumulative-sum results (dsm average) in the entirety of an image, the average being represented by a line with (filled) diamond symbols. Here, in FIG. 37, the horizontal axis represents frame number and the vertical axis represents dsm average.

Figure 38:
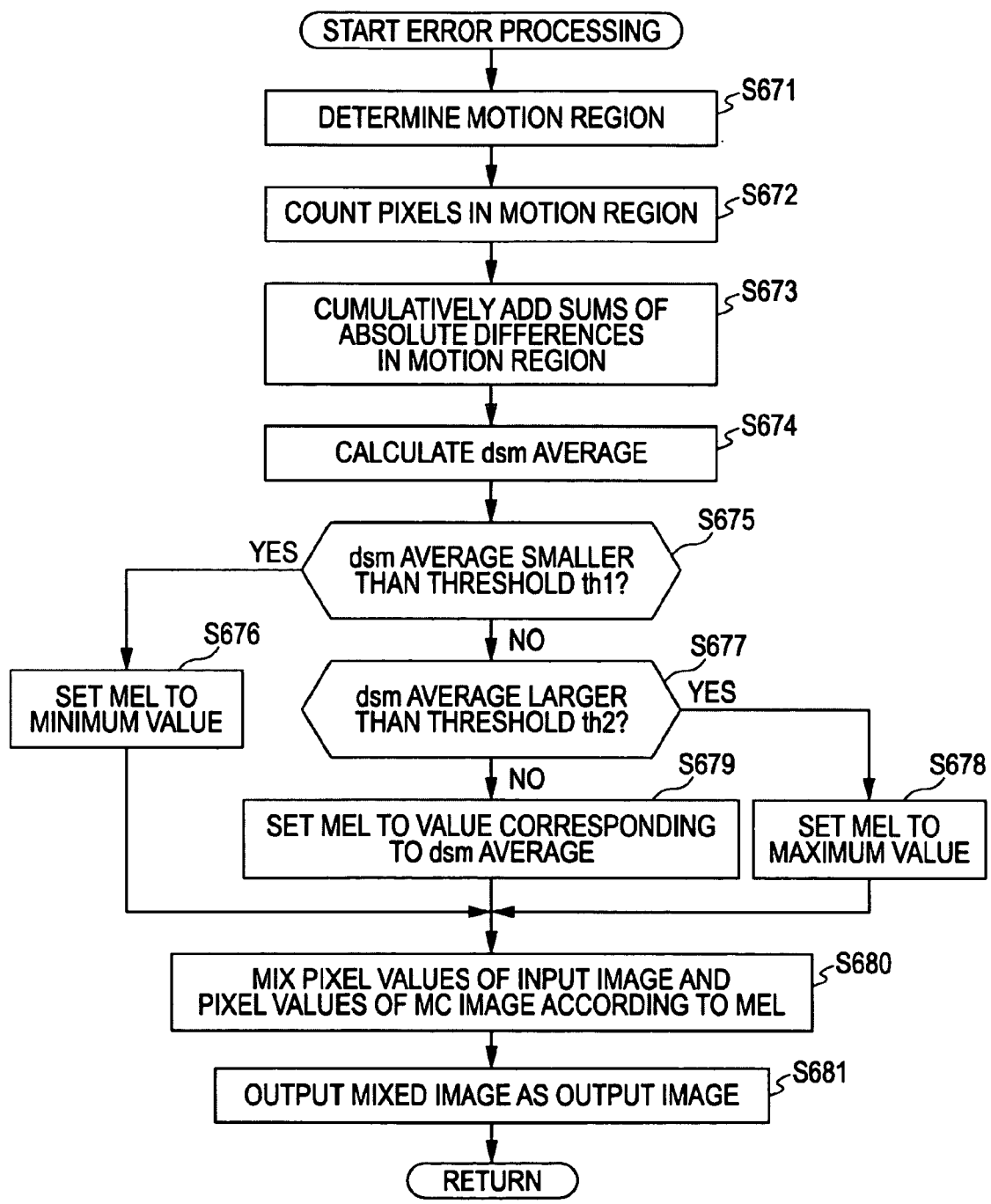
FIG. 38 is a flowchart illustrating error processing performed by the image processing apparatus shown in FIG. 36.

Next, image processing performed by the image processing apparatus 1 shown in FIG. 36 will be described. Here, the image processing is basically the same as that described with reference to the flowchart shown in FIG. 2. Thus, description the same as that has been described with reference to FIG. 2 will be omitted. The image processing performed by the image processing apparatus 1 shown in FIG. 36 differs from the image processing performed by the image processing apparatus 1 shown in FIG. 1 in terms of the error processing in the processing represented by the flowchart shown in FIG. 2. Thus, with reference to a flowchart shown in FIG. 38, error processing performed by the image processing apparatus 1 shown in FIG. 36 will be described below. Here, processes performed in steps S675 through S681 in the flowchart shown in FIG. 38 are substantially the same as those performed in steps S72 through S78 described with reference to the flowchart shown in FIG. 8. Thus, a description thereof will be omitted. Here, the dsm average processed in steps S676, S678, and S679 in the flowchart shown in FIG. 38 are to be treated substantially the same as the dsm cumulative-sum result processed in steps S72, S75, and S76 in FIG. 8. Here, in the processing represented by the flowchart shown in FIG. 38, a unit region is treated as a pixel.

That is, in step S671, the motion-region determination section 611*a* determines, as motion regions, pixels at which motion is detected among pixels in the input image according to stationary-block sums of absolute differences sds each obtained for one of the pixels in the input image. More particularly, since a stationary-block sum of absolute differences sds is a relatively large value in the motion region, if a stationary-block sum of absolute differences sds of one of the pixels in the input image is larger than a predetermined threshold, the motion-region determination section 611*a* determines that the pixel is a motion region.

In step S672, the counter 611*b* counts the number of pixels constituting an area which is determined as the motion regions by the motion-region determination section 611*a*, and supplies the number of pixels to the average calculation section 611*d*.

In step S673, with respect to the pixels which are determined as the motion regions by the motion-region determination section 611*a*, the motion-region cumulation section 611*c* cumulatively adds sums of absolute differences dsm, and supplies a dsm cumulative-sum result to the average calculation section 611*d*.

In step S674, the average calculation section 611*d* calculates the dsm average, which is a sum of absolute differences for one pixel in the motion region, using the number of pixels supplied from the counter 611*b* and the dsm cumulative-sum result supplied from the motion-region cumulation section 611*c*, and supplies the dsm average to the MEL calculation section 611*e*. The procedure proceeds to step S675.

In the above-described processing, even if a predetermined proportion or more of an image is a stationary region, the presence of a motion vector having low reliability can be detected. Thus, even in a scene, a predetermined proportion or more of which is a stationary region, the distortion in the MC image can be suppressed.

Here, in the processing represented by the flowchart shown in FIG. 38, one pixel has been treated as a unit region; however, the unit region is not limited thereto, and a block of a plurality of pixels, for example, four pixels may be treated as a unit region.

As described above, structures for suppressing the distortion in the MC image has been described. These above-described structures may be combined.

Figure 39:
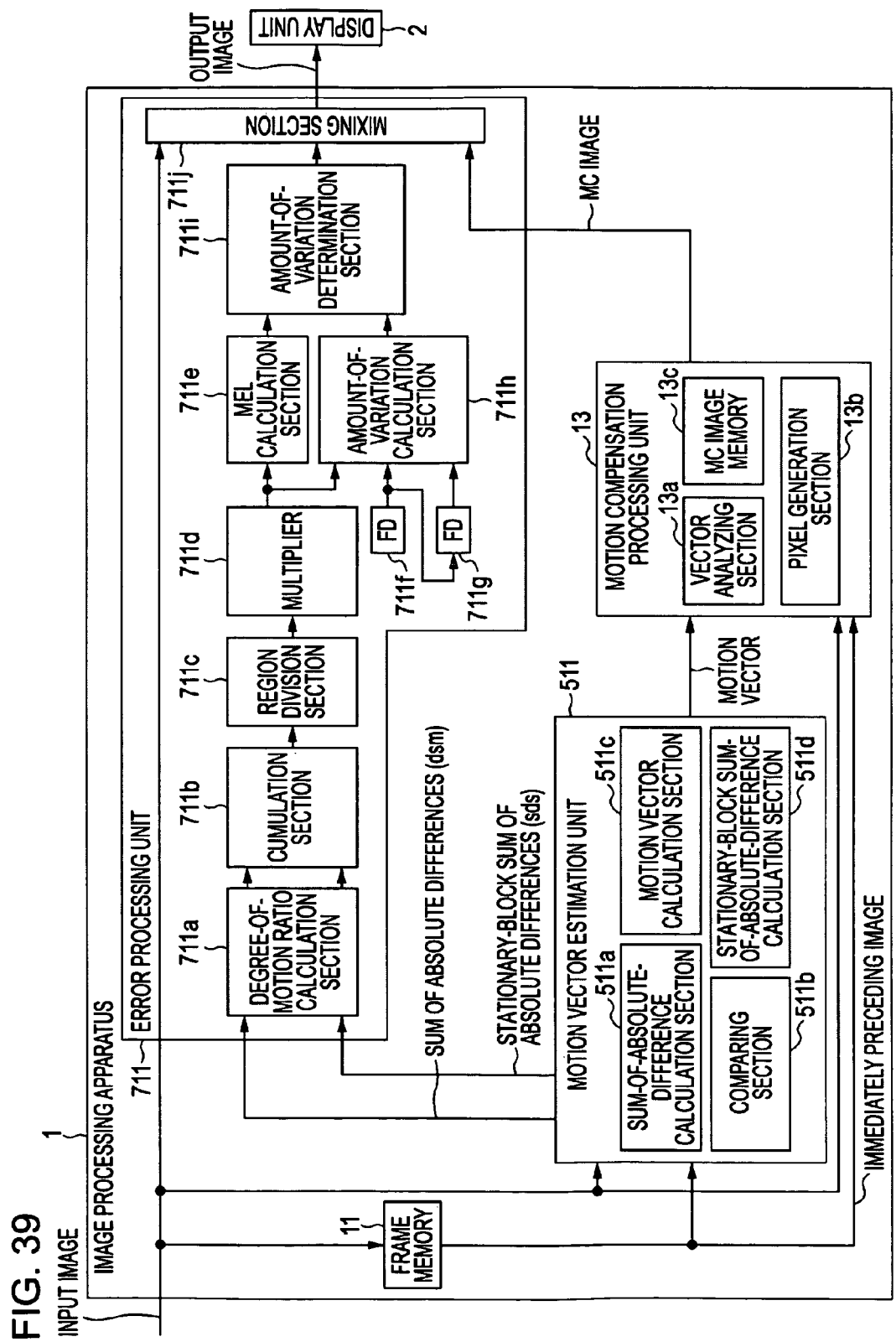
FIG. 39 is a block diagram showing an exemplary structure of another image processing apparatus to which the present invention is applied.

FIG. 39 is a diagram showing an exemplary structure of another embodiment of an image processing apparatus in which the above-described structures are combined. Here, in the image processing apparatus 1 shown in FIG. 39, components having substantially the same functions as those provided in the image processing apparatus 1 shown in FIG. 1 will be referred to by the same names and denoted by the same reference numerals. The description thereof will be omitted as necessary.

That is, the image processing apparatus 1 shown in FIG. 39 differs from the image processing apparatus 1 shown in FIG. 1 in that the motion vector estimation unit 511 and an error processing unit 711 are provided instead of the motion vector estimation unit 12 and the error processing unit 14. Moreover, the motion vector estimation unit 511 shown in FIG. 39 functions substantially the same as the motion vector estimation unit 511 shown in FIG. 30. Thus, a description thereof will be omitted.

The error processing unit 711 includes a degree-of-motion ratio calculation section 711*a*, a cumulation section 711*b*, a region division section 711*c*, a multiplier 711*d*, an MEL calculation section 711*e*, FDs 711*f* and 711*g*, an amount-of-variation calculation section 711*h*, an amount-of-variation determination section 711*i*, and a mixing section 711*j*. Among these components, the degree-of-motion ratio calculation section 711*a* and the cumulation section 711*b* execute processes substantially the same as those performed by the degree-of-motion ratio calculation section 512*a* and the cumulation section 512*b* of the error processing unit 512 shown in FIG. 30, respectively. The region division section 711*c* and the multiplier 711*d* execute processes substantially the same as those performed by the region division section 211*a* and the multiplier 211*c* of the error processing unit 211 shown in FIG. 23, respectively. The MEL calculation section 711*e*, the FDs 711*f* and 711*g*, the amount-of-variation calculation section 711*h*, the amount-of-variation determination section 711*i*, and the mixing section 711*j* execute processes substantially the same as those performed by the MEL calculation section 411*b*, the FDs 411*c* and 411*d*, the amount-of-variation calculation section 411*e*, the amount-of-variation determination section 411*f*, and the mixing section 411*g* of the error processing unit 411 shown in FIG. 28, respectively. Thus, the description thereof will be omitted as necessary.

With the above-described structure, the distortion of in the MC image can be suppressed.

Here, image processing performed in the example shown in FIG. 39 is substantially the same as the processing represented by the flowchart illustrating the processing performed by the components constituting the image processing apparatus 1 shown in FIG. 39, and thus the description thereof will be omitted.

Figure 40:
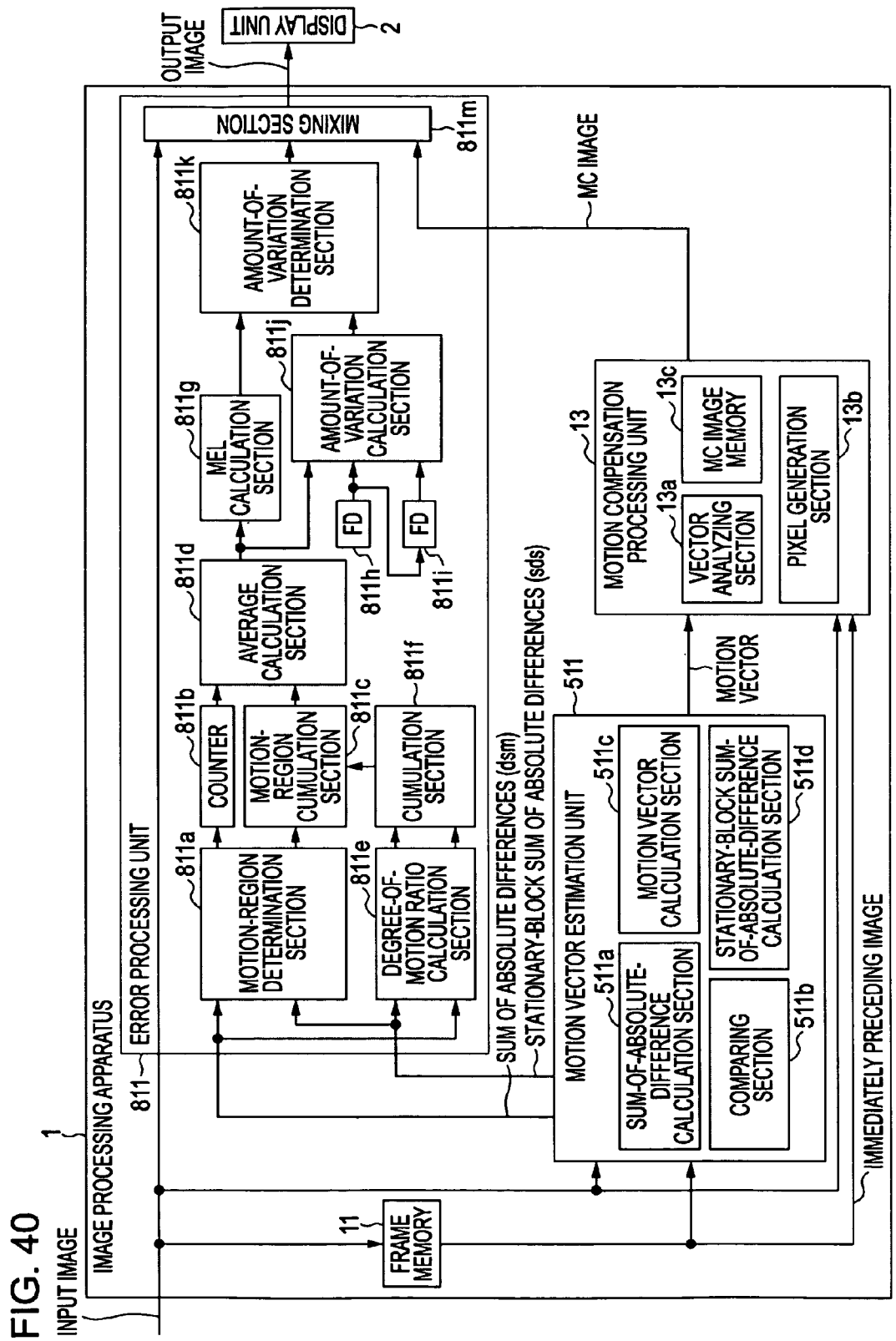
FIG. 40 is a block diagram showing an exemplary structure of another image processing apparatus to which the present invention is applied.

FIG. 40 is a diagram showing an exemplary structure of another embodiment of an image processing apparatus in which the above-described structures are combined. Here, also in the image processing apparatus 1 shown in FIG. 40, components having substantially the same functions as those provided in the image processing apparatus 1 shown in FIG. 1 will be referred to by the same names and denoted by the same reference numerals. The description thereof will be omitted as necessary.

That is, the image processing apparatus 1 shown in FIG. 40 differs from the image processing apparatus 1 shown in FIG. 1 in that the motion vector estimation unit 511 and an error processing unit 811 are provided instead of the motion vector estimation unit 12 and the error processing unit 14. Moreover, the motion vector estimation unit 511 shown in FIG. 40 functions substantially the same as the motion vector estimation unit 511 shown in FIG. 30. Thus, a description thereof will be omitted.

The error processing unit 811 includes a motion-region determination section 811a, a counter 811b, a motion-region cumulation section 811c, an average calculation section 811d, a degree-of-motion ratio calculation section 811e, a cumulation section 811f, an MEL calculation section 811g, FDs 811h and 811i, an amount-of-variation calculation section 811j, an amount-of-variation determination section 811k, and a mixing section 811m. Among these components, the motion-region determination section 811a, the counter 811b, the motion-region cumulation section 811c, and the average calculation section 811d execute processes substantially the same as those performed by the motion-region determination section 611a, the counter 611b, the motion-region cumulation section 611c, the average calculation section 611d shown in FIG. 36, respectively. The degree-of-motion ratio calculation section 811e and the cumulation section 811f execute processes substantially the same as those performed by the degree-of-motion ratio calculation section 512a and the cumulation section 512b of the error processing unit 512 shown in FIG. 30, respectively. The MEL calculation section 811g, the FDs 811h and 811i, the amount-of-variation calculation section 811j, the amount-of-variation determination section 811k, and the mixing section 811m execute processes substantially the same as those performed by the MEL calculation section 411b, the FDs 411c and 411d, the amount-of-variation calculation section 411e, the amount-of-variation determination section 411f, and the mixing section 411g of the error processing unit 411 shown in FIG. 28, respectively. Thus, the description thereof will be omitted.

With the above-described structure, the distortion of in the MC image can be suppressed.

Here, image processing performed in the example shown in FIG. 40 is substantially the same as the processing represented by the flowchart illustrating the processing performed by the components constituting the image processing apparatus 1 shown in FIG. 40, and thus the description thereof will be omitted.

The above-described series of information processes may be executed by hardware, and also by software. In a case in which software is caused to execute the series of processes, a program constituting the software is installed, from a recording medium, in a computer that has been built into dedicated hardware or in, for example, a general-purpose personal computer capable of executing various functions after having various programs or the like installed therein.

FIG. 41 shows an exemplary structure of a general-purpose personal computer. This personal computer includes a central processing unit (CPU) 1001. An input/output interface 1005 is connected to the CPU 1001 via a bus 1004. A read-only memory (ROM) 1002 and a random access memory (RAM) 1003 are connected to the bus 1004.

To the input/output interface 1005, an input unit 1006 constituted by an input device including a keyboard and a mouse for a user to input operation commands, an output unit 1007 for outputting a processing operation screen or an image resulting from processing to a display device, a storage unit 1008 constituted by a hard disk drive or the like for storing a program or various data, and a communication unit 1009 for executing communication processing via a network, a typical example of which is the Internet, via a local area network (LAN) adapter or the like are connected. Moreover, a drive 1010 for reading and writing data is connected to a removable medium 1011 examples of which include a magnetic disk such as a flexible disk, an optical disc such as a compact disc (CD) ROM and a digital versatile disc (DVD), a magneto-optical disc such as a mini disc (MD), and a semiconductor memory.

The CPU 1001 executes various processes according to a program stored in the ROM 1002 or a program read from the removable medium 1011 such as a magnetic disk, an optical disc, a magneto-optical disc, and a semiconductor memory, installed in the storage unit 1008, and loaded in the RAM 1003 from the storage unit 1008. Data that is necessary when the CPU 1001 executes various processes and the like are also stored in the RAM 1003, as necessary.

In this specification, steps forming a program recorded on a recording medium are not necessarily performed in accordance with the time sequence following the order described above. Alternatively, the steps may be performed in parallel or individually.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   sum-of-absolute-difference calculation means for calculating a sum of absolute differences between pixel values of pixels in a block of interest which includes a plurality of pixels and corresponds to a pixel of interest in a first image and pixel values of pixels in a reference block which corresponds to a reference pixel in a second image, the pixels in the reference block having a same arrangement as that of the pixels in the block of interest, and the second image being displayed at a time different from when the first image is displayed;
   first comparison means for comparing sums of absolute differences calculated by the sum-of-absolute-difference calculation means and determining a minimum sum of absolute differences among the sums of absolute differences;
   motion vector estimation means for estimating a motion vector for the pixel of interest using the pixel of interest and the reference pixel having the minimum sum of absolute differences, which is obtained by the first comparison means;
   motion-compensated image generation means for generating a motion-compensated image by using pixel values of the pixels in the first image as pixel values of corresponding pixels in the motion-compensated image according to motion vectors for the pixels in the first image;

first cumulatively adding means for cumulatively adding sums of absolute differences calculated when motion vectors for pixels in the first image are obtained, the motion vectors corresponding to the pixels in the motion-compensated image; and interpolation-image generation means for generating an interpolation image by mixing the pixels in the first image and corresponding pixels in the motion-compensated image according to a cumulative-sum result obtained by the first cumulatively adding means, one of the pixels in the first image corresponding to one of the pixels in the motion-compensated image.

2. The image processing apparatus according to claim 1, further comprising:

quantization means for quantizing the cumulative-sum result using a ratio of the cumulative-sum result to a predetermined maximum value set for the cumulative-sum result, and wherein the interpolation-image generation means generates an interpolation image by mixing the pixels in the first image and the corresponding pixels in the motion-compensated image according to the cumulative-sum result quantized by the quantization means.

3. The image processing apparatus according to claim 2, wherein the interpolation-image generation means generates an interpolation image by, for pixels which are included in the interpolation image and whose cumulative-sum results quantized by the quantization means are smaller than a first threshold having a predetermined value, using pixels at corresponding positions in the first image and by, for pixels which are included in the interpolation image and whose cumulative-sum results quantized by the quantization means are larger than a second threshold having a predetermined value, using pixels at corresponding positions in the motion-compensated image.

4. The image processing apparatus according to claim 1, wherein the reference pixel is set in an area which is in the second image and covers a position corresponding to the pixel of interest in the first image.

5. The image processing apparatus according to claim 1, further comprising:

subtraction means for subtracting a predetermined value from a cumulative-sum result for the second image; and second comparison means for comparing a value obtained by the subtraction means by subtracting the predetermined value from the cumulative-sum result for the second image with the cumulative-sum result for the first image, and for replacing the cumulative-sum result for the first image with the value obtained by subtracting the predetermined value from the cumulative-sum result for the second image if the value obtained by subtracting the predetermined value from the cumulative-sum result for the second image is larger than the cumulative-sum result for the first image, and for simply outputting the cumulative-sum for the first image if the value obtained by subtracting the predetermined value from the cumulative-sum result for the second image is not larger than the cumulative-sum result for the first image.

6. The image processing apparatus corresponding to claim 1, further comprising:

command means for sending a command to reset the motion vector estimated by the motion vector estimation means to a still vector having an amount of motion of zero when a cumulative-sum result for the second image is larger than a first predetermined threshold and an increased amount from the cumulative-sum result for the second image to the cumulative-sum result for the first image is larger than a predetermined second threshold.

7. The image processing apparatus corresponding to claim 6, further comprising:

reset means for resetting the motion vector estimated by the motion vector estimation means to the still vector according to the command sent from the command means.

8. The image processing apparatus corresponding to claim 1, further comprising:

stationary-block sum of absolute differences calculation means for calculating a stationary-block sum of absolute differences between the pixel values of pixels in the block of interest which includes a plurality of pixels and corresponds to the pixel of interest in the first image and pixel values of pixels in a same-arrangement block which corresponds to a same-arrangement pixel which is located in a second image at a position almost the same as that of the pixel of interest, the pixels in the same-arrangement block having a same arrangement as that of the pixels in the block of interest;

calculation means for calculating, for each of pixels of interest, a parameter according to the minimum sum of absolute differences obtained by the first comparison means and the stationary-block sum of absolute differences calculated by the stationary-block sum of absolute differences calculation means; and second cumulatively adding means for cumulatively adding parameters for the pixels of interest, the parameters being calculated by the calculation means, wherein the interpolation-image generation means generates the interpolation image by mixing the pixels in the first image and corresponding pixels in the motion-compensated image according to a cumulative-sum result obtained by the second cumulatively adding means, one of the pixels in the first image corresponding to one of the pixels in the motion-compensated image.

9. The image processing apparatus corresponding to claim 1, further comprising:

stationary-block sum of absolute differences calculation means for calculating a stationary-block sum of absolute differences between the pixel values of pixels in the block of interest which includes a plurality of pixels and corresponds to the pixel of interest in the first image and pixel values of pixels in a same-arrangement block which corresponds to a same-arrangement pixel which is located in a second image at a position almost the same as that of the pixel of interest, the pixels in the same-arrangement block having a same arrangement as that of the pixels in the block of interest; and second cumulatively adding means for cumulatively adding sums of absolute differences for a region which includes the pixel of interest and which corresponds to a stationary-block sum of absolute differences which is larger than a predetermined threshold from among stationary-block sums of absolute differences calculated by the stationary-block sum of absolute differences calculation means, wherein the interpolation-image generation means generates the interpolation image by mixing the pixels in the first image and corresponding pixels in the motion-compensated image according to a cumulative-sum result obtained by the second cumulatively adding means, one of the pixels in the first image corresponding to one of the pixels in the motion-compensated image.

10. The image processing apparatus corresponding to claim 9, further comprising:
average calculation means for calculating the average of stationary-block sums of absolute differences for the region according to the cumulative-sum result obtained by the second cumulatively adding means.

11. The image processing apparatus corresponding to claim 1, further comprising:
amount-of-variation calculation means for calculating an amount of variation, with respect to time, in cumulative-sum result obtained by the first cumulatively adding means, and
wherein the interpolation-image generation means generates the interpolation image by mixing the pixels in the first image and corresponding pixels in the motion-compensated image according to the amount of variation calculated by the amount-of-variation calculation means, one of the pixels in the first image corresponding to one of the pixels in the motion-compensated image.

12. The image processing apparatus corresponding to claim 1, further comprising:
division means for dividing the first image into n regions; and
multiplication means for multiplying a maximum value from among sums of absolute differences for the n regions by n, each of the sums of absolute differences being for one of the n regions and the sums of absolute differences being obtained by the first cumulatively adding means by cumulatively adding sums of absolute differences for one of the n regions divided by the division means, and
wherein the interpolation-image generation means generates the interpolation image by mixing the pixels in the first image and corresponding pixels in the motion-compensated image according to the sum of absolute differences calculated by the multiplication means, one of the pixels in the first image corresponding to one of the pixels in the motion-compensated image.

13. The image processing apparatus corresponding to claim 1,
wherein the first cumulatively adding means cumulatively adds sums of absolute differences for a region other than a region located at an end portion of the first image.

14. An image processing method comprising:
sum-of-absolute-difference calculation step of calculating a sum of absolute differences between pixel values of pixels in a block of interest which includes a plurality of pixels and corresponds to a pixel of interest in a first image and pixel values of pixels in a reference block which corresponds to a reference pixel in a second image, the pixels in the reference block having a same arrangement as that of the pixels in the block of interest, and the second image being displayed at a time different from when the first image is displayed;
comparison step of comparing sums of absolute differences calculated by performing processing of the sum-of-absolute-difference calculation step and determining a minimum sum of absolute differences among the sums of absolute differences;
motion vector estimation step of estimating a motion vector for the pixel of interest using the pixel of interest and the reference pixel having the minimum sum of absolute differences, which is obtained by performing processing of the comparison step;
motion-compensated image generation step of generating a motion-compensated image by using pixel values of the pixels in the first image as pixel values of corresponding pixels in the motion-compensated image according to motion vectors for the pixels in the first image;
cumulatively adding step of cumulatively adding sums of absolute differences calculated when motion vectors for pixels in the first image are obtained, the motion vectors corresponding to the pixels in the motion-compensated image; and
interpolation-image generation step of generating an interpolation image by mixing the pixels in the first image and corresponding pixels in the motion-compensated image according to a cumulative-sum result obtained by performing processing of the cumulatively adding step, one of the pixels in the first image corresponding to one of the pixels in the motion-compensated image.

15. A computer-readable program stored in non-transitory medium and performed by a computer, the program causing the computer to perform processing comprising:
sum-of-absolute-difference calculation step of calculating a sum of absolute differences between pixel values of pixels in a block of interest which includes a plurality of pixels and corresponds to a pixel of interest in a first image and pixel values of pixels in a reference block which corresponds to a reference pixel in a second image, the pixels having a same arrangement as that of the pixels in the block of interest, and the second image being displayed at a time different from when the first image is displayed;
comparison step of comparing sums of absolute differences calculated by performing processing of the sum-of-absolute-difference calculation step and determining a minimum sum of absolute differences among the sums of absolute differences;
motion vector estimation step of estimating a motion vector for the pixel of interest using the pixel of interest and the reference pixel having the minimum sum of absolute differences, which is obtained by performing processing of the comparison step;
motion-compensated image generation step of generating a motion-compensated image by using pixel values of the pixels in the first image as pixel values of corresponding pixels in the motion-compensated image according to motion vectors for the pixels in the first image;
cumulatively adding step of cumulatively adding sums of absolute differences calculated when motion vectors for pixels in the first image are obtained, the motion vectors corresponding to the pixels in the motion-compensated image; and
interpolation-image generation step of generating an interpolation image by mixing the pixels in the first image and corresponding pixels in the motion-compensated image according to a cumulative-sum result obtained by performing processing of the cumulatively adding step, one of the pixels in the first image corresponding to one of the pixels in the motion-compensated image.

16. A program recording medium having a computer-readable program according to claim 15 recorded therein 17. An image processing apparatus comprising:
a sum-of-absolute-difference calculation unit configured to calculate a sum of absolute differences between pixel values of pixels in a block of interest which includes a plurality of pixels and corresponds to a pixel of interest in a first image and pixel values of pixels in a reference block which corresponds to a reference pixel in a second image, the pixels in the reference block having a same arrangement as that of the pixels in the block of interest, and the second image being displayed at a time different from when the first image is displayed;

a comparison unit configured to compare sums of absolute differences calculated by the sum-of-absolute-difference calculation unit and to determine a minimum sum of absolute differences among the sums of absolute differences;

a motion vector estimation unit configured to estimate a motion vector for the pixel of interest using the pixel of interest and the reference pixel having the minimum sum of absolute differences, which is obtained by the comparison unit;

a motion-compensated image generation unit configured to generate a motion-compensated image by using pixel values of the pixels in the first image as pixel values of corresponding pixels in the motion-compensated image according to motion vectors for the pixels in the first image;

a cumulatively adding unit configured to cumulatively add sums of absolute differences calculated when motion vectors for pixels in the first image are obtained, the motion vectors corresponding to the pixels in the motion-compensated image; and an interpolation-image generation unit configured to generate an interpolation image by mixing the pixels in the first image and corresponding pixels in the motion-compensated image according to a cumulative-sum result obtained by the cumulatively adding unit, one of the pixels in the first image corresponding to one of the pixels in the motion-compensated image.

* * * * *